(12) United States Patent
Burks et al.

(10) Patent No.: US 10,454,783 B2
(45) Date of Patent: Oct. 22, 2019

(54) ACCESSORY MANAGEMENT SYSTEM USING ENVIRONMENT MODEL

(71) Applicant: Apple Inc., Cupertino, CA (US)

(72) Inventors: Andrew Burks, Sunnyvale, CA (US); Anush G. Nadathur, San Jose, CA (US); Srinivas Rama, Cupertino, CA (US); Kevin P. McLaughlin, Mountain View, CA (US); Joe Abuan, Cupertino, CA (US); Harlan Haskins, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 14/725,912

(22) Filed: May 29, 2015

(65) Prior Publication Data

US 2015/0350031 A1 Dec. 3, 2015

Related U.S. Application Data

(60) Provisional application No. 62/005,764, filed on May 30, 2014, provisional application No. 62/094,391, filed on Dec. 19, 2014.

(51) Int. Cl.
*H04L 29/06* (2006.01)
*H04L 12/28* (2006.01)
(Continued)

(52) U.S. Cl.
CPC .............. *H04L 41/22* (2013.01); *G05B 15/02* (2013.01); *G06F 3/0482* (2013.01);
(Continued)

(58) Field of Classification Search
None
See application file for complete search history.

(56) References Cited

U.S. PATENT DOCUMENTS 5,059,871 A * 10/1991 Pearlman ........... G05B 19/0421
315/312
5,086,385 A 2/1992 Launey
(Continued)

FOREIGN PATENT DOCUMENTS

CN 101025852 A 8/2007
CN 101075913 A 11/2007
(Continued)

OTHER PUBLICATIONS

Ant Skelton, Fibaro Z-Wave Home Center 2 Mega Review, Sep. 10, 2012, 37 pages.*
(Continued)

*Primary Examiner* — Yongjia Pan
(74) *Attorney, Agent, or Firm* — Kilpatrick, Townsend & Stockton

(57) ABSTRACT

Controllers can be used to control the operation of various accessories. A group of accessories can be organized into an accessory network that can facilitate coordinated control of multiple accessories. The accessory network can be organized according to an environment model that can include a hierarchical representation of a physical environment where accessories are present. The environment model can be synchronized across different controllers that have access to the accessories.

17 Claims, 39 Drawing Sheets

(51) Int. Cl.
    *H04L 12/24*          (2006.01)
    *G06F 3/0482*        (2013.01)
    *G06F 3/0484*        (2013.01)
    *H04L 29/08*          (2006.01)
    *H04W 76/16*        (2018.01)
    *G05B 15/02*         (2006.01)
    *G06F 21/36*          (2013.01)

(52) U.S. Cl.
    CPC ........ *G06F 3/04842* (2013.01); *H04L 12/281* (2013.01); *H04L 12/2809* (2013.01); *H04L 67/025* (2013.01); *H04W 76/16* (2018.02); *G05B 2219/2642* (2013.01)

(56) References Cited

U.S. PATENT DOCUMENTS

| | | | | |
|---|---|---|---|---|
| 5,471,190 | A * | 11/1995 | Zimmermann | H04B 3/54 340/310.16 |
| 5,621,662 | A * | 4/1997 | Humphries | G05B 15/02 340/3.1 |
| 5,907,279 | A | 5/1999 | Bruins et al. | |
| 6,615,088 | B1 * | 9/2003 | Myer | G05B 19/0421 700/17 |
| 6,618,630 | B1 * | 9/2003 | Jundt | G05B 15/02 700/17 |
| 6,739,145 | B2 | 5/2004 | Bhatnagar | D06F 39/005 62/127 |
| 6,756,998 | B1 * | 6/2004 | Bilger | H04L 12/2803 715/734 |
| 6,834,208 | B2 * | 12/2004 | Gonzales | H04L 12/2803 315/291 |
| 6,912,429 | B1 * | 6/2005 | Bilger | G08B 25/008 236/49.3 |
| 6,980,080 | B2 * | 12/2005 | Christensen | G05B 15/02 340/12.53 |
| 7,047,092 | B2 * | 5/2006 | Wimsatt | G05B 15/02 345/173 |
| 7,139,716 | B1 * | 11/2006 | Gaziz | H04L 12/2803 704/275 |
| 7,382,271 | B2 * | 6/2008 | McFarland | G05B 15/02 340/539.2 |
| 7,394,393 | B2 | 7/2008 | Zhang et al. | |
| 7,415,310 | B2 * | 8/2008 | Bovee | H04L 12/282 700/9 |
| 7,574,417 | B1 | 8/2009 | McGreevy et al. | |
| 7,912,447 | B2 * | 3/2011 | Bennett, III | H04L 12/2818 370/401 |
| 7,925,384 | B2 * | 4/2011 | Huizenga | H05B 37/0272 315/149 |
| 8,042,048 | B2 * | 10/2011 | Wilson | H04L 12/2807 700/17 |
| 8,156,334 | B2 | 4/2012 | Ho | |
| 8,190,275 | B2 * | 5/2012 | Chang | H02J 3/14 700/19 |
| 8,261,089 | B2 * | 9/2012 | Leon Cobos | G06F 21/43 713/172 |
| 8,375,118 | B2 * | 2/2013 | Hao | G05B 15/02 709/223 |
| 8,422,401 | B1 * | 4/2013 | Choong | H04L 12/2827 370/254 |
| 8,473,325 | B2 * | 6/2013 | Barnhill, Jr. | H04L 12/2809 705/7.29 |
| 8,516,087 | B2 * | 8/2013 | Wilson | H04L 12/282 709/217 |
| 8,671,099 | B2 | 3/2014 | Kapoor | |
| 8,750,797 | B2 | 6/2014 | Ketari | |
| 9,396,599 | B1 * | 7/2016 | Malhotra | G07C 9/00174 |
| 9,575,472 | B1 * | 2/2017 | Clayton | H04L 12/10 |
| 2001/0030597 | A1 * | 10/2001 | Inoue | G05B 15/02 340/3.7 |
| 2002/0044042 | A1 * | 4/2002 | Christensen | G05B 15/02 340/3.54 |
| 2002/0095568 | A1 | 7/2002 | Norris et al. | |
| 2002/0180581 | A1 | 12/2002 | Kamiwada et al. | |
| 2004/0133314 | A1 * | 7/2004 | Ehlers | G06Q 10/10 700/276 |
| 2004/0260407 | A1 * | 12/2004 | Wimsatt | G05B 15/02 700/19 |
| 2006/0168618 | A1 * | 7/2006 | Choi | G08C 17/02 725/37 |
| 2006/0212174 | A1 * | 9/2006 | Garmon | F24F 11/30 700/276 |
| 2007/0112939 | A1 * | 5/2007 | Wilson | H04L 12/2807 709/219 |
| 2008/0009324 | A1 | 1/2008 | Patel | |
| 2008/0222711 | A1 | 9/2008 | Michaelis et al. | |
| 2008/0229402 | A1 | 9/2008 | Smetters et al. | |
| 2008/0238661 | A1 * | 10/2008 | Camp | G01S 5/0252 340/539.21 |
| 2009/0222659 | A1 | 9/2009 | Miyabayashi | |
| 2009/0307255 | A1 | 12/2009 | Park | |
| 2009/0326800 | A1 | 12/2009 | Kalaboukis | |
| 2010/0019920 | A1 | 1/2010 | Ketari | |
| 2010/0262829 | A1 | 10/2010 | Brown | |
| 2011/0153279 | A1 | 6/2011 | Zhang et al. | |
| 2011/0195664 | A1 | 8/2011 | Keirstead et al. | |
| 2011/0196547 | A1 * | 8/2011 | Park | G06Q 50/06 700/296 |
| 2012/0001724 | A1 * | 1/2012 | Belimpasakis | H04L 29/06 340/5.1 |
| 2012/0054493 | A1 | 3/2012 | Bradley | |
| 2012/0324124 | A1 | 12/2012 | Locker et al. | |
| 2013/0029596 | A1 | 1/2013 | Preston | |
| 2013/0034230 | A1 | 2/2013 | Takahashi | |
| 2013/0101121 | A1 | 4/2013 | Nordholt et al. | |
| 2013/0117673 | A1 * | 5/2013 | Hatambeiki | G08C 17/02 715/733 |
| 2013/0169407 | A1 | 7/2013 | Chen et al. | |
| 2013/0198516 | A1 | 8/2013 | Fenton et al. | |
| 2013/0225132 | A1 * | 8/2013 | Payan | G08C 17/02 455/411 |
| 2014/0006587 | A1 * | 1/2014 | Kusano | H04N 21/41407 709/224 |
| 2014/0022061 | A1 * | 1/2014 | Apte | H04L 12/2803 340/12.5 |
| 2014/0085093 | A1 * | 3/2014 | Mittleman | H04L 12/282 340/628 |
| 2014/0098247 | A1 * | 4/2014 | Rao | H04W 4/20 348/207.1 |
| 2014/0118148 | A1 | 5/2014 | Edlund | |
| 2014/0143695 | A1 | 5/2014 | Sundemeyer et al. | |
| 2014/0222954 | A1 | 8/2014 | Vaccari | |
| 2014/0321297 | A1 | 10/2014 | Yee et al. | |
| 2015/0073568 | A1 * | 3/2015 | Jun | G05B 15/02 700/19 |
| 2015/0222517 | A1 | 8/2015 | McLaughlin et al. | |
| 2015/0334516 | A1 | 11/2015 | Shon et al. | |
| 2015/0341184 | A1 * | 11/2015 | Tatzel | H04L 41/22 700/275 |
| 2015/0350031 | A1 | 12/2015 | Burks et al. | |
| 2016/0085412 | A1 * | 3/2016 | Meganathan | G06F 3/04817 715/739 |
| 2016/0100369 | A1 | 4/2016 | Chhabra | |
| 2016/0315688 | A1 | 10/2016 | Bhargava et al. | |
| 2016/0327598 | A1 * | 11/2016 | Seo | G01R 21/133 |

FOREIGN PATENT DOCUMENTS

| | | |
|---|---|---|
| CN | 101527911 A | 9/2009 |
| CN | 102281251 A | 12/2011 |
| CN | 102387501 A | 3/2012 |
| CN | 102710473 A | 10/2012 |
| CN | 103210383 A | 7/2013 |
| EP | 1 125 414 A2 | 8/2001 |
| EP | 1 133 120 A2 | 12/2001 |
| EP | 1 381 201 A2 | 1/2004 |
| EP | 1 659 739 A2 | 5/2006 |
| EP | 1659739 A2 | 5/2006 |
| EP | 2148308 A2 | 1/2010 |

(56) References Cited

FOREIGN PATENT DOCUMENTS

| | | |
|---|---|---|
| EP | 2 784 986 A1 | 10/2014 |
| EP | 2 881 676 A1 | 6/2015 |
| GB | 2 339 367 A | 1/2000 |
| JP | 2004236215 A | 8/2004 |
| JP | 2009212732 A | 9/2009 |
| JP | 5474238 B1 | 4/2014 |
| TW | 200937931 A | 9/2009 |
| TW | 201208321 A | 2/2012 |
| TW | 201250481 A | 12/2012 |
| TW | 201328401 | 7/2013 |
| TW | 201540034 | 10/2015 |
| TW | 201612729 | 4/2016 |
| WO | 2013/049007 A1 | 4/2013 |
| WO | 2013/0184108 A1 | 12/2013 |
| WO | 2014004133 A1 | 1/2014 |
| WO | 2014/020880 A1 | 2/2014 |
| WO | 2015120161 | 8/2015 |
| WO | 2015184387 | 12/2015 |

OTHER PUBLICATIONS

Fibaro Home intelligence Advance User's Guide, Aug. 14, 2012, 102 pages.*
Tuxedo Touch WIFI Home Automation System, Aug. 4, 2012, 49 pages.*
Behrang Fouladi, Sahand Ghanoun, Security Evaluation of the Z-Wave Wireless Protocol, Oct. 5, 2012, 7 pages.*
Blase Ur, Jaeyeon Jung, and Stuart Schechter, The Current State of Access Control for Smart Devices in Homes, Jul. 24-26, 2013, 6 pages (Year: 2013).*
David Bregman and Arik Korman, A Universal Implementation Model for the Smart Home, Jul. 2009, 16 pages (Year: 2009).*
Fielding, Roy T., et al., "Principled Design of the Modern Web Architecture," ACM Transactions on Internet Technology, May 2002, vol. 2, No. 2, 36 pages.
"Bluetooth low energy," Wikipedia, [online], [retrieved Apr. 24, 2015], retrieved from the Internet: <URL: http://en.wikipedia.org/wiki/Bluetooth_low_energy>, 9 pages.
"Introduction to bluetooth low energy," Product Guide [online], Adafruit Industries, Apr. 17, 2014, [retrieved Apr. 24, 2015], retrieved from the Internet: <URL: https://learn.adafruit.com/introduction-to-bluetooth-low-energy/gatt>, 11 pages.
GATT Specifications, [online], Bluetooth Development Portal, [retrieved Apr. 24, 2015], retrieved from the Internet: <URL: https://developer.bluetooth.org/gatt/Pages/default.aspx>, 1 page.
GATT Characteristics, [online], Bluetooth Development Portal, [retrieved Apr. 24, 2015], retrieved from the Internet: <URL: https://developer.bluetooth.org/gatt/characteristics/Pages/CharacteristicsHome.aspx>, 2 pages.
GATT Descriptors, [online], Bluetooth Development Portal, [retrieved Apr. 24, 2015], retrieved from the Internet: <URL: https://developer.bluetooth.org/gatt/descriptors/Pages/DescriptorsHomePage.aspx>, 1 page.
GATT Services, [online], Bluetooth Development Portal, [retrieved Apr. 24, 2015], retrieved from the Internet: <URL: https://developer.bluetooth.org/gatt/services/Pages/ServicesHome.aspx>, 1 page.
GATT Profiles, [online], Bluetooth Development Portal, [retrieved Apr. 24, 2015], retrieved from the Internet: <URL: https://developer.bluetooth.org/gatt/profiles/Pages/ProfilesHome.aspx>, 1 page.
Rosenberg, J., "A Data Model for Presence," Cisco Systems, Jul. 2006, [retrieved Apr. 24, 2015], retrieved from the Internet: <URL: https://tools.ietf.org/html/rfc4479>, 35 pages.
Epson 802.11n/Bluetooth 2.1 Wireless Interfaces, Datasheet, Epson America, Inc., 2013, 2 pages.
International Search Report and Written Opinion dated Mar. 6, 2015 in PCT/US2015/014639, 10 pages.
Asensio, Angel, et al., "Protocol and Architecture to Bring Things into Internet of Things," Hindawi Publishing Corporation, International Journal of Distributed Sensor Networks, Apr. 13, 2014, vol. 2014, Article ID 158252, 19 pages.
Shelby, Z., et al., "The Constrained Application Protocol (CoAP)," Internet Engineering Task Force (IETF), Jun. 2014, ISSN: 2070-1721, 112 pages.
Isomaki, Markus, et al., "On interworking between rapidly evolving Internet of Things and Open Web Platform," Feb. 20, 2014, [online], Word Wide Web Consortium, <URL: http://www.w3.org/2014/02/wot/papers/isomaki.pdf>, 5 pages.
Koch, Ed, et al., "Hardware/Software Solution Unifying DALI, IBECS, and BACnet Final Report," [online], Lawrence Berkeley National Laboratory, 2004, LBNL-57686, <URL: http://eetd.lbl.gov/node/51279>, 25 pages.
Andersson, Mats, "Use case possibilities with Bluetooth low energy in IoT applications," White Paper, May 20, 2015, [online], <URL: www.u-blox.com>, 16 pages.
Echevarria, Juan Jose, et al., "WebTag: Web Browsing into Sensor Tags over NFC," Sensors, 2012, vol. 12, pp. 8675-8690.
Notice of Allowance dated Jan. 18, 2017 in Taiwanese Application No. 104117503. 8 pages (English translation of claims provided).
International Preliminary Report on Patentability dated Dec. 15, 2016 in International Application No. PCT/US2015/033376. 9 pages.
Taiwan Application No. 104117503, Office Action dated May 26, 2016. 40 pages including English translation.
Non-Final Office Action dated Jun. 23, 2016 in U.S. Appl. No. 14/725,891. 15 pages.
Final Office Action dated Mar. 13, 2017 in U.S. Appl. No. 14/725,891. 20 pages.
Notification of the First Office Action dated Mar. 3, 2017 in Chinese Patent Application No. or Patent No. 201580007365.X. 29 pages (with English translation).
International Search Report and Written Opinion dated Aug. 7, 2015 in PCT/US2015/033376, 22 pages.
International Search Report and Written Opinion dated Nov. 25, 2015, in PCT/US2015/050433. 10 Pages.
International Search Report and Written Opinion dated Jan. 19, 2016, in PCT/US2015/033369. 23 pages.
International Application No. PCT/US2015/014639, International Preliminary Report on Patentability dated Aug. 18, 2016, 7 pages.
Non-Final Office Action dated Dec. 28, 2017 in U.S. Appl. No. 14/725,891. 11 pages (copy not provided).
Non-Final Office Action dated Jun. 2, 2017 in U.S. Appl. No. 14/725,912. 18 pages.
Notice of Decision to Grant dated Jun. 5, 2017 in JP 2016-549775. 10 pages (English translation of allowed claims provided).
Notice of Allowance dated Jan. 12, 2017 in Taiwanese Patent Application No. 104117503. 8 pages (English translation of Replacement Claims provided).
Z-Wave Fibaro Home Center 2 System Advance Users Guide, published Aug. 14, 2012. 8.VIII.2012 ver. 1.02\beta. 102 pages.
Fibaro Z-Wave Home Center 2 Mega Review, May 25, 2017. 37 pages.
Fouladi, Behrang et al., "Hacking Z-Wave Home Automation Systems." Oct. 3, 2013. 7 pages.
Honeywell, "Tuxedo Touch WIFI Home Automation System—Installation and Setup Guide." Published Aug. 4, 2012. 49 pages.
Office Action dated Mar. 17, 2017 in Taiwanese Patent Application No. 104104009. 6 pages (English translation).
Office Action dated Mar. 21, 2017 in Japanese Patent Application No. 2016-549775. 11 pages (English translation included).
Final Office Action dated Jul. 7, 2017 in U.S. Appl. No. 14/614,914. 4 pages.
Non-Final Office Action dated Nov. 4, 2016 in U.S. Appl. No. 14/614,914. 20 pages.
Office Action dated Nov. 13, 2017 in European Application No. 15 731 760.3-1802. 6 pages.
Wu, Thomas, "The Secure Remote Password Protocol." Computer Science Department, Stanford University. Nov. 11, 1197. 1998 Internet Society Symposium on Network and Distributed System Security. 17 pages.
Notice of Allowance dated Jul. 18, 2018 in U.S. Appl. No. 14/725,891. 16 pages. (no copy included)

(56) References Cited

OTHER PUBLICATIONS

"Summons to Attend Oral Proceedings Pursuant to Rule 115(1) EPC" dated Jun. 22, 2018 in European Application No. 15731760.3—1204 / 3149547. 6 pages.
"Summons to Attend Oral Proceedings Pursuant to Rule 115(1) EPC" dated Aug. 14, 2018 in European Application No. 15731760.3—1204 / 3149547. 6 pages.
"Decision to Grant" dated Jun. 5, 2017 in Japanese Patent Application No. 2016-549775. 11 pages.
Notification of the First Office Action dated Dec. 5, 2018 in Chinese Patent Application No. 201580028720.1. 25 pages (includes English translation).
"First Office Action," dated Aug. 19, 2019 in Chinese Application No. 201580028840.1. 14 pages.
"Second Office Action," dated Jul. 23, 2019 in Chinese Application No. 201580028720.1. 30 pages (includes English translation).
"Decision to Grant," dated May 31, 2019 in European Application No. 15731760.3 — 1204 / 3149547. 2 pages.

\* cited by examiner

| SERVICE GROUP | ACCESSORIES (ROOM) | |
|---|---|---|
| 402 — Security lights | Porch light (foyer) | — 304(18) |
| | Lights 7 (front yard) | — 304(19) |
| | Lights 9 (back yard) | — 304(21) |
| | Light 4 (kitchen) | — 304(11) |
| 404 — Ventilation | Fan 1 (master BR) | |
| | Fan 2 (Jill's BR) | |
| | Fan 3 (Jack's BR) | |
| | Fan 4 (kitchen) | |
| 406 — Cooking | Light 4 (kitchen) | — 304(11) |
| | Fan 4 (kitchen) | — 304(12) |
| | TV 2 (family room) | — 304(13) |
| 408 — Garage | Lights 7 (front yard) | — 304(19) |
| | Lights 8 (garage) | — 304(21) |
| | Garage door (garage) | — 304(22) |

| TRIGGERING EVENT | TRIGGERING CONDITION | RESULTING ACTIONS |
|---|---|---|
| Enter/leave geofence | Always | Change accessory state |
| Accessory state change | Time/Date | Read/report accessory state |
| Time/Date | Weather condition | Send message to someone |
| Weather event | Presence/absence of user(s) | Initiate action on controller |
| Notification event | Accessory state | |
| Presence/absence of user(s) | Location | |
| Absence of expected event | Historical trends | |
| Machine learning | | |
| Manual (user input) | | |

FIG. 5

| NAME | TRIGGERING EVENT | TRIGGERING CONDITION | ACTIONS |
|---|---|---|---|
| Coming Home | Geofence entered | After sunset | • Foyer light on<br>• Thermostat to 72° |
| Movie Watching | Manual | Always | • Kitchen light off<br>• Family room light dim<br>• TV on<br>• TV accesses movie list |
| Sleep | 10:00 pm | Weeknight | • Downstairs lights off<br>• Jack's room lights off<br>• Jill's room lights off<br>• Family room TV off<br>• Master bedroom play bedtime music |

FIG. 6

| USER | CONTROLLER DEVICES | PERMISSIONS |
|---|---|---|
| Dad | Coordinator Device | Full |
| | Laptop | |
| | Phone | |
| | Tablet | |
| Dad | Set-top box | Basic |
| Mom | Tablet | Home |
| | Phone | |
| Jill | Laptop | Basic |
| | Phone | |
| Jack | Phone | Basic |
| Sitter | Phone | Guest |

FIG. 8

ACCESSORY MANAGEMENT SYSTEM USING ENVIRONMENT MODEL

CROSS-REFERENCES TO RELATED APPLICATIONS

This application claims the benefit of U.S. Provisional Application No. 62/005,764, filed May 30, 2014, entitled "Networking, Communication and Security for an Accessory Management System," and also claims the benefit of U.S. Provisional Application No. 62/094,391, filed Dec. 19, 2014, entitled "Networking, Communication and Security for an Accessory Management System." The disclosures of both applications are incorporated by reference herein in their entirety.

This disclosure is also related to U.S. application Ser. No. 14/614,914, filed Feb. 5, 2015 and U.S. Provisional Application No. 61/935,967, filed Feb. 5, 2014, the disclosures of which are incorporated by reference herein in their entirety.

This disclosure is also related to U.S. application Ser. No 14/725,891 filed May 29, 2015, the disclosure of which is incorporated by reference herein in its entirety.

BACKGROUND

The present disclosure relates in general to an accessory management system and in particular to an accessory management system using an environment model.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc.

SUMMARY

At present, it can be difficult for a user to manage multiple electronically controllable devices or systems. For instance, a user's home might have a thermostat, an electronically controllable lighting system, a home security system, and so on. Each such system can be made by a different manufacturer, and each manufacturer may provide a dedicated controller device (e.g., IR-based remote control device) or a controller application program (or "app") that the user can install and run on a general-purpose device such as a smart phone, tablet, or home computer system. Each controller device or app is typically customized for a particular manufacturer's systems and may not be interoperable with systems from other manufacturers or even with other systems from the same manufacturer. Such a piecemeal approach is not readily scalable. A user seeking to create a "smart home" environment or the like, with an array of disparate devices that can be centrally controlled or managed, is confronted with the need to accumulate a plethora of controller devices and/or controller apps.

Certain embodiments of the present invention can operate in the context of protocols for communication between a controller device (or "controller") and any number of other electronic devices that are to be controlled (referred to herein as "accessory devices" or simply "accessories"). A controller can be implemented, for example, on a general-purpose computing device such as a desktop computer, laptop computer, tablet computer, smart phone, other mobile phone, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi, Bluetooth, Bluetooth LE, or the like. It is to be understood that other communication protocols and transports can be used.

In some embodiments, a "uniform" accessory protocol can be provided via which controllers can send command-and-control messages to the accessory and receive responses from the accessory in a uniform format, regardless of the type or functionality of the accessory. For instance, an accessory can be defined as a collection of services, with each service being defined as a set of characteristics, each of which has a defined value at any given time. These characteristics can represent various aspects of the accessory's state. The protocol can define message formats via which a controller can interrogate (e.g., by reading) and update (e.g., by writing) characteristics of an accessory (singly or in groups), thereby allowing the controller to determine and/or change the accessory's state. Accordingly, any type of accessory, regardless of function, can be controlled in a consistent manner.

In some embodiments, the protocol can define security measures that can be used to prevent unauthorized controllers from operating an accessory. For example, an accessory can be configured to accept requests only from a controller that has previously established a pairing with the accessory and is therefore recognized by the accessory. The protocol can specify the pairing procedures so as to minimize risk of a pairing occurring without approval of the accessory's rightful owner/operator. Further, the protocol can specify end-to-end message encryption such that only the particular controller and accessory can decrypt messages exchanged between them.

Certain aspects of the present invention may relate to controller networks, where multiple controllers can establish pairings with or otherwise be configured to communicate with the same accessory (or the same set of accessories, such as an accessory network). In some controller networks, one or more controllers can establish a level of privilege (e.g., an "admin" privilege) with an accessory that permits these controllers to determine whether other controllers should be granted permission to communicate command-and-control messages to the accessory. For instance, a first controller can establish a pairing with an accessory. Establishing the pairing can involve providing a long term public key of the first controller to the accessory and receiving in exchange a first long term public key for the accessory. Other operations (e.g., an out-of-band PIN or passcode exchange) can also be involved in establishing the pairing. Separately from any communication with the accessory, the first controller can obtain a long term public key for a second controller. The first controller can establish a verified session with the accessory using the first long term public key received during pair establishment. The verified session can have a session key, and all communication within the verified session can be encrypted using the session key. Within the verified session, the first controller can perform a pair add operation with the accessory to establish a pairing between the accessory and a second controller. The pair add operation can include providing the long term public key for the second controller to the accessory and receiving in exchange a second long term public key for the accessory (which might or might not be the same key received when the first controller established its pairing). The first controller can communicate the second long term public key for the accessory to the second controller. This process can establish a pairing between the second controller and the accessory; thereafter, the second controller can establish its own verified session to send command-and-control messages to the accessory. The first controller can repeat the pair add process to establish pairings between the accessory and any number of controllers.

In some instances, the first controller can instruct the accessory to grant an administrator (or "admin") privilege to the second controller. Granting this privilege can allow the second controller to perform pair add operations to add additional controllers if desired, and depending on implementation, the second controller might or might not be able to grant admin privilege to the additional controllers. The admin privilege can be automatically assigned to the first controller that establishes a pairing with a brand-new accessory (or with an accessory that has no established pairings). The use of an admin privilege can help device owners to regulate which controllers can obtain access to a particular accessory.

In some controller networks, one or more controllers can be operable as a proxy for communicating with an accessory. For example, the accessory may be configured to communicate only with controller devices that are physically present in a local environment (such as being on a local area network, which can be wired or wireless as desired, or being within range of a point-to-point wireless communication protocol such as Bluetooth). A controller device that is not physically present in the local environment can establish communication with another controller (a proxy device, or proxy) that is physically present in the local environment with the accessory, and the proxy can relay messages and responses between the remotely-located controller device and the accessory. The remotely-located controller and accessory can establish a pair-verified session and encrypt their communications; the proxy need not be able to read the messages and responses, only to relay them as-received. In some embodiments, a controller that is acting as a proxy for another controller may be required to establish its own pair-verified session with the accessory before the accessory will accept any messages relayed by the proxy. In some embodiments, the proxy and the other controller can also establish a pair-verified session between themselves, and this can provide further protection against unauthorized access.

In some embodiments, the controller can prefer direct communication when possible and use a proxy when the accessory is not directly reachable. For instance, after establishing a pairing with the accessory, the controller might receive a user input (or other input) requesting an interaction with the accessory (e.g., to check or change its state). In response to the input, the controller can determine whether the accessory is directly reachable, e.g., whether the controller and the accessory are on the same local area network. If so, then the controller can communicate directly with the accessory to establish a pair-verified session and exchange command-and-control messages. If the accessory is not directly reachable, the controller can attempt to identify a proxy that is reachable, e.g., through a local area network or wide area network. The accessory can establish communication with the proxy, then communicate with the accessory through the proxy.

In some embodiments, a proxy can be any controller that has established a pairing with the accessory and is present in the local environment of the accessory. A proxy can receive a request from a controller to communicate with the accessory. In response, the proxy can establish its own pair-verified session with the accessory. Messages received from the controller can be relayed to the accessory through the pair-verified session, and messages received from the accessory through the pair-verified session can be relayed to the controller. The proxy can be agnostic to the content of the messages it relays; thus, for instance, the controller and accessory can send encrypted messages using a key (e.g., their own pair-verified session key) that is not known to the proxy. The proxy can continue relaying messages until one or the other (or both) of the controller and the accessory send a message indicating that relaying can be discontinued. At that point, the proxy can end its verified session and discontinue relaying of messages.

A proxy of this kind can provide a relaying function that can extend the physical range of a controller network without requiring the accessories to be connected to a wide area network. Some proxies, referred to as coordinators, can provide additional functions rather than simply relaying messages. For example, a coordinator can mediate access to an accessory (or group of accessories such as an accessory network). The coordinator can establish a pairing with the accessory and can remain in the local environment with the accessory. Other controllers can establish a pairing with the coordinator in addition to or instead of establishing a pairing with the accessory. During a pair-verified session between a controller and the coordinator, the controller can send instructions to the coordinator to control the accessory. The coordinator can establish a pair-verified session with the accessory and provide corresponding command-and-control messages to the accessory. The coordinator can receive the responses from the accessory and send corresponding responses to the controller. In this configuration, the coordinator can read the controller's messages to the accessory and the accessory's responses to the controller. Access to the accessory can be controlled by controlling access to the coordinator. For example, the accessory may be configured to establish a pairing only with the coordinator. Further, in situations where multiple controllers may attempt to control the same accessory at the same time, the coordinator can coordinate their actions, e.g., implementing priority logic to resolve conflicting instructions, etc. In some embodiments, a coordinator can also enforce access restrictions on a per-controller or per-accessory basis. A coordinator is not required, but where a coordinator is present, some embodiments may require or prefer that communication with accessories proceed through a coordinator.

Certain aspects of the present invention may relate to accessory networks, where an accessory network can be a group of accessories that are commonly controlled by the same controller (or set of controllers such as a controller network). The accessory network can provide features and options to coordinate control of multiple accessories. For example, an environment model can be defined for the accessory network, with the accessories being assigned to locations in the environment model based on their physical locations. In some embodiments, the environment model can be a hierarchical representation of a physical environment (e.g., a home) that can include a lowest level of objects (e.g., rooms), with each accessory being assigned to one of the lowest-level objects (e.g., an accessory can be assigned to a room based on where it is installed or where it spends most of its time). The lowest-level objects can be grouped into higher-level objects (e.g., rooms can be grouped into zones within a home). Accessories in a network can be controlled individually or at any hierarchical level of the environment model (e.g., turning off all accessories in a particular room or zone). In addition to or instead of physically-based groupings, an environment model can also include other logical groupings of accessories such as "service groups" of accessories that are likely to be used together, and in some embodiments, accessories can be assigned to one physical grouping and any number (including zero) of logical groupings. In some embodiments, the environment model can also provide "action sets," in which a single triggering event or condition (e.g., a user command or a detectable occurrence such as a time of day) can result in invoking functions of a number of accessories in the network (e.g., turning off lights and locking doors when a user goes to bed).

The accessory network can be linked to a controller network, which can be a set of controllers that have permission to access all or part of the accessory network. For example, the accessory network model can include an access list that identifies controllers that have permission to access the accessory network. Different controllers can have different levels of permission. In some embodiments, the controller network can include a coordinator as described above, and the coordinator can manage access to specific accessories by specific controllers in accordance with the permissions scheme. Each controller that is linked to an accessory network can receive a copy of the accessory network model (e.g., through various synchronization and/or data-sharing operations). Some controllers may have permission to edit the accessory network model and/or to add or remove other controllers to or from the access list.

The following detailed description together with the accompanying drawings will provide a better understanding of the nature and advantages of the present invention.

BRIEF DESCRIPTION OF THE DRAWINGS

FIG. 4 shows a table showing examples of service groups that can be defined according to an embodiment of the present invention.

FIG. 5 shows a table listing options for defining action sets and triggers according to an embodiment of the present invention.

FIG. 6 shows a table listing examples of action sets that can be defined according to an embodiment of the present invention.

FIG. 8 is a table illustrating an access list for an environment model according to an embodiment of the present invention.

DETAILED DESCRIPTION

Example Environment

Figure 1:
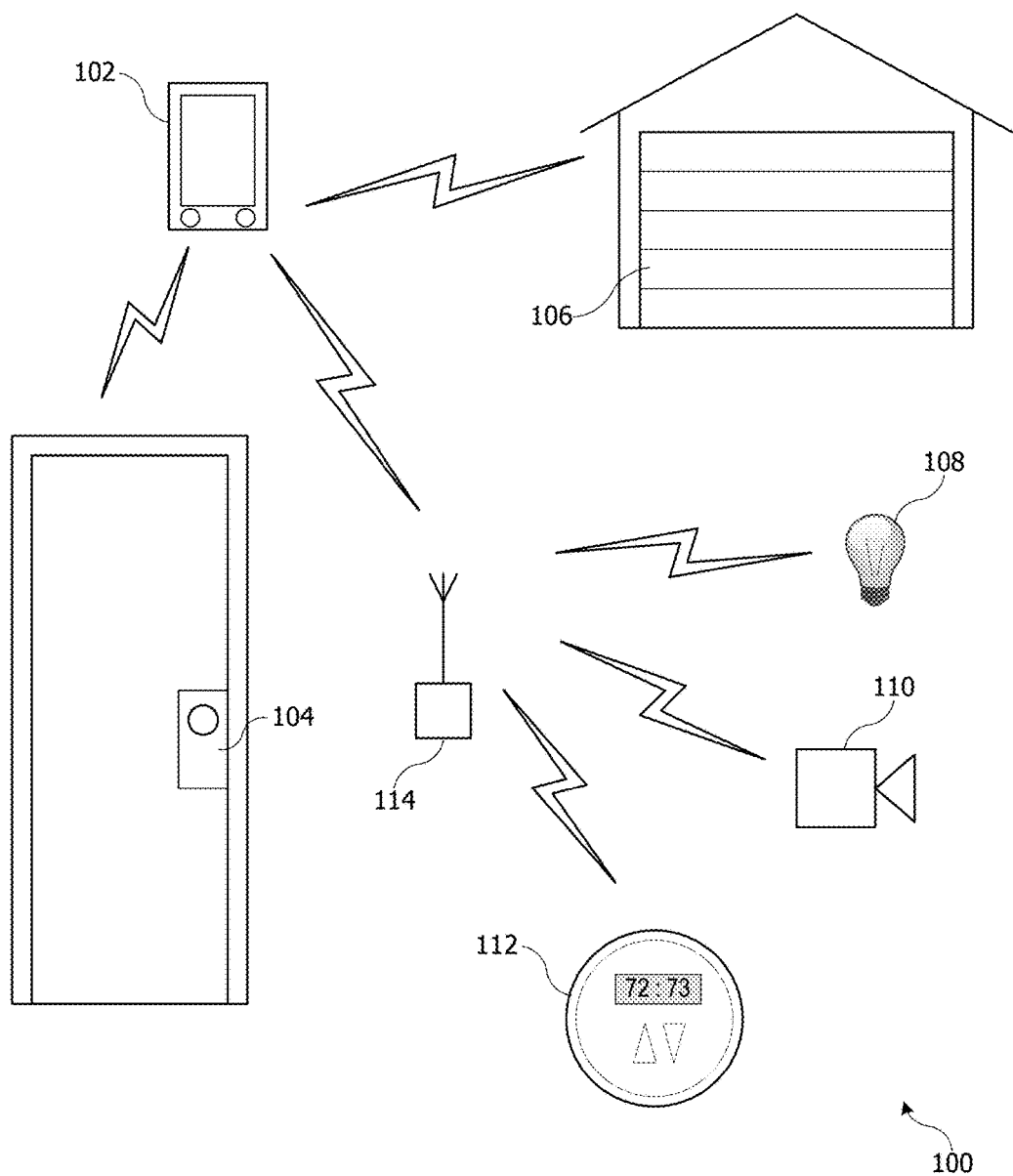
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. Provisional Application No. 61/935,967 and U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). In some embodiments, an intermediary can function as a proxy or coordinator as described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileged can be configured and controlled, for example, using techniques described below, and in above-referenced U.S. Provisional Application No. 62/005,764, U.S. Provisional Application No. 62/094,391, and U.S. application Ser. No. 14/725,891.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in above-referenced U.S. Provisional Application No. 61/935,967 and U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. Provisional Application No. 61/935,967 and U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. Provisional Application No. 61/935,967 and U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. Provisional Application No. 61/935,967 and U.S. application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

Figure 2:
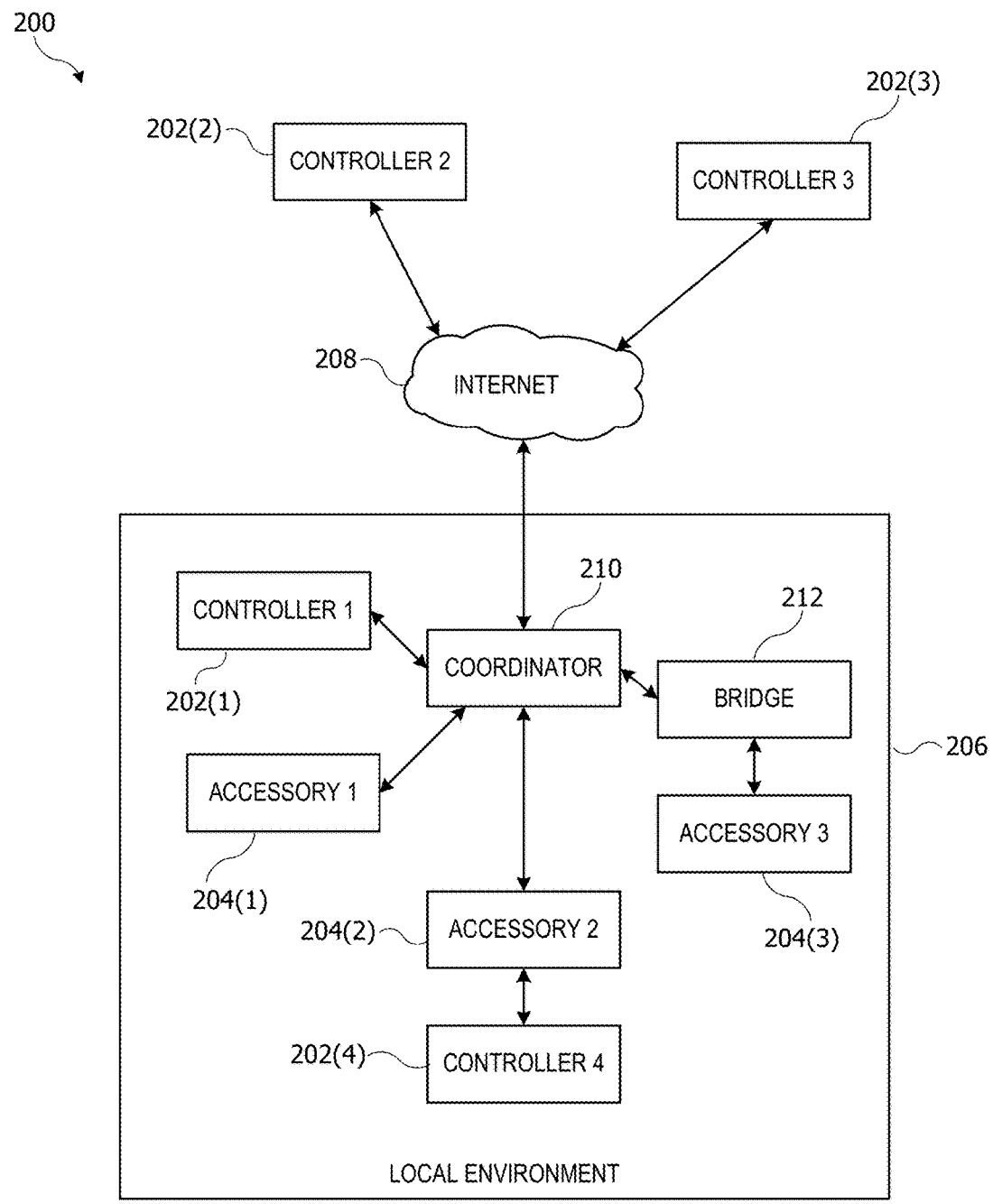
FIG. 2 shows on example of a controller network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment) a via a coordinator 210. Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

Accessories 204 can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can be any device that is capable of presenting itself as a controller to accessories 204 and that is capable of communicating securely with controllers 202. In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement base station functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208. In some embodiments, coordinator 210 can be connected to communication network 208 and can permit remote access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204(3). Examples of proxies, bridges, and tunnels are described in above-referenced U.S. Provisional Application No. 62/005,764, U.S. Provisional Application No. 62/094,391, and U.S. application Ser. No. 14/725,891.

In network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator assumes the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can maintain an environment model for the accessory network and can provide the model (or portions thereof) to various controllers 202; examples of an environment model are described below. Controllers 202 can operate accessories 204 by interacting with coordinator 210.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202 (1) is established, a user can use controller 202(1) to lock or unlock accessory 204(1) via direct communication, thereby locking or unlocking the door. This can be useful, e.g., in the event that coordinator 210 is temporarily unavailable. In some embodiments, coordinator 210 can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis.

Coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204 to coordinator 210 via the first pair-verified session. Coordinator 210 can receive the instructions, establish a second pair-verified session with accessory 204 and send appropriate control messages to accessory 204 via the second pair-verified session. In some embodiments, coordinator 210 can be privy to the content of the instructions, and in some embodiments, the messages sent to accessory 204 need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204 to coordinator 210. Coordinator 210 can analyze the received instructions, e.g., to detect and resolve conflicts such as where controller 202(1) instructs coordinator 210 to turn accessory 204 on while controller 202(2) instructs coordinator 210 to turn accessory 204 off. Coordinator 210 can be programmed with priority rules or other rules for resolving conflicts (e.g., "on" takes priority over "off"; instructions from a controller with admin privilege take precedence over instructions from a controller without admin privilege; etc.). Coordinator 210 can apply the priority rules to resolve any conflicts and can communicate instructions to accessory 204 based on the resolution. When a response is received from accessory 204, coordinator 210 can determine whether to send a corresponding message (or a different message) to controller 202(1) and/or to controller 202(2). As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

Example Accessory Networks with Coordinated Control

As noted above, coordinator 210 can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory is connected to one or more controllers, and accessories can be controlled by sending messages, e.g., as described in above-referenced U.S. Provisional Application No. 61/935, 967 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present invention can provide environment models usable to coordinate control across multiple accessories in an accessory network.

Figure 3:
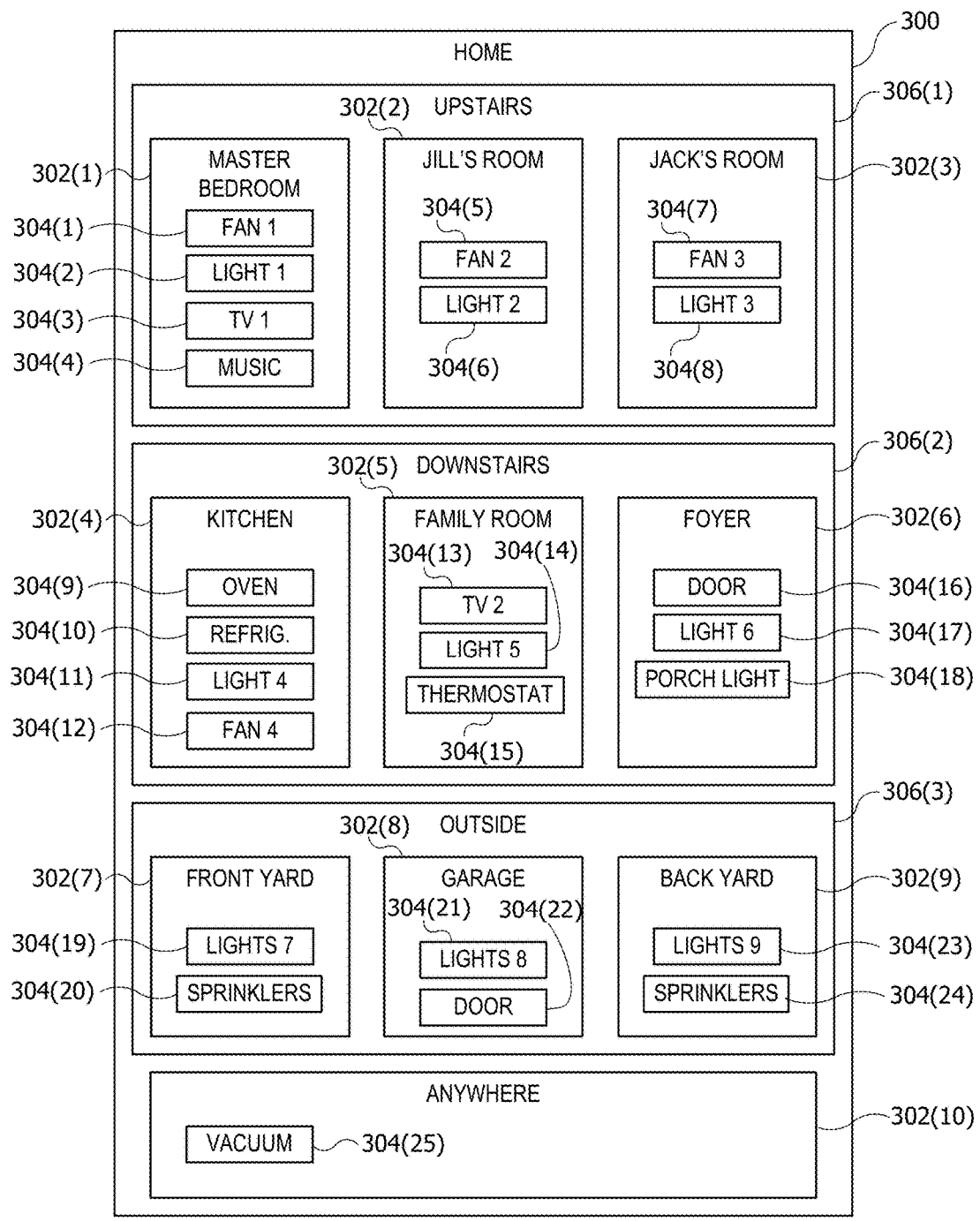
FIG. 3 shows an example of an environment model for an accessory network according to an embodiment of the present invention.

FIG. 3 shows an example of an environment model 300 for a "Home" environment according to an embodiment of the present invention. Home environment model 300 can be based on the physical layout of the user's home. For instance, a home typically includes a number of rooms, and each room can be represented in Home environment model 300 as a "room" element 302(1)-302(10). In this example, room elements 302 can include elements that do not correspond literally to rooms in a house, such as "front yard" 302(7) and "back yard" 302(9). Further, room elements 302 can also include an "Anywhere" element 302(10), which can be used to refer to accessories that are present in the home but whose location within the home is subject to change or has not been defined as a room.

Each accessory 304(1)-304(24) can be assigned to one of room elements 302, depending on where within the home the accessory is generally located. Thus, for example, a "master bedroom" room element 302(1) might include a fan 304(1), a light 304(2), a TV 304(3), and a music system 304(4). A "kitchen" room element 302(4) might include an oven 304(9), a refrigerator 304(10), a light 304(11), and a fan 304(12). Similarly, other room elements 302 can include other accessories that might be found in those locations, with front yard room element 302(7) and back yard room element 302(9) including accessories found outside, such as yard lights 304(19), 304(23) and sprinkler systems 304(20), 304 (24). Anywhere element 302(10) can include accessories that tend to be moved around the house, such as vacuum cleaner 304(25) or accessories located in an area that the user responsible for maintaining environment model 300 has not defined as a room (e.g., a closet located in a hallway or the like).

Further, it can be useful to group room elements 302 into "zone" elements 306(1)-306(3), reflecting the arrangement of rooms within a home. For example, in a house where the bedrooms are upstairs and common areas are downstairs, "upstairs" zone element 306(1) can include master bedroom element 302(1), Jill's room element 302(2), and Jack's room element 302(3), while downstairs zone element 306(2) can include kitchen room element 302(4), family room room element 302(5), and foyer room element 302(6). Anywhere element 302(10) can be in its own zone or not assigned to any zone. It is not required that every room be assigned to a zone.

Home environment model 300 can provide a flexible framework for organizing and grouping accessories as a user desires, and the example shown in FIG. 3 is not intended to be limiting in any respect. For example, the user can define as many or few room elements 302 as desired and can assign any accessory 304 to any room element 302, with no limit as to the number or combinations of accessories that can be assigned to a room. Anywhere element 302(10) can be a predefined element that is always provided in the model, although the user is not required to assign any accessories 304 to it. Similarly, the user can define as many or few zone elements 306 as desired; the zones can correspond to a physical arrangement of rooms or a logical grouping, and multiple sets of zones can coexist and overlap. For instance, in addition to or instead of "upstairs" and "downstairs" zones, zone elements 306 can be defined for "sleeping" areas and "active" areas. In a smaller home (e.g., studio or one-bedroom apartment), a user might not find it useful to define zones at all, and the use of zone elements can be optional. For larger homes or other large environments, more levels of structure in addition to rooms and zones might be desirable (e.g., a "wing" could have upstairs and downstairs zones), and model 300 can be adapted accordingly.

In some embodiments, accessories 304 in home environment model 300 can be controlled individually, or at the level of rooms, zones, or the whole house. For instance, a user might instruct coordinator 210 of FIG. 2 to turn on all outside lights, affecting lights 304(19), 304(21), and 304 (23), which are in "outside" zone element 306(3). Or a user might instruct coordinator 210 to turn off all accessories in Jack's room 302(3), affecting Jack's light 304(18) and fan 304(7).

In some instances, a user may want to coordinate control of accessories that may be assigned to a different rooms or zones. Accordingly, in some embodiments, a user can augment environment model 300 by grouping various accessories into "service groups." FIG. 4 is a table 400 showing examples of service groups that can be defined according to an embodiment of the present invention. Service groups can coexist with environment model 300, and a single service group can include accessories in any combination of rooms or zones. For instance, an accessory 304 can be assigned both to a room (which can be in one or more zones) and to one or more service groups. Shown by way of illustration are a "security lights" service group 402, a "ventilation" service group 404, a "cooking" service group 406, and a "garage" service group 408. Security lights group 402 can include front yard lights 304(19), back yard lights 304(21), porch light 304(18), and kitchen light 304(11). As shown in FIG. 3, these accessories are assigned to four different rooms in two different zones, but a user can issue an instruction to security lights group 402 to turn on all the lights in the group. Similarly, ventilation group 404 can include all fans in the home, regardless of room or zone.

Accessories in a service group can be heterogeneous; for example, cooking group 406 can include various accessories that the user likes to have turned on while cooking, including kitchen light 304(11), kitchen fan 304(12), and the family-room TV 304(13). Garage service group 408 can include front-yard lights 304(19), garage lights 304(21), and garage door 304(22). It should also be noted that one accessory can be assigned to multiple service groups; for instance, kitchen fan 304(12) is in both ventilation service group 404 and cooking service group 406.

In some embodiments, a user can instruct a controller to set the state of an entire service group, e.g., to turn the group on or off. The controller can send a corresponding write message to each accessory that has a characteristic corresponding to the state change. For instance, the user might instruct a controller to turn on (or off) garage service group 408. The controller can determine that front-yard lights 304(19) and garage lights 304(21) have an "on" characteristic and can therefore be turned on (or off), but garage door 304(22) does not have an "on" characteristic. Accordingly, the controller can send a write request to front-yard lights 304(19) and garage lights 304(21) to write to the "on" characteristic, but not to garage door 304(22).

While not required, the use of service groups can provide another degree of flexibility in coordinating control over multiple accessories.

Another model for coordinated control of multiple accessories can be based on an "action set." An action set can define a set of actions to be taken upon occurrence of a "trigger." In some embodiments, triggering an action set can occur in two stages. At a first stage, a "triggering event" is detected at a controller (e.g., any of controllers 202 described above) or a coordinator (e.g., coordinator 210 described above). In response to detecting the triggering event, the controller 202 (or coordinator 210) that detects the event can test whether a "triggering condition" is satisfied. If so, then one or more "resulting actions" can be performed.

Accordingly, a user can define an action set by specifying a triggering event, a triggering condition, and one or more resulting actions.

FIG. 5 shows a table 500 listing options for defining action sets and triggers according to an embodiment of the present invention. Column 502 lists examples of triggering events. As used herein, a triggering event can be any occurrence that is detectable by a controller (e.g., any of controllers 202 described above) or a coordinator (e.g., coordinator 210 described above). Column 502 lists categories of detectable triggering events. A "geofence" can be defined relative to the location of local environment 206, e.g., within half a mile, within 1000 feet, etc. Controllers 202 (or other user devices) that have the ability to determine their location (e.g., using Global Positioning Service (GPS) receivers or the like) can detect when they enter or leave the geofence. In some embodiments, controller 202 can test for a triggering condition in response to detecting that it has entered or left the geofence; additionally or instead, controller 202 can report the event to coordinator 210, which can test for triggering conditions. In some embodiments, more fine-grained geographic triggering events can be supported, such as detecting when a user enters or leaves a particular room within the home.

An accessory state change event can be detected when a controller or coordinator receives notification of the state change from the accessory. State-change notifications by an accessory to a controller can be implemented in a uniform accessory protocol, e.g., as described in above-referenced U.S. Provisional Application No. 61/935,967 and U.S. application Ser. No. 14/614,914. (It should be understood that since coordinator 210 can operate as a controller in relation to accessory 204, coordinator 210 can receive state-change notifications from accessories in the same manner as other controllers.)

A time/date event can be an event defined by reference to clocks and/or calendars. Examples of time/date events can include "daily at 10:00 pm," "Saturday at 8:00 am," and so on. Any controller or coordinator that has access to clock and/or calendar data to determine the current time and/or date can detect when a time/date event occurs.

A "weather" event can be tied to external conditions that may change daily. Examples of weather events include sunrise and sunset, which can happen at different times depending on the date and location. Other examples include an outside temperature exceeding or falling below a threshold, rain starting or stopping, barometric pressure changes, wind speed reaching a threshold value, ambient light levels above or below a threshold, seismic activity, 6 or the like. A controller or coordinator can detect weather events using various techniques. For example, a controller or coordinator can periodically poll an online weather service or the like to retrieve weather data. Alternatively, weather sensors (e.g., thermometer, anemometer, barometer, light sensor) can be installed outside the home, and weather data can be retrieved from the sensors. Sunrise and sunset times, which are variable with location and date but much more predictable in their variations than most weather events, can be calculated based on the location of the home and the calendar date or obtained from an online service.

A "notification" event can include any type of electronic message signal that is generated at a source and receivable by a coordinator or controller, regardless of source. For instance, a coordinator or controller may be able to receive emergency broadcast messages (e.g., tornado warning, tsunami warning, seismic activity alerts). As another example, a coordinator may receive notifications from one of the controllers associated with the home (e.g., a notification that the schedule of the controller's user has changed); in some embodiments, such notifications can be generated by a controller that is temporarily absent from the local environment. As yet another example, a coordinator may receive notifications from a coordinator in a different local environment (e.g., a neighbor's home, assuming the neighbor has authorized the sharing of notifications); such a notification can include, e.g., weather-related information based on weather sensors the neighbor has installed, security information (such as detecting a possible break-in or suspicious activity), or the like.

Presence or absence of users can be determined using presence sensors in the home and/or by the presence or absence of particular user devices that each user generally carries on his or her person. For instance, coordinator 210 can detect which controllers 202 are present in local environment 206 and can infer presence or absence of the users of controllers 202 accordingly.

In some embodiments, absence of an expected event can itself be detected as a triggering event. For instance, if a user normally arrives home by 6:00 pm, the continued absence of the user at a later time (e.g., 8:00 pm or 10:00 pm) can be detected as a triggering event.

In some embodiments, machine learning can be used to define triggering events, e.g., based on analysis of the users' behavior across time. Such analysis can be performed, e.g., by coordinator 210 and may be arbitrarily complex. For instance, coordinator 210 can observe user interactions with various accessories and detect a pattern, such as "the user turns off the automatic sprinklers if it rains for longer than 10 minutes." Based on this pattern, coordinator 210 can define "raining for longer than 10 minutes" as a triggering event.

Manual user input can also be a triggering event. For instance, the user can expressly instruct a controller to initiate a specific action set.

When a triggering event is detected, the controller or coordinator that detects the triggering event can test one or more triggering conditions associated with the triggering event. In some embodiments, a controller that detects a triggering event can report the event to the coordinator, and the coordinator can test the triggering condition(s). Column 504 lists categories of testable triggering conditions.

In some embodiments, the "always" condition indicates that resulting actions should be executed whenever the triggering event is detected. For instance, an action set defined with a manual triggering event can have the triggering condition defined as "always," with the result that the user can invoke the action set manually at any time. Triggering conditions based on time/date, weather conditions, and presence/absence of user(s) can be defined similarly to the corresponding categories of triggering events. Thus, for example, detection of a weather event can result in testing a time/date condition to determine whether to execute resulting actions.

Accessory state triggering conditions can be based on the current state of the accessory at the time of the triggering event. For example, in response to detecting a triggering event, a controller or coordinator that detects the triggering event can send a read request to a particular accessory to determine its state. Thus, for example, a triggering event can be a state change of one accessory (e.g., a front door changes from unlocked to lock state) and the triggering condition can be based on the state of another accessory (e.g., whether the garage door is locked).

Location conditions can be based on the location of the controller that detected the event and/or the location of another user (or the other user's device). For example, a triggering event might be sunset, and the triggering condition can be that the user is not at home; the resulting action can be to turn on a porch light.

Historical trends can be determined from machine learning. For instance, if the user normally turns on certain lights upon arriving at home, a triggering condition can be based on whether those lights are on when the triggering event of the user entering a geofence around the home occurs.

Column 506 lists examples of categories of "resulting actions" that can be implemented in response to a triggering condition being satisfied. One category pertains to changing an accessory's state. For example, a controller or coordinator that detects a triggering event can test the triggering condition associated with the triggering event. If the condition is satisfied, the controller or coordinator can issue one or more write requests to one or more accessories to change their state. Thus, for example, an action set can be defined as: "When front door changes state from unlocked to locked (triggering event), check state of garage door; if garage door is not locked (triggering condition), then lock garage door." Detecting the state change of the front door can be based on a notification from the front-door accessory. Checking the state of the garage door can be done by sending a read request to the garage door accessory, and locking the garage door can be done by sending a write request to the garage door accessory.

Another category pertains to reading and reporting an accessory's state. For example, if a triggering condition is satisfied, the controller or coordinator can issue one or more read requests to one or more accessories to determine their state and can notify the user of the same (e.g., through a pop-up notification or push notification on the user's device). Thus, for example, assuming that a window in a home can be operated as an accessory, an action set can be defined as "When it starts raining (triggering event), determine whether the user is home; if the user is not home (triggering condition), read the state of the window and report the state to the user." The user then may be able to remotely close the window.

In some embodiments, the resulting actions can include actions other than interacting with an accessory. For instance, as described above, a controller can be implemented on a smart phone or other device that may support other functions in addition to communicating with accessories. In some embodiments, in response to detecting a triggering condition, the controller can invoke other functions of the device. For instance, the controller may invoke a messaging function of the device (e.g., email, SMS) to send a message to someone. The controller may also launch application programs on the device (e.g., a music playing program). Thus, for example, an action set can be defined as "When the user arrives home (triggering event), if a speaker system is not playing music (triggering condition), launch a music app and connect it to the speaker system (resulting action)."

As these examples show, the general form of a triggered action set can be "When (triggering event) occurs, check (triggering condition); if (triggering condition) is true, then execute (resulting actions)." A user can define an action set by specifying the triggering event, triggering condition, and resulting action from the categories of table 500 or other categories as desired. In various embodiments, the triggering events and/or triggering conditions can be defined with any degree of complexity (e.g., "If it is after dark and not a Tuesday and no users are home, then . . . "). Any number of resulting actions can be triggered by the same triggering event and/or triggering condition.

As a further illustration, FIG. 6 shows a table 600 listing examples of action sets that can be defined according to an embodiment of the present invention. Each action set can have a user-assigned (or system-assigned) name 602, a triggering event 604, a triggering condition 606, and one or more resulting actions 608 to be taken (e.g., by sending control messages to accessories). While three examples are shown, any number of action sets can be defined, and some action sets can have multiple triggers (e.g., different combinations of triggering events and triggering conditions can trigger the same set of resulting actions). In some instances, some action sets can be predefined by a provider of the accessory management system, and a user can customize the predefined action sets or add others as desired.

For example, "coming home" action set 610 can be triggered based on a geofence triggering event, such as when a controller (e.g., controller 202(2) of FIG. 2) enters within a certain radius of the home (e.g., half a mile or 1000 feet or the like). The location of controller 202(2) can be determined using an onboard GPS system or the like, and controller 202(2) can send a message to coordinator 210 when its location crosses within the defined geofence, informing coordinator 210 that the triggering event has been satisfied. The triggering condition can be that the time is after sunset. The "coming home" actions can include, e.g., turning on light 304(17) in foyer 302(6), setting thermostat 304(15) to a desired temperature, and/or other actions as desired. Upon receiving the message that controller 202(2) has crossed into the geofence, coordinator 210 can determine whether the current time is after sunset, and if so, coordinator 210 can send control messages to effect the actions. In some embodiments, controller 202(2) can send the control messages to the accessories either directly or through a proxy or other intermediary as desired, and use of coordinator 210 is not required. [0088]"Movie watching" action set 612 can be triggered manually, i.e., by an express user instruction. For instance, a user can select "movie watching" from an activity list presented by a controller, or say a designated phrase such as "start movie-watching" to a voice-control interface of a controller. In this case, the triggering condition is "always," so that movie-watching actions are performed whenever the user inputs the appropriate instruction. Actions to be performed in response to the triggering event can include turning off light 304(11) in kitchen 302(4), dimming light 304(14) in family room 304(5), turning on TV 304(13) in family room 304(5), and invoking a movie-selection interface of TV 304(13). The movie-selection interface can be, for example, a selection menu to select locally stored movies or movies available from a streaming media source to which TV 304(13) is connected. In the latter case, invoking the movie selection interface can include instructing TV 304(13) to connect to the streaming media source and obtain information about available movies. (It is to be understood that any type of video content can be treated as a "movie" in this context.)

"Sleep" action set 614 can be triggered at a particular time each day, e.g., 10 pm or some other time when residents of the home normally go to bed. In this example, the triggering event is set to 10 pm and the triggering condition is set to "weeknight" (which can be defined to refer to Sunday through Thursday nights); accordingly, the "sleep" action set would not automatically be triggered at 10 pm on Friday or Saturday nights. Examples of sleep actions can include turning off all lights in downstairs zone 306(2), in Jill's room 302(2), and in Jack's room 302(4); turning off TV 304(13); dimming lights in master bedroom 302(1); and starting playback of a "bedtime" music playlist on music player 304(4). Other actions can also be included.

In some embodiments, action sets with an automatic trigger can also be triggered manually, for instance by the user speaking a command to a voice-control interface of a controller, selecting an action set from a graphical user interface of a controller, performing a gestured detected by a gesture-based controller, or the like. In some embodiments, some or all action sets can have "colloquial" voice commands defined; for instance, the user might be able to say something like, "Good night, home," to invoke sleep action set 614. Where the user invokes an action set manually, triggering events and conditions need not be tested.

The examples in FIG. 6 are merely illustrations. Other action sets and triggers are possible. As described above, in some instances, a triggering event can be based on a state change in some accessory. For example, suppose that a household has a sprinkler system and a dishwasher, and it is desirable to run the sprinklers after the dishwasher has finished. An action set to start the sprinklers can be triggered by a state change in the dishwasher from "cycle in progress" to "cycle complete" or the like. A coordinator or other controller can monitor one accessory to detect state changes (notification processes and other examples of controllers detecting accessory state changes are described in above-referenced U.S. Provisional Application No. 61/935,967 and U.S. application Ser. No. 14/614,914) and can automatically send messages to another accessory when a particular state change is detected.

It should be understood that in any instance where the user is controlling a coordinated group of accessories (e.g., within a room, zone, or service group, or using an action set), accessory control can be effected by sending individual messages to each accessory in the group, using a pair-verified session between a controller and that accessory. Depending on implementation, the controller can be the controller operated by the user (if it communicates directly with the accessories being controlled), or it can be a coordinator such as coordinator 210 of FIG. 2. In the latter case, the user's controller can issue instructions to the coordinator at the granularity of the group being controlled (e.g., "turn on security lights group"), and the coordinator can use table 400 or similar data structures to determine which accessories should receive control messages. Similarly, the user's controller can issue an instruction such as "execute movie watching action set" to a coordinator, and the coordinator can use table 600 or similar data structures to determine which accessories should receive control messages.

In some embodiments, users can define multiple action sets with various triggering events and/or triggering conditions. Where an accessory state change can be a triggering event for an action set, it is possible that execution of one action set may trigger execution of another action set. This can result in conflicting or "inconsistent" action sets. For example, a first action set may include a resulting action that triggers a second action set, which may undo an effect of the first action set, or execution of the second action set may retrigger the first action set (potentially leading to a loop where the action sets are performed repeatedly).

To avoid conflicts, some embodiments may provide "consistency checking" logic (e.g., within a controller device) that determines whether a newly-defined triggered action set conflicts with any previously-defined triggered action set. For example, the controller device can access, as part of the environment model, a list of existing triggered action sets. When the user operates an interface of the controller device to define a new triggered action set, the controller device can perform consistency checking. If the consistency check fails, the controller device can decline to add the new triggered action set to the list of existing triggered action sets. The user can be informed of the specific reason for declining and can correct the problem, thereby allowing the new triggered action set to be added.

Various consistency checks can be implemented. For example, the controller device can determine whether the triggering event or triggering condition for the new triggered action set corresponds to a resulting action of an existing triggered action set. If not, then the new action set can be deemed consistent and added to the list of existing triggered action sets. If the triggering event or triggering condition for the new triggered action set does correspond to a resulting action of an existing triggered action set, then the controller device can determine whether performing the resulting actions of the new triggered action set will trigger any existing action set. Based on that determination, the controller device can trace the effect of those resulting actions on other existing triggered action sets, thus constructing a chain of triggered action sets; the chain can end when the controller identifies a triggered action set whose resulting actions do not trigger any other triggered action set. A chain can also be constructed in the reverse direction, e.g., by determining whether the resulting action of the new triggered action set corresponds to a triggering event or triggering condition for an existing triggered action set. When a chain of triggered action sets is constructed, inconsistencies can be detected across any number of links in the chain (e.g., performing action set A triggers action set B, which triggers action set C, which triggers action set A again). In some embodiments, the controller device can also determine whether a new triggered action set is "internally inconsistent," e.g., whether the resulting actions include the triggering event. For purposes of consistency checking, manually-triggered action sets can be ignored, since the user can break the "chain" by not performing the manual trigger.

Using an appropriate interface, a user can create an environment model (e.g., home environment model 300 of FIG. 3) and add accessories to it. The user can also modify the environment, model e.g., by moving accessories to different rooms, defining new rooms, zones, and/or service groups, etc. An application program executing on a controller (which can be coordinator 210 or any of controllers 202 of FIG. 2) can provide user interface screens or other user interfaces operable to manage the environment, and instructions received via the user interface can be interpreted as changes to the environment model. Specific examples of user interfaces are described below. The controller can save a copy of the environment model periodically (e.g., as changes are made and/or in response to an express instruction from a user to save changes).

Figure 7:
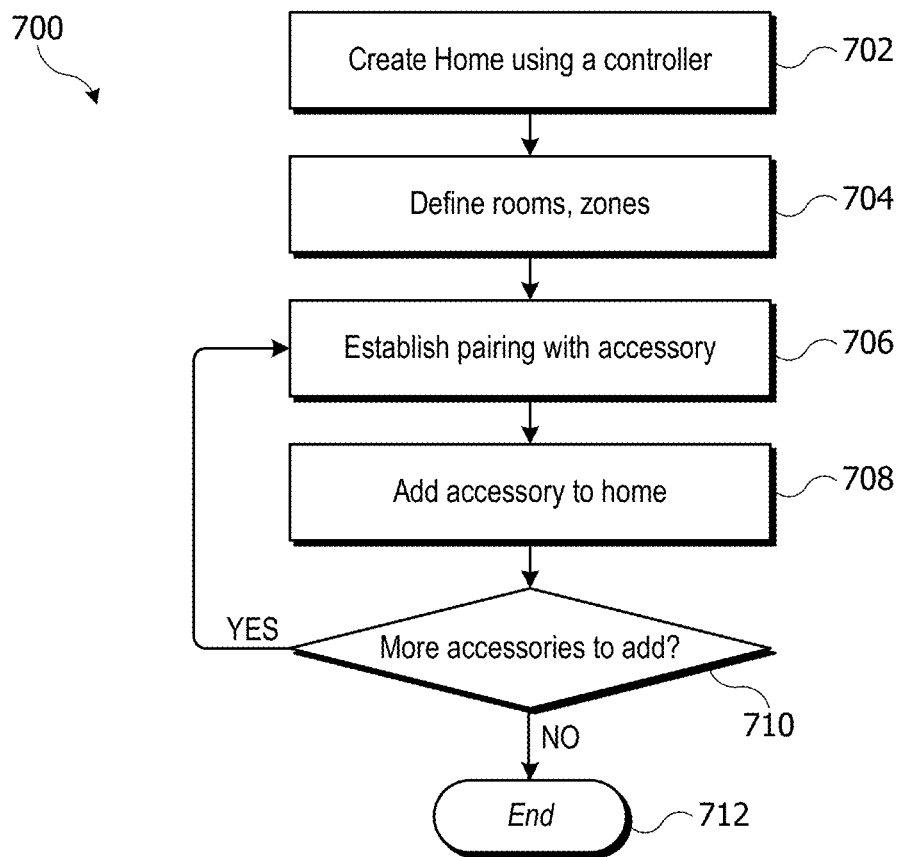
FIG. 7 is a flow diagram of a process for setting up an environment model according to an embodiment of the present invention.

FIG. 7 is a flow diagram 700 of a process for setting up a home environment according to an embodiment of the present invention. Process 700 can be implemented, e.g., in a controller (any of controllers 202 or coordinator 210 of FIG. 2) executing an appropriate application program. In some embodiments, process 700 can be used only when the controller on which it is executing is in the local environment of the home.

At block 702, the user can create a new home environment model, e.g., by invoking a "new environment" function of the controller. The environment model can be initialized based on environment 300 of FIG. 3, with a default configuration of rooms and zones. For instance, the default might be to provide a generic "Room 1" located in a generic "Zone 1," or just an "Anywhere" room that is not assigned to a zone. At block 704, the user can define rooms and zones based on his particular home. For instance, the user can rename the generic room(s) and zone(s), add new rooms, add new zones, place rooms within zones, etc.

Once at least one room is defined (by default or via user input), the user can add accessories to the environment model. For example, at block 706, the user can establish a pairing (e.g., by performing pair setup or pair add as described above) with an accessory that is located somewhere in the home. In some embodiments where accessories communicate through a coordinator, if the user is not interacting directly with coordinator 210, block 706 can include communicating to coordinator 210 so that coordinator 210 establishes a pairing with the accessory. When the pairing has been established, the user can add the accessory to the home at block 708. Block 708 can include, e.g., the user specifying a room assignment for the accessory. In some embodiments, the room assignment can default to the same room as the last accessory that was added, to the Anywhere room, or to some other default room. At block 710, the user can add another accessory (returning to block 706) or end the process (block 712). A user who ends process 700 can return to it later to add additional accessories. Process 700 can be augmented with other blocks allowing the user to modify the environment model, e.g., by adding or removing rooms or zones, moving rooms between zones, moving accessories between rooms, defining services groups and/or action sets, etc.

Process 700 can be modified as desired, and the order of operations can be varied, and operations can be repeated. For example, in some embodiments, a controller can establish pairings with one or more accessories prior to creating an environment model. When an environment model is subsequently created, the controller can add the accessories to the environment model, either automatically or based on user input. As another example, a controller can establish pairings with a number of accessories, then add all the paired accessories to the environment model in a single operation. Other modifications are also possible.

It will be appreciated that the accessory network and environment models described herein are illustrative and that variations and modifications are possible. Environment models are not limited to home environments but can be extended to any type of environment where accessories may be present (office buildings, schools, multi-building campus, public infrastructure of a city, etc.). Particular processes and user interfaces for defining and modifying environment models, and for adding accessories to an environment model, can be implemented as desired. Examples are described below.

Example Synchronization Techniques

It is contemplated that multiple users can share access to an environment and its accessories. For instance all residents of a home can have access to the home environment and accessories present therein. It is also contemplated that a single user may have multiple devices that he or she wants to use to operate accessories in the environment. Accordingly, it can be desirable for multiple users to be able to access and/or modify an environment model, as well as controlling the accessories. For instance, if one user adds an accessory to the environment, it may be desirable for other users who frequent the environment to see that accessory when interacting with the environment model on their devices.

Accordingly, it can be useful to maintain an access list in association with an environment model. The access list can identify individual users and/or devices that are permitted to access and/or modify the environment model (including any accessories present in the model). The access list can also indicate the type of permissions (e.g., view and/or edit) granted to each user.

FIG. 8 is a table 800 that provides an access list for an environment model according to an embodiment of the present invention. For purposes of illustration, it is assumed that table 800 is associated with home environment model 300 of FIG. 3 and that the home thus modeled is the residence of four individuals: "Mom," "Dad," "Jill," and "Jack." It is assumed that Mom and Dad are adults, while Jill and Jack are minor children. It is also assumed that others may sometimes need access to home environment model 300. For example, "Sitter" can be a person hired to watch the children while the adults are away. For each person (user) with access to the environment, table 800 can list a user identifier (field 802), controller devices belonging to that user (field 804), and permissions granted to that user (field 806). As shown, a user can have any number of devices. (Dad has five, Mom and Jill each have two, Jack and Sitter each have one.) In this example, permissions can be granted per user rather than just per device, so that a user's experience can be consistent across devices. Per-device permissions can also be implemented if desired, and a combination of per-user and per-device permissions can be supported. For example, a user with full access permissions (e.g., Dad in FIG. 8) may have a device that is shared with other users, such as a set-top box for a TV (which might be used by the entire family), and Dad may not want other users to have full access to the environment model when they use the set-top box. Accordingly, as shown in FIG. 8, the set-top box can have different permissions from Dad's other devices.

In some embodiments, a user identifier can be any name or other identifier that the user consistently uses with his or her controller devices. For example, in some embodiments, all of a user's controller devices might be linked to a cloud-based data service where the user maintains an account. Via the user's account, the cloud-based data service can provide data storage and retrieval for the user's devices. In some embodiments, the cloud-based data service can also provide device management services such as synchronizing data across a user's devices (assuming all devices are linked to the same user account), updating device firmware, providing access to application programs executable on the device (and updates to such programs), and so on. Where controller devices are linked to a cloud-based data service, the user identifier 802 can be the username (or other user ID) used to access the cloud-based data service. This can provide for a convenient system of globally unique user names.

As shown in table 800, each user can be assigned a permission level. In this example, three permission levels are defined. A user with "full" permission can control accessories in environment model 300, modify environment model 300, and add or remove users from access table 800. A user with "home" permission can control accessories in environment model 300 and modify environment model 300, but cannot add or remove users. A user with "basic" permission can control accessories in environment model 300 but cannot change the model or add or remove users.

A user with "guest" permission can have more restricted access. For example, guest permissions can set limits as to which accessories can be controlled, when the accessories can be controlled, etc., and different levels of "guest" permission can be defined with different combinations of limits on access. Thus, for example, user Sitter may have access to all accessories but only during hours when Sitter is expected to be watching the children. Another user, such as a gardener, might have access only to accessories in outside zone 306(3), allowing the gardener access to gardening tools kept in the garage and to the sprinkler systems, but not to the interior of the house. Guest permissions or other forms of restricted access can support fine-grained control of access to accessories in environment model 300. Restrictions can be based on specific accessories, rooms, or zones; time constraints (e.g., specific hours during the day, days of a week, or a date range); usage constraints (e.g., a limit on the number of hours the user can operate the TV per day or per week); whether the controller attempting access is in the local environment or remote from it; and so on.

In some embodiments, permission levels related to adding and removing users can be independent of permission levels related to modifying the environment model. For instance, one user might be permitted to do both, while another user is permitted to modify the environment model but not to add or remove users. It should be noted that the permission levels associated with an environment model can be independent of the privilege levels associated with a specific accessory (e.g., admin and user privileges as described in above-referenced U.S. Provisional Application No. 62/005,764. U.S. Provisional Application No. 62/094,391, and U.S. application Ser. No. 14/725,891, and in some embodiments, an accessory cannot be controlled except by a controller with the appropriate privilege, regardless of any permissions that might be established in table 800. For instance only a coordinator device might have privilege to operate a particular accessory; other controllers with appropriate permissions can operate the accessory indirectly, by communicating with the coordinator.

In some embodiments where users control accessories by interacting with a coordinator (e.g., coordinator 210 of FIG. 2), coordinator 210 can consult table 800 to determine whether a user has permission to perform a requested operation (e.g., controlling a particular accessory) and can communicate control messages to the accessory only if the user has permission. Where interaction with accessories in environment 300 is mediated through coordinator 210, it is assumed that coordinator 210 has privilege to control all accessories in environment 300, and the accessory might or might not know which controller was the ultimate source of a control message received from coordinator 210.

Where multiple users and/or controller devices share access to an environment model and one controller device makes a change to the model, it can be desirable to propagate the change to other controller devices that have access to the model. This can be accomplished at least in part by leveraging synchronization techniques that propagate data updates between or among a user's devices.

Figure 9:
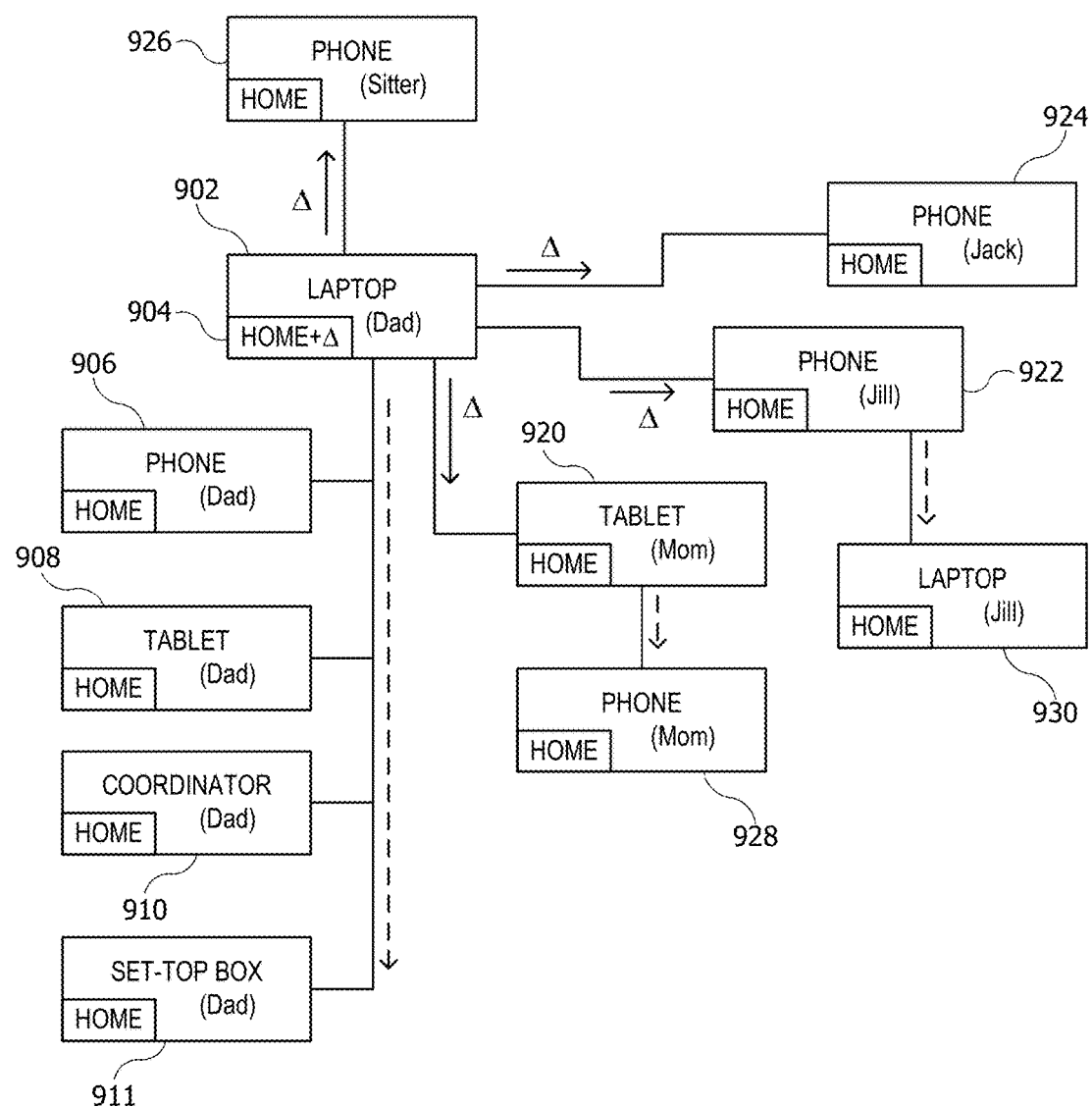
FIG. 9 illustrates a direct synchronization technique for communicating updates to the environment model according to an embodiment of the present invention.

One technique, referred to herein as "direct" synchronization, is illustrated in FIG. 9. For purposes of illustration, it is assumed that the users and devices with access to the environment model are as shown in FIG. 8. It is further assumed that each user has an account with a cloud-based data service as described above, and that all of the user's devices are linked to that account, allowing data objects to be synchronized across the user's devices.

It is further assumed that a change (Δ) has been made to the environment model using Dad's laptop 902. That is, Dad's laptop 902 now has a modified environment model 904 (denoted "HOME+Δ"). Change Δ should be propagated to the other devices.

To propagate change Δ to Dad's other devices—phone 906, tablet 908, coordinator 910, and set-top box 911—synchronization features of the cloud-based data service can be exploited, provided that home model 904 is treated as a data object that the cloud-based data service includes in its synchronization operations. Thus, when Dad's laptop 902 synchronizes to the cloud-based data service (a process also referred to herein as "cloud-sync"), the cloud-based data service will automatically obtain updated home model 904, and the update will propagate to Dad's phone 906, tablet 908, and coordinator 910 when those devices next cloud-sync, as indicated by the dashed arrow. Cloud-sync can occur automatically (e.g., in response to the change) or when expressly requested by the user (in this case, Dad).

The change Δ should also be propagated to other users' controller devices. In some embodiments, the device that was the source of the change (in this case, Dad's laptop 902) can connect with and communicate change Δ to each other controller device. However, this can be cumbersome, especially if there are a large number of controller devices.

To reduce the number of connections and communications required, cloud-sync among the other users' devices can be exploited. For example, Dad's laptop 902 can read access list 800 of FIG. 8 and identify one device of each other user, e.g., Mom's tablet 920, Jill's phone 922, Jack's phone 924, and Sitter's phone 926. Dad's laptop 902 can communicate the change to the identified devices. This communication can use a local file-sharing functionality that might or might not require user participation. In some embodiments, the cloud-synced data service can facilitate locating other user's devices and/or transferring data to them. Once one of a user's devices has received the change, the change can be propagated to the user's other devices via cloud-sync. Thus, Mom's phone 928 and Jill's laptop 930 can obtain the update via cloud-sync, as indicated by the dashed arrows.

Figure 10:
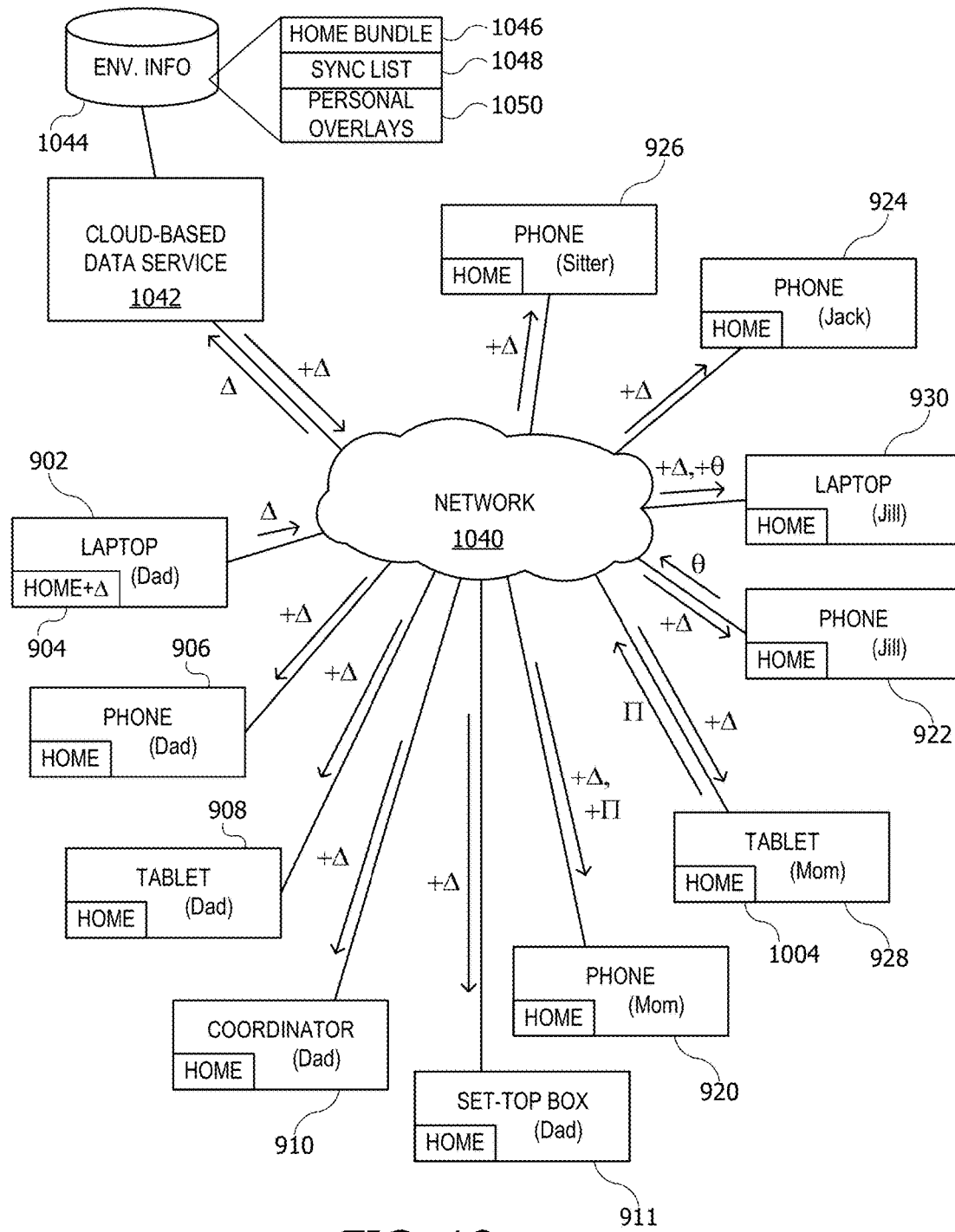
FIG. 10 illustrates a cloud-based synchronization technique for communicating updates to the environment model according to an embodiment of the present invention.

In some embodiments, the availability of cloud-sync via a cloud-based data service can be exploited to further simplify the propagation of changes. FIG. 10 illustrates a "cloud-based" technique for communicating updates to the environment model according to an embodiment of the present invention. FIG. 10 shows the same devices as FIG. 9. In this case, each device has a connection via network 1040 (e.g., the Internet) to cloud-based data service 1042. Cloud-based data service 1042 can maintain a repository 1044 (e.g., database or other data store) of environment information. Repository 1044 can store a "master" copy of home environment model 300 as home data bundle 1046. In some embodiments, the content of home data bundle 1046 can be opaque to cloud-based data service 1042. For example, home data bundle 1046 can be encrypted using a key that is shared among the various user devices but not shared with cloud-based data service 1042. In one implementation, Dad (or Dad's device) can define the key, then provide the key to Mom, Jack, Jill and Sitter (or their devices) by direct communication. Repository 1044 can also store a "sync" list 1048 associated with home data bundle 1046. Sync list 1048 can identify the users and devices associated with home data bundle 1046 in a format readable to cloud-based data service 1042, thereby allowing cloud-based data service 1042 to control access to home data bundle 1046. In some embodiments, sync list 1048 can include access levels for specific users and/or devices. For example, certain users may be permitted to receive updates to home data bundle 1046 but not to propagate updates to home data bundle 1046. Sync list 1048 can be created by a device associated with the home environment model that has full permission (e.g., Dad's laptop 902); in some embodiments, sync list 1048 can be automatically generated based on access list 800.

In this example, as in FIG. 9, Dad can make a change to the home environment model using laptop 902. That is, Dad's laptop 902 now has a modified environment model 904 (denoted "HOME+Δ"). Change Δ should be propagated to the other devices.

In this example, the propagation is accomplished through cloud-sync. For example, when Dad's laptop 902 performs cloud-sync, change Δ can be propagated to cloud-based data service 1042 and added to home data bundle 1046. In some embodiments, adding change Δ to home data bundle 1046 can involve overwriting all of home data bundle 1046; in other embodiments, change Δ can be added as an incremental update instruction, e.g., with a time stamp.

When another device, e.g., Mom's tablet 928, next performs cloud-sync, cloud-based data service 1042 can determine (e.g., from sync list 1048) that Mom's tablet 928 should receive updates to home data bundle 1046. In some embodiments, this may involve sending the entirety of home data bundle 1046 to Mom's tablet 928 if home data bundle 1046 is newer than the version of home environment model 1004 residing on Mom's tablet; in other embodiments, incremental update instructions can be sent (e.g., based on updates received since the last time cloud-sync was performed with Mom's tablet). In either case, Mom's tablet 928 can receive change Δ automatically via cloud-sync, with no direct communication with Dad's laptop 902. The same applies to the rest of devices 906-930: as each device performs cloud-sync, it can receive any updates to home data bundle 1046 that were previously received at cloud-based data service 1042, including change Δ.

In some embodiments, it may be desirable not to share the entirety of home data bundle 1046 with all users. Accordingly, the single home data bundle 1046 can be replaced with a set of "realm-specific" data bundles (not shown), each of which can be encrypted using a different key.

Each realm-specific data bundle can be a version of home data bundle 1046 that includes information from the environment model that is relevant to a particular user or to a particular set of permissions. Each realm-specific data bundle can be identified by the user identifier or permissions identifier to which it is relevant. For example, a "full" realm-specific data bundle can include all information about the home model, including information about authorized users and permission levels, while a "basic" realm-specific data bundle can omit information about the authorized users and permission levels (because basic permission, as defined above, does not include permission to change a user's status). A "guest" realm-specific data bundle can include information pertaining to accessories that guests are allowed to operate and omit all other information. For example, if guests are not allowed to operate master-bedroom TV 304 (3), that accessory can simply be omitted from the "guest" realm-specific data bundle. As another example, a realm-specific data bundle can be generated for each user (e.g., Dad, Mom, Jack, Jill, and Sitter) and can contain information about accessories relevant to that user. Each realm-specific data bundle can be encrypted with a key that is known to the administrator (in this case, Dad; more generally a user with full permissions) and can be selectively shared with users associated with that realm, e.g., by direct communication between Dad (or one of Dad's devices) and each of the other users (or their devices). These keys need not be known to cloud-based data service 1042.

Where realm-specific data bundles are used, each user's devices can cloud-sync with the appropriate realm-specific data bundle. For example, if the realm-specific data bundles are generated per-user, each user's device would synchronize with the user's realm-specific data bundle. The mapping of users to realm-specific data bundles can be based on the users' account identifiers at cloud-based data service 1042, and sync list 1048 can map the user account ID to the correct realm-specific data bundle. If the realm-specific data bundles are generated per-permission set, each user's account can be assigned a permission set in sync list 1048 so that the user's devices receive the appropriate realm-specific data bundle.

Use of realm-specific data bundles can further protect against unauthorized use of accessories. For example, rather than relying on controllers 202 or coordinator 210 to enforce any access restrictions that may be in place, the lack of information about a particular accessory may prevent controller 202 from unauthorized communication with an accessory 204. Further, if each realm-specific data bundle is encrypted with a different key, a device that receives a data bundle for the "wrong" realm will not be able to decrypt it.

In some embodiments, home data bundle 1046 can represent an environment model that is shared by all users in the home. For instance, an accessory name (or room name) assigned to an accessory (or room) by user Dad can be propagated through synchronization to all other users. Some embodiments can allow a user (even a user with basic or guest permissions) to define a "personal overlay" for the environment model. The personal overlay can include customizations for the user's taste, such as changing the names of accessories, rooms, zones, etc. In some embodiments, a personal overlay can include aliases for various elements of the shared environment model (e.g., accessories, rooms, zones) but does not include any new or different elements. In some embodiments, a personal overlay can include personally defined service groups and/or action set specific to a particular user. Personal overlays can be synchronized across a user's devices but not synchronized to devices belonging to other users.

By way of illustration, the environment model represented in home data bundle 1046 can include a room named "Jill's Bedroom." User Jill might want to rename that room to "My Room." In some embodiments, Jill can do this by renaming the room, e.g., via a controller user interface on her phone 922. Thereafter, Jill's phone 922 can identify Jill's Bedroom as "My Room" in its user interface. Since user Jill does not have permission to modify the environment model, the change is not propagated to other users' devices. But it can be synchronized across Jill's devices. For example, when Jill's phone 922 syncs with cloud-based data service 1042, Jill's phone 922 can send personal overlay data (θ) to cloud-based data service 1042. Cloud-based data service 1042 can store personal overlays 1050 for each user in association with home data bundle 1046. Each personal overlay 1050 (or changes thereto) can be propagated to devices of the user who created it but not to the devices of other users. Thus, a change to Jill's personal overlay (indicated as +θ) can be propagated to Jill's laptop 930 but not to other controller devices. Similarly, user Mom can create a different personal overlay (Π) that can be synchronized via cloud-based data service 1024 from Mom's tablet 928 to Mom's phone 920 (as indicated by +Π) but not to other controller devices.

Other techniques for synchronizing a home environment model across user devices can also be implemented in addition to or instead of those described above. In some embodiments, cloud-sync (e.g., as shown in FIG. 10) can be used for all devices and users with accounts on cloud-based data service 1042, and direct sync (e.g., as shown in FIG. 9) can be used for devices where the user does not have an account on cloud-based data service 1042. In some embodiments, it can be an operational requirement that all users have accounts with cloud-based data service 1042.

Example User Interface

Any of the controller devices described above can provide a user interface to facilitate user access to the automated environment, including control of accessory devices and configuration of the environment. An example of a graphical user interface will now be described. It is to be understood that other user interfaces can also be substituted.

Figure 11:
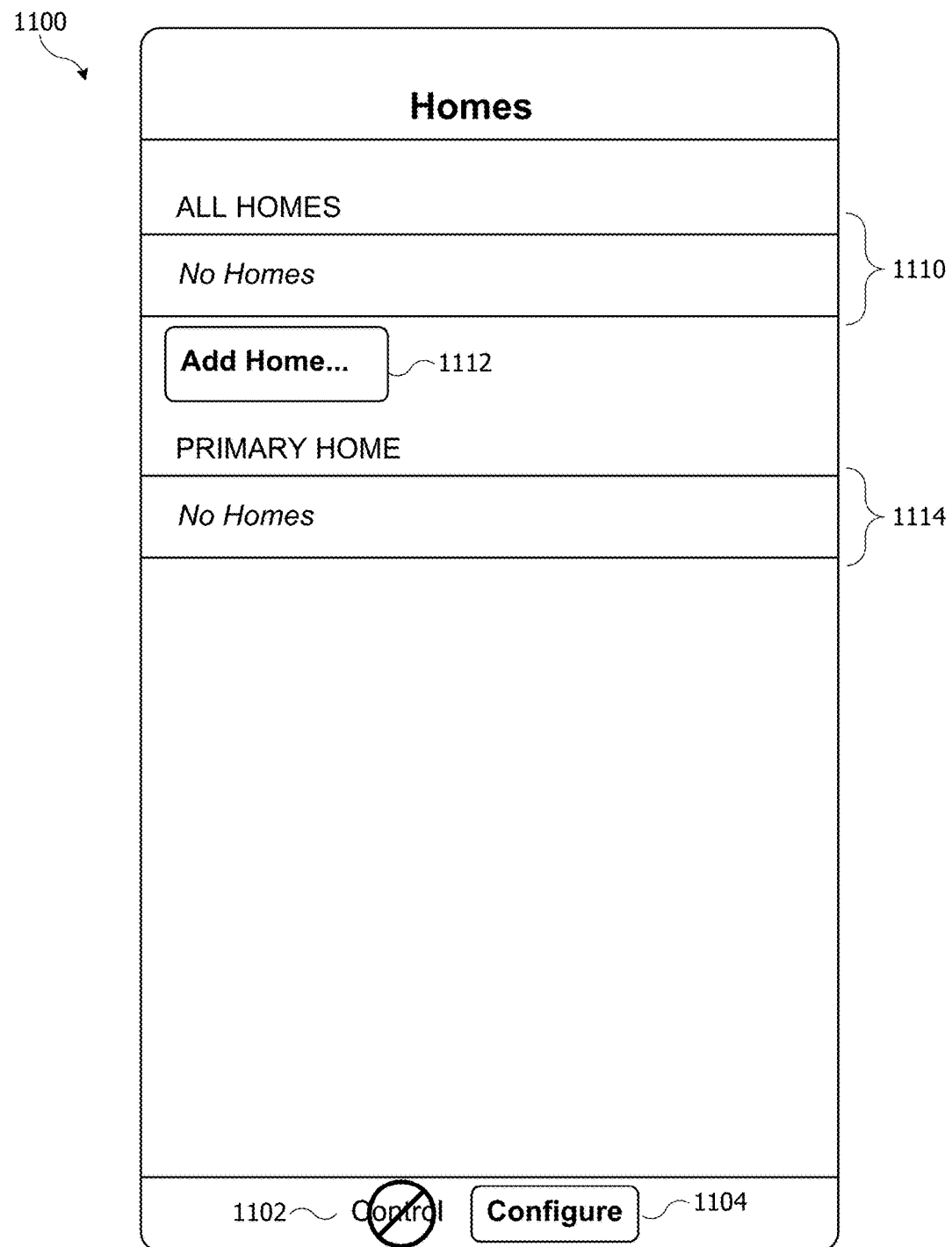
FIGS. 11-38 show user interface screens according to various embodiments of the present invention.

FIG. 11 shows an example user interface screen 1100 according to an embodiment of the present invention. Like all user interface screens described herein, screen 1100 can be presented on a display of a controller device. In some embodiments, a user interface screen (including screen 1100 and other screens described herein) can occupy the entire display area (e.g., on a mobile phone or other device with a relatively small display); in other embodiments, a user interface screen can occupy a portion of the display area (e.g., a window or pane on a virtual desktop displayed on a desktop or laptop computer). The user interface can incorporate various graphical control elements that the user can select in order to invoke functionality of the application program that generates the interface screens. For example, if the user interface is presented on a touchscreen display, the user can touch a control element to select it; if the user interface is presented on a display that is not a touchscreen, the user can operate a pointing device (e.g., mouse, trackpad, etc.) to position a cursor over a control element, then select the control element by tapping or clicking. Other input techniques can also be used (e.g., mapping keys on a keyboard to control elements, voice input, etc.).

User interface screen 1100 can be a starting screen displayed when the user first launches an application program (also referred as an "app") to configure an environment model and control an automated environment using the environment model. In the examples herein, the automated environment is assumed to be a home, but it is to be understood that other automated environments can be configured and controlled using similar interfaces. Screen 1100 (and certain other screens described herein) can provide a "control" button 1102 and a "configure" button 1104. Selecting "control" button 1102 can put the app into a "control" mode in which the app can receive user input to control any accessories that have been added to a model of the automated environment; selecting "configure" button 1104 can put the application in a "configuration" mode in which the app can receive user input to configure the model of the automated environment, e.g., by adding accessories; defining environments, rooms, and zones; assigning accessories to rooms; and/or defining action sets, triggering conditions, service groups, and so on. In some embodiments, the mode can be changed from any screen on which "control" button 1104 and "configure" button 1104 are present and enabled for user operation.

Screen 1100 shows a list 1110 of automated environment models ("homes" in the parlance of FIG. 11) that have been defined and an input control 1112 operable to add a home to list 1110, allowing the user to define multiple homes. As shown in FIG. 11, list 1110 can be initially empty, and the user can be required to define at least one home prior to controlling any accessories; accordingly, "control" button 1102 can be disabled. List 1114 can be used to identify one of the defined homes as a "primary" home. The primary home can be used by the controller as a default for routing any accessory-control commands it may receive (even while the control and configuration app is in an inactive or background state). The user can override the default by specifying a different home when issuing an accessory-control command to the controller. In FIG. 11, no homes have yet been defined, so list 1114 is empty. Accordingly, the user's first task is to define at least one home, e.g., by operating input control 1112. In some embodiments, the user may be prompted to define a home upon launching the control and configuration app for the first time.

Figure 12:
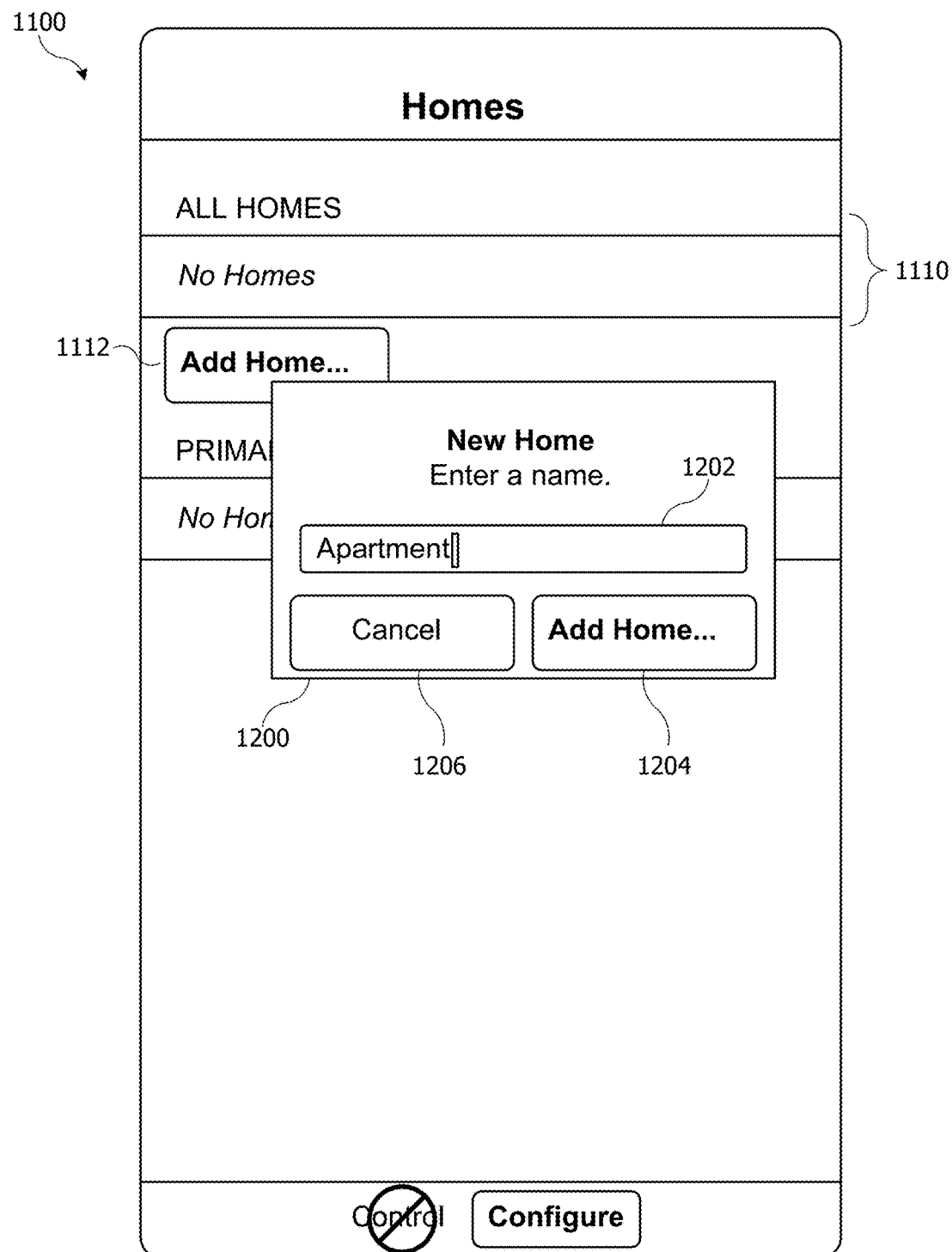

FIG. 12 shows an example user interface screen 1200 for defining a new home. Screen 1200 can be presented as a pop-up over screen 1100, e.g., in response to user operation of input control 1112. Screen 1200 can prompt the user to enter a name for the new home in text box 1202. A virtual keyboard (not shown) can be presented to facilitate entering a name. The user can select control 1204 to add the home to list 1110 or control 1206 to cancel the operation.

Figure 13:
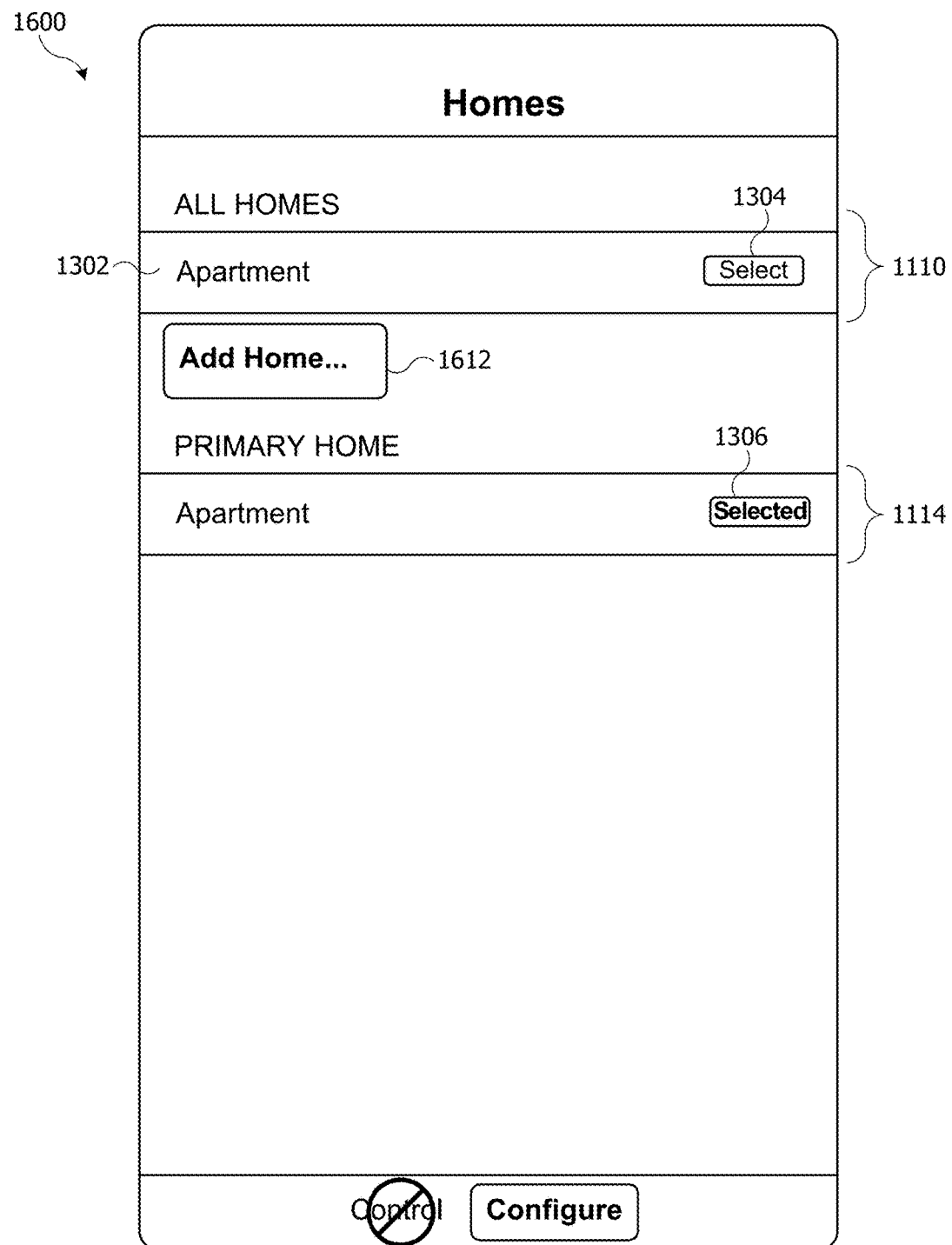

FIG. 13 shows an example of user interface screen 1100 after the user has entered a name for a home at screen 1200 of FIG. 12. An entry 1302 for the home named "Apartment" has been added to homes list 1110. A selection control 1304 is provided to allow the user to select the home named "Apartment" for further configuration. In addition, primary home field 1114 now identifies "Apartment" as the primary home using icon 1306. If additional homes have been defined, field 1114 can include a list of all defined homes, and the user can tap the appropriate list entry to designate the corresponding home as the primary home, and icon 1306 can be moved to the designated entry. In some embodiments, the first home the user adds to homes list 1110 automatically becomes the primary home and can remain the primary home until the user expressly selects a different primary home. The designation of a primary home can allow users to more readily interact with accessories in the environment they frequent most while allowing the same app to support accessory interactions in multiple different environments.

Figure 14:
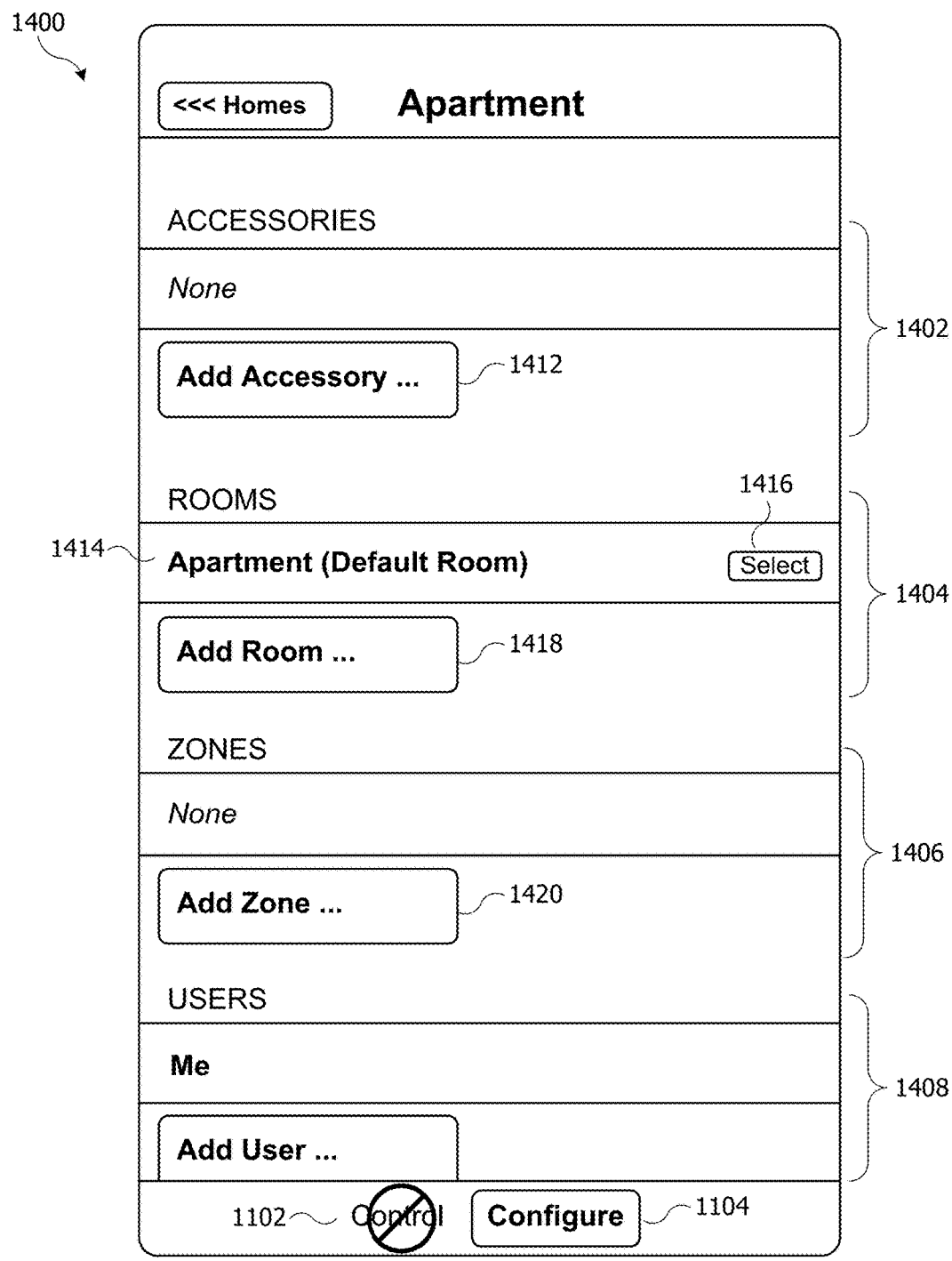

Having defined a home, the user can select a home to configure, e.g., by tapping or clicking selection control 1304. FIG. 14 shows an example of a main configuration user interface screen 1400 that can be presented when the user selects a home ("Apartment" in this example) to be configured. In this example, a home can be modeled in the manner described above, e.g., by assigning accessories to rooms defined within the home. Rooms, in turn, can be grouped into zones. Action sets, triggers, and service groups can also be defined to facilitate interaction with home. Users can also be associated with the home and granted various levels of permissions. Accordingly, main configuration screen 1400 can include sections corresponding to each of these configuration options. For example, as shown in FIG. 14, screen 1400 can provide section 1402 for adding and/or configuring accessories within the home; section 1404 for defining and managing rooms; section 1406 for defining and managing zones; and section 1408 for adding and managing users who are to be granted at least some access to the home. Additional sections (not shown in FIG. 14) can be provided for defining and managing action sets, triggers, service groups, and so on. In some embodiments, screen 1400 can be scrollable to display the additional sections; an example is shown below.

Initially, as shown in FIG. 14, accessories section 1402 can be empty except for "Add Accessory" control 1412. Until at least one accessory is added, "control" button 1102 can be disabled, preventing the app from entering control mode until at least one controllable accessory has been added to the home. In this example, no accessories are added to the home automatically. Some embodiments can support automatically adding accessories, e.g., if at the time of launching the controller app, the controller device is already aware of and/or in communication with one or more accessories. (For instance, the controller device may have been previously configured to stream music to a speaker system.) Any already-known accessories can be automatically added to the home and listed in section 1402. Alternatively, the user can be prompted to add any already-known accessories to the home. The user can also add accessories by operating control 1412.

Figure 15:
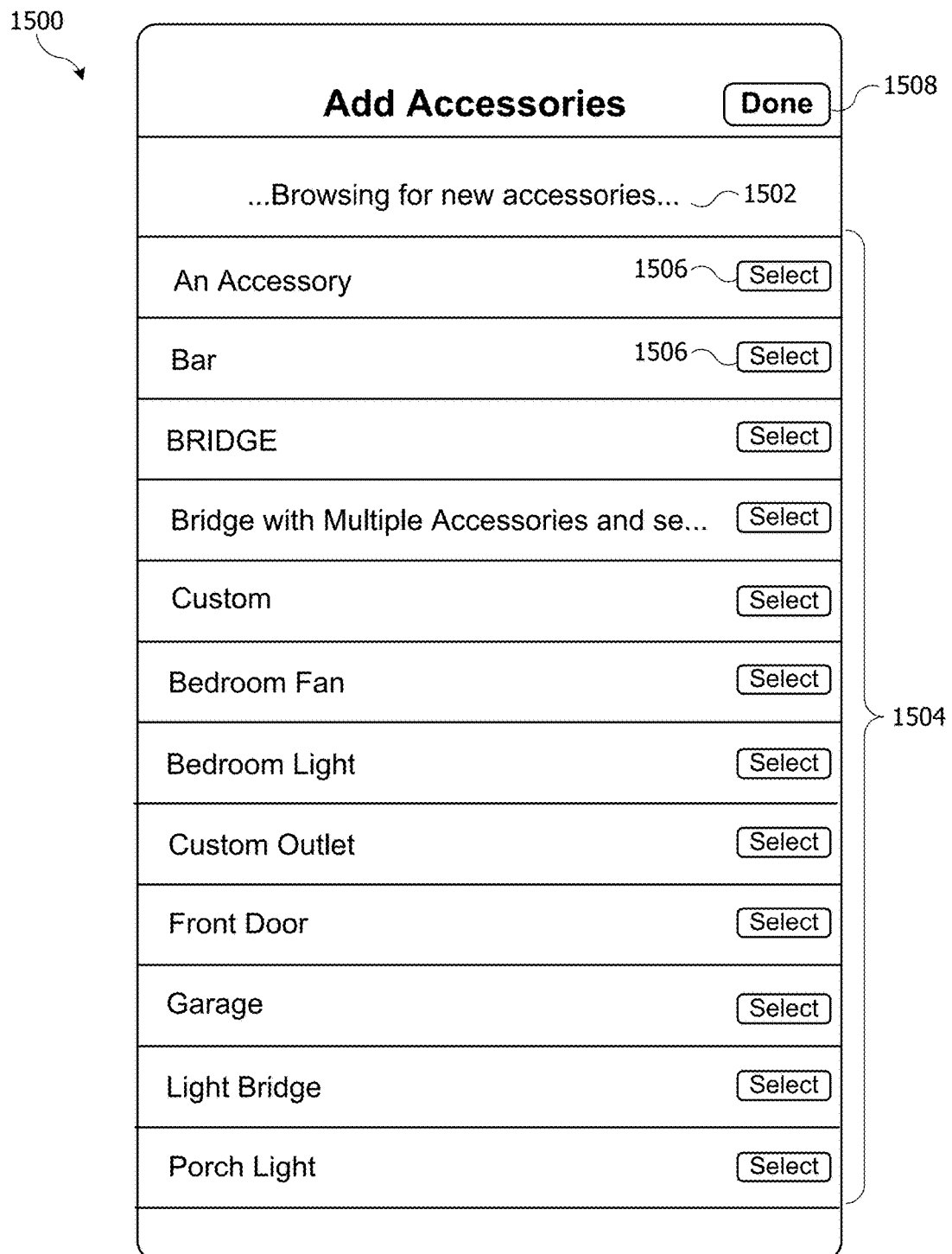

An example of a user interface for adding accessories will now be described. In this example, the user can find an accessory to add to the model, assign it to a room, and facilitate a pair setup operation between the controller (or a coordinator) and the accessory. In some embodiments, the accessory-add operation is not considered complete until all of these stages have been successfully completed. FIG. 15 shows a user interface screen 1500 for finding accessories to add according to an embodiment of the present invention. Screen 1500 can be presented, e.g., in response to user operation of control 1412 of FIG. 14. For instance, when the user operates control 1412, the controller can begin to scan for beacon signals, advertisements, or the like from wireless accessories in the vicinity. Conventional wireless-network scanning techniques, including active and/or passive scanning, can be used; other techniques for detecting accessories can also be implemented. Status bar 1502 can indicate that the controller is scanning for new accessories. In some embodiments, status bar 1502 can disappear if scanning completes, and a user-operable control can be provided to allow the user to instruct the controller to initiate a new scan.

List 1504 can present a list of all accessories discovered by the controller. In some embodiments, list 1504 can be dynamically populated as the controller continues to scan for accessories. The accessories can be listed, e.g., in alphabetical order, using human-readable names provided by the accessories in their beacon or advertisement signals. The accessories can indicate whether they are bridge accessories (as described above and above-referenced U.S. Provisional Application No. 62/005,764, U.S. Provisional Application No. 62/094,391, and U.S. application Ser. No. 14/725,891, e.g., by including "Bridge" in the accessory name or some other visual indicator. The user can select an accessory to be added, e.g., by operating "select" control 1506 for that accessory or by tapping or clicking the accessory name. "Done" control 1508 can be selected to end the adding of accessories and revert to screen 1400.

Figure 16:
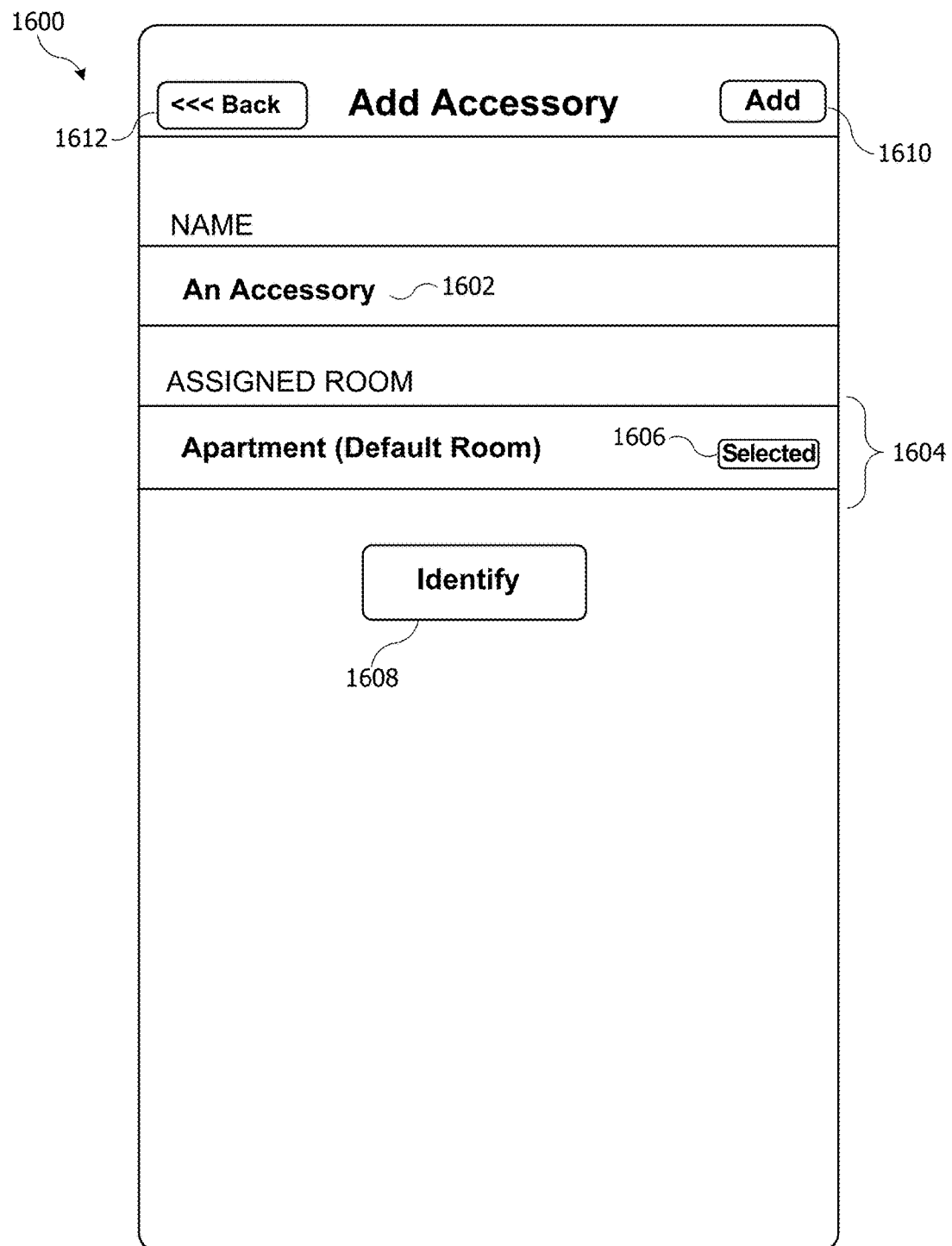

If the user selects an accessory to add, e.g., by operating control 1506, additional interface screens can guide the user through the process of adding an accessory. As noted above, some embodiments can require that all stages be completed before the user interface presents the accessory as a component of the home. FIG. 16 shows a user interface screen 1600 for adding an accessory according to an embodiment of the present invention. Screen 1600 can be presented, e.g., in response to user operation of control 1506 at screen 1500. The name of the selected accessory (which can be the same as the name in list 1504) can be presented in field 1602. The user can assign the accessory to a room by selecting the room from list 1604. In this example, only one room is defined and is selected by default, as indicated by "selected" icon 1606. If multiple rooms are defined, then all the rooms can be included in list 1604, and the user can select the desired room from the list, e.g., by tapping on the name of the room. In some embodiments, the model of the home can include a default room that is automatically created when the home is defined. In some embodiments, this can correspond to the Anywhere room described above. New accessories can be initially assigned to the default room, and the user can change the assignment by selecting the desired room from list 1604.

"Identify" control 1608 can be operated by the user to verify which accessory is being added. In some embodiments, when the user operates control 1608, the controller sends a "reveal" request to the accessory. The accessory can respond to the "reveal" request by taking some action that can be observed by the user. For example, the accessory may blink a light, make a sound, vibrate, move, and/or perform some other action that a user can observe. This allows the user to confirm that the accessory being added is the one the user intends to add. The user can operate "Add" control 1610 to continue the process of adding the accessory or "Back" control 1612 to return to screen 1500.

Figure 17:
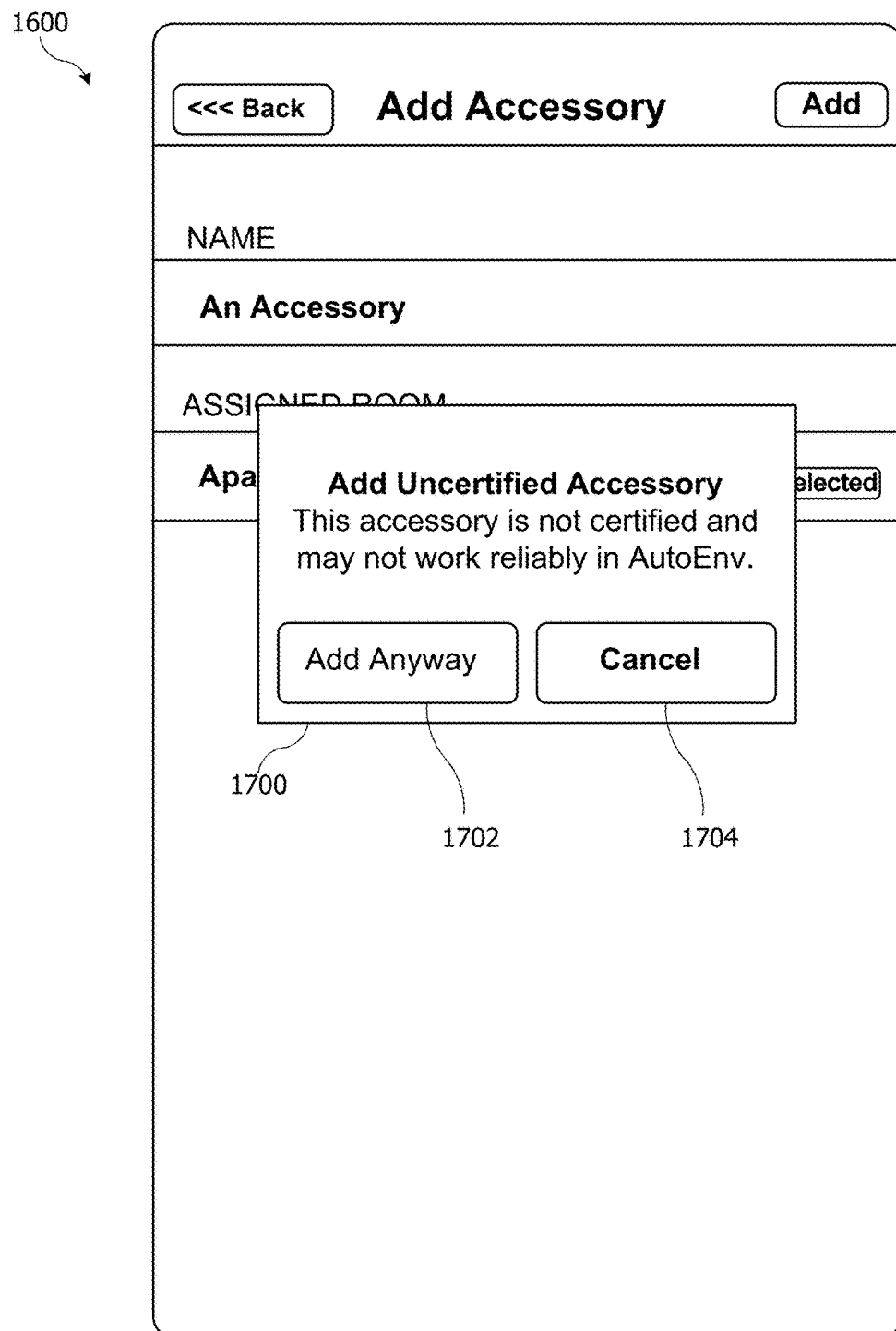

If the user operates "add" control 1610, the controller can communicate with the accessory to determine whether it is certified for use with the automated-environment control app (and related software). For example, certification status may be determined based on a security certificate obtained from the accessory by the controller. In some embodiments, if the accessory is not certified, adding the accessory can be prohibited. In other embodiments, the user can be permitted to add an uncertified accessory. Where this is the case, the user can be warned of potential interoperability issues. For example, as shown in FIG. 17, a warning message 1700 can be displayed, e.g., as a pop-up over screen 1600. The user can choose to add the accessory in spite of the warning by operating control 1702 or cancel the operation by operating control 1704. In the latter case, the interface can return to screen 1500 of FIG. 15 to allow the user to select a different accessory.

Figure 18A:
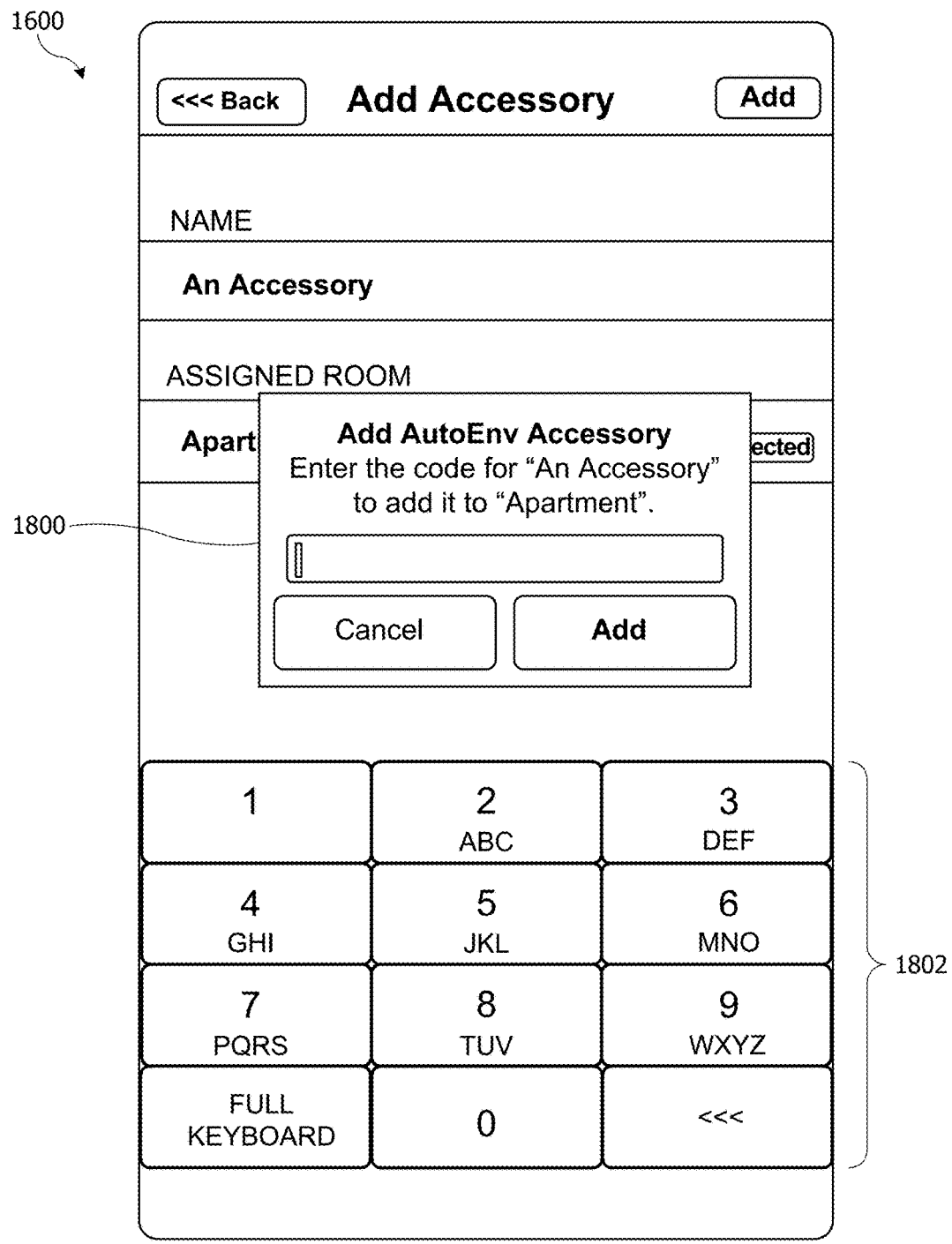

Assuming the user chooses to proceed (or if the accessory is certified), the controller can proceed to perform a pair setup operation with the accessory (e.g., as described above). In some embodiments, pair setup may require the user to enter a pairing code (e.g., a PIN or passcode) provided by the accessory. FIG. 18A shows a user interface screen 1800 for manually entering an accessory pairing code according to an embodiment of the present invention. Screen 1800 can be presented, e.g., as a pop-up over screen 1600. Virtual keypad 1802 can be presented to facilitate entry of the pairing code. A numeric, alphabetic, alphanumeric or other keypad can be presented as desired. The user can enter the pairing code by operating virtual keypad 1802. The user can obtain the pairing code to be entered from the accessory. For example, the pairing code can be printed on or inside the accessory housing, packaging, or instruction manual, in any location where it can be accessed by the user. In some embodiments, if the accessory has a display capability, the accessory can display its pairing code to the user.

Figure 18B:
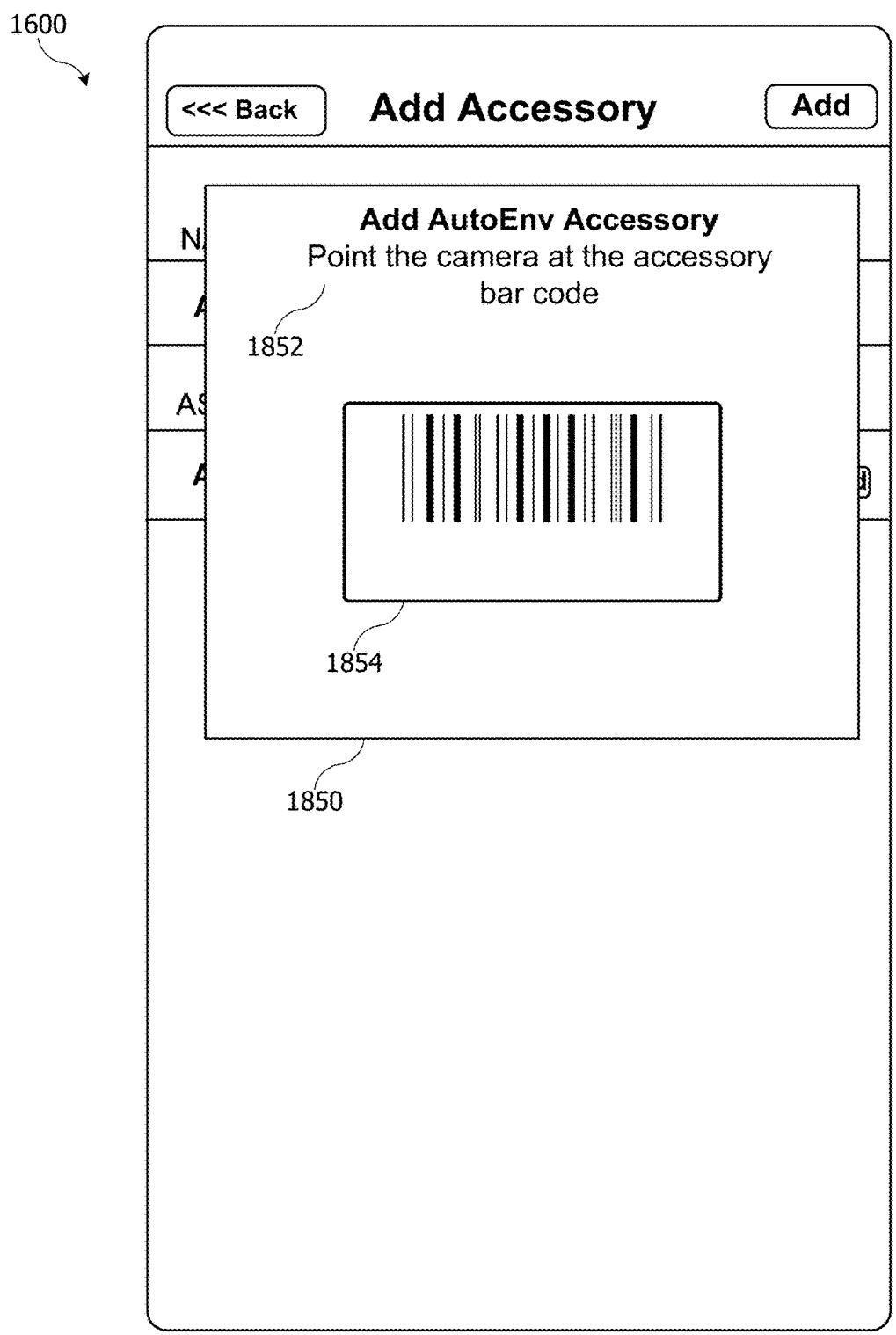

FIG. 18B shows another user interface screen 1850 for capturing an accessory pairing code using optical character recognition (OCR) according to an embodiment of the present invention. OCR capture can use the camera of the controller to capture an image of a machine-readable pairing code for an accessory. The machine-readable code can be, e.g., a barcode, a QR code, a machine-readable alphanumeric code, a dynamic code (e.g., a changing pattern of dots on a screen), or any other form of presenting information that can be imaged by a camera and analyzed using computer-implemented algorithms to extract the information. Code-capture interface screen 1850 can be presented, e.g., as a pop-up over screen 1600. Prompt 1852 can prompt the user to point the controller's camera at the machine-readable code (in this example, a bar code). Live preview pane 1854 can render an image of the camera data being captured, helping the user to align the image correctly. In some embodiments, the controller can process the captured preview images dynamically and automatically determine when an image of sufficient quality has been received. When such an image is received, the controller can modify the UI to indicate success. For instance, the image in live preview pane 1854 can freeze and brighten to indicate success, or a border of live preview pane 1854 can change color. Other indicia of success can also be used, to inform the user that continuing to point the camera is no longer necessary. Other interfaces and techniques for obtaining a pairing code from an accessory can also be used.

Regardless of how it is captured, the pairing code can provide confirmation to the controller that the accessory being added is the accessory the user intends to add. In addition, the pairing code can be incorporated into the pair setup process and used to generate a shared secret between the controller and the accessory, and requiring the user to provide the pairing code out-of-band can enhance security, particularly if the pairing code is difficult to guess.

Assuming pair setup completes successfully, the accessory is added to the home. If an error occurs, the user can be notified and prompted to retry or cancel the add-accessory operation.

Figure 19:
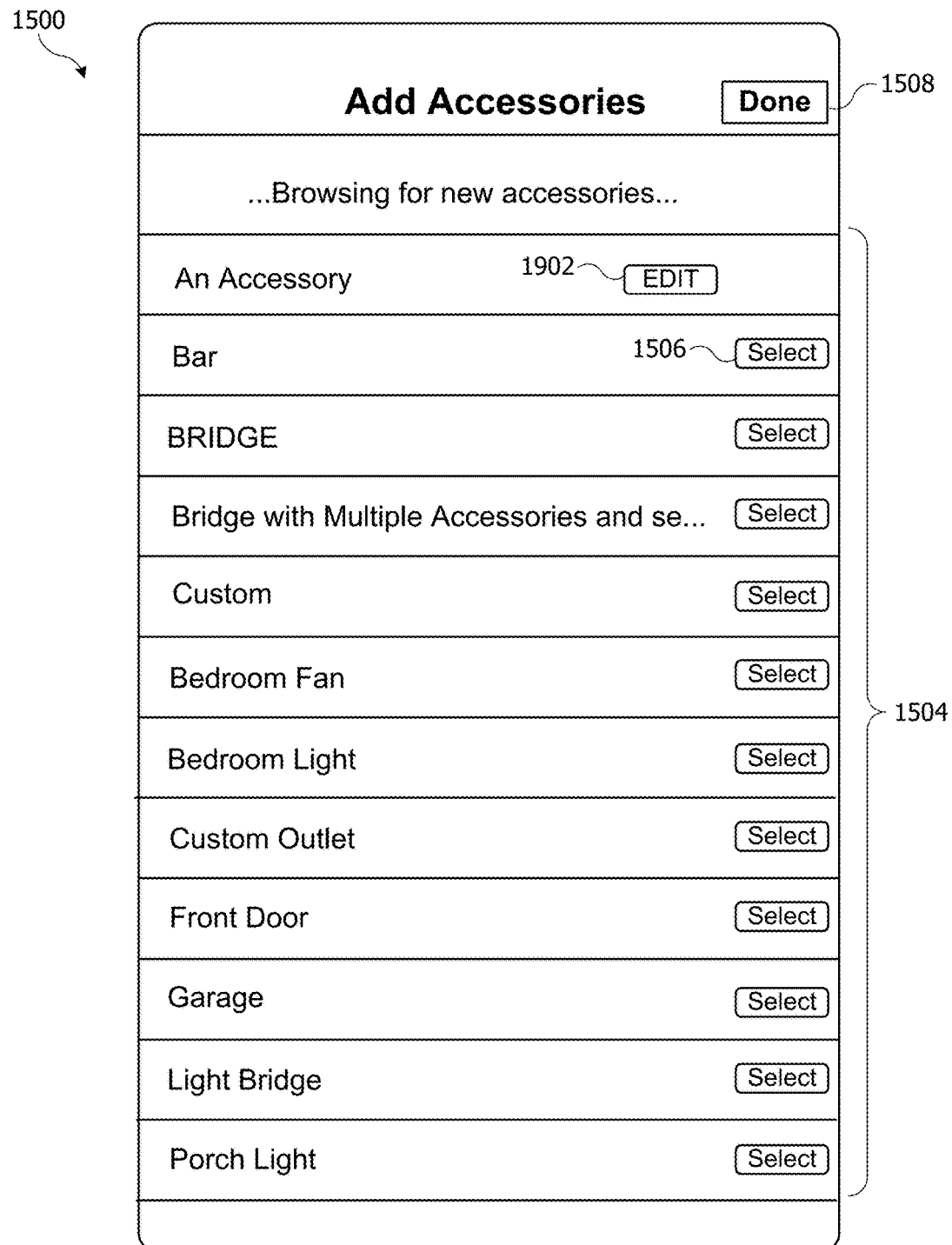

After adding the accessory (or canceling the operation) the user interface can present an updated accessory-listing screen 1500, e.g., as shown in FIG. 19. An accessory that has been added can have an associated "edit" control 1902 that is visually distinct from "select" control 1506 provided for each accessory that has not been added. Editing of accessories is described below. From screen 1500, the user can select another accessory to add or end the operation by operating "Done" control 1508.

Figure 20:
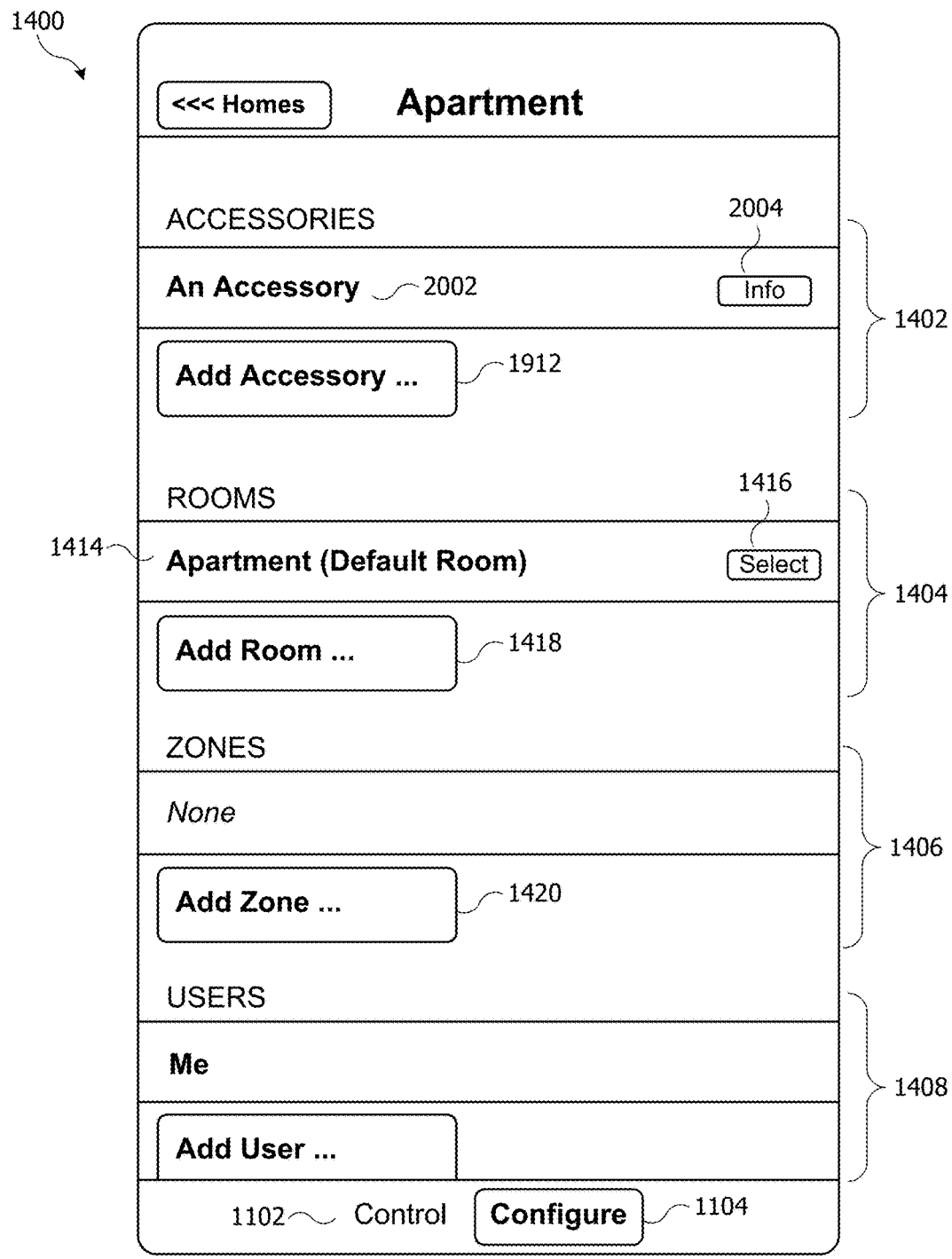

If the user operates "Done" control 1508, the user interface can present an updated main configuration screen 1400, e.g., as shown in FIG. 20. Accessory 2002 has been added to the home and now appears in accessories section 1402. The user can operate "info" control 2004 to obtain additional information about accessory 2002 and in some embodiments to edit or control accessory 2002. (In some embodiments, information can be obtained by selecting the accessory name, and a visually distinct "info" control element is not needed.) It should be noted that after one or more accessories have been added to the home, "control" button 1102 can become active, allowing the user to switch the app from configuration mode to control mode. An example of operation in control mode is described below.

In response to user operation of "Info" control 2004, details about accessory 2002 can be presented. The particular information presented can depend on the information available. In some embodiments, a unified protocol for controlling accessories in an automated environment can define a standard accessory model. For example, as described in above-referenced U.S. Provisional Application No. 61/935,967 and U.S. application Ser. No. 14/614,914, any accessory can be modeled as a collection of "services," where each service relates to a function the accessory can perform, and each service can be modeled as a collection of discrete "characteristics" whose values represent various aspects of the current or desired ("target") state of the accessory.

Figure 21:
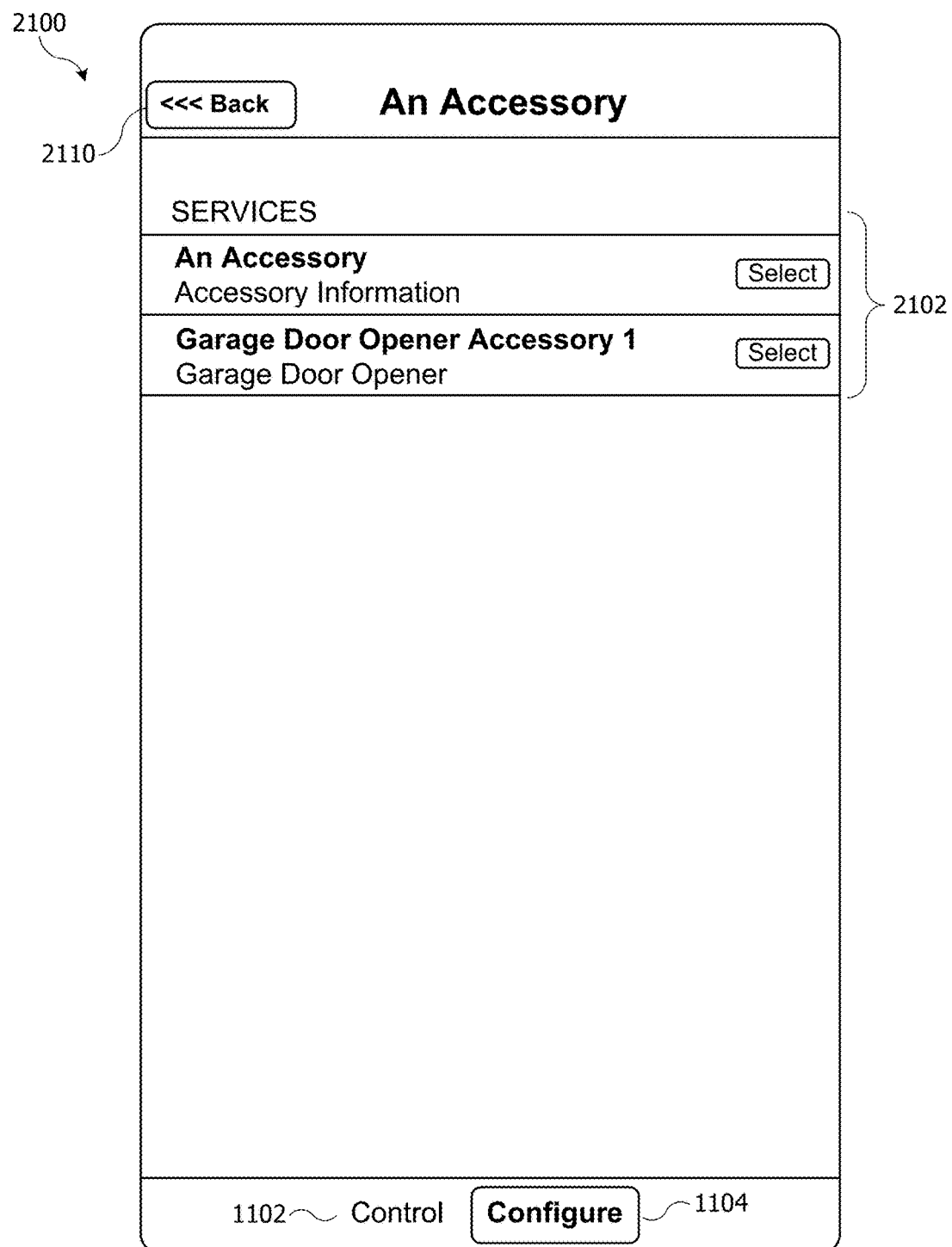

FIG. 21 shows a user interface screen 2100 according to an embodiment of the present invention. Screen 2100 can be used to present accessory information to the user, e.g., in response to user operation of control 2004 of screen 2000. In this example, screen 2100 can present a list 2102 of services defined by accessory 2002. The information in list 2102 can be generated based on an accessory definition record provided by the accessory, e.g., as described in above-referenced U.S. Provisional Application No. 61/935,967 and U.S. application Ser. No. 14/614,914.

Figure 22:
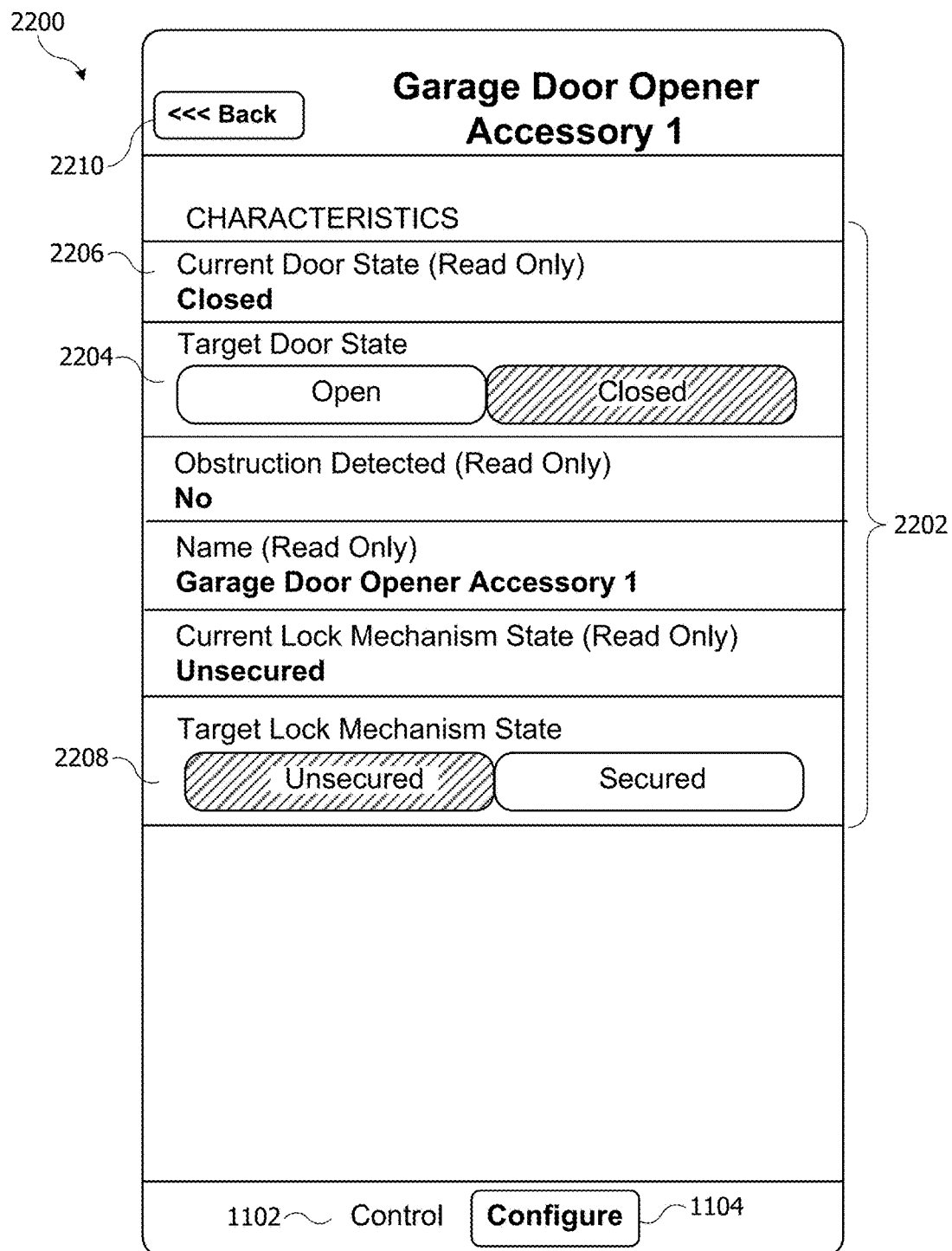

From screen 2100, the user can select a service and view the characteristics associated with that service. FIG. 22 shows a user interface screen 2200 according to an embodiment of the present invention. Screen 2200 can be used to present information about an accessory's characteristics. The characteristics are listed in section 2202, and the value (state) of each characteristic is shown. Where the user can change a characteristic, a control element can be presented to allow the user to make a change. For example, in the case of a garage door opener service, the user can open or close the door by changing the target door state, and control element 2204 can be provided to select the target door state (open or closed in this example). The current door state, shown at 2206, is a read-only characteristic showing whether the door is currently open or closed. Characteristics labeled "read-only" are read-only to the controller but can be updated (written) by the accessory based on monitoring of its actual state (e.g., whether the door is actually open or closed). In this example, the door is closed.

In some embodiments, the user can control the accessory via screen 2200. For example, the user can operate "control" button 1102 to switch the app to control mode without leaving screen 2200. In control mode, control element 2204 and control element 2208 (and/or any other control elements that may be present) can become active input controls, allowing the user to change the values of controller-writeable (target) characteristics, which can initiate a change in the actual (current) state of the accessory. For example, when the app is in control mode, the user can open a (real-world) garage door represented by this accessory by operating control 2204 to set the value of the "target door state" characteristic to "open" (e.g., by tapping on the word "open"). The controller can send a message to the accessory indicating the new value of the "target door state" characteristic. In response, the accessory can determine that the target door state (open) no longer match the value of the "current door state" characteristic (closed, as indicated at 2206). The accessory can interpret this as an instruction to open the garage door so that the current state can match the target. For example, the accessory can actuate a motorized door-opener mechanism to open the door. Once the door is open, the accessory can update the value of the "current door state" characteristic and can send a message notifying the controller of the update. The controller can then update screen 2206 to show the new "current door state" value. Other behaviors of an accessory can be controlled in a similar manner, by reading and writing values from and to appropriate characteristics. In some embodiments, control elements 2204, 2208 can be active when the app is in control mode and inactive when the app is in configuration mode.

In configuration mode, from screen 2200, the user can return to main configuration screen 1400. For example, the user can operate "back" button 2210 to return to screen 2100 of FIG. 21, then operate "back" button 2110 to return to screen 1400 of FIG. 20.

Referring again to FIG. 20, in some embodiments, all accessories in the environment are required to be assigned to a room. The currently defined rooms are visible in section 1404. To simplify operation for users who do not want to define multiple rooms, section 1404 can initially be populated with a default room 1414; the default room can be named based on the name of the home. In some embodiments, the default room can correspond to the Anywhere room described above. If the user has defined other rooms, those rooms can also be included in section 1404. Each room can have an associated selection control 1416 that is be operable to select the room. Control 1418 can be operated to add rooms to the home.

Figure 23:
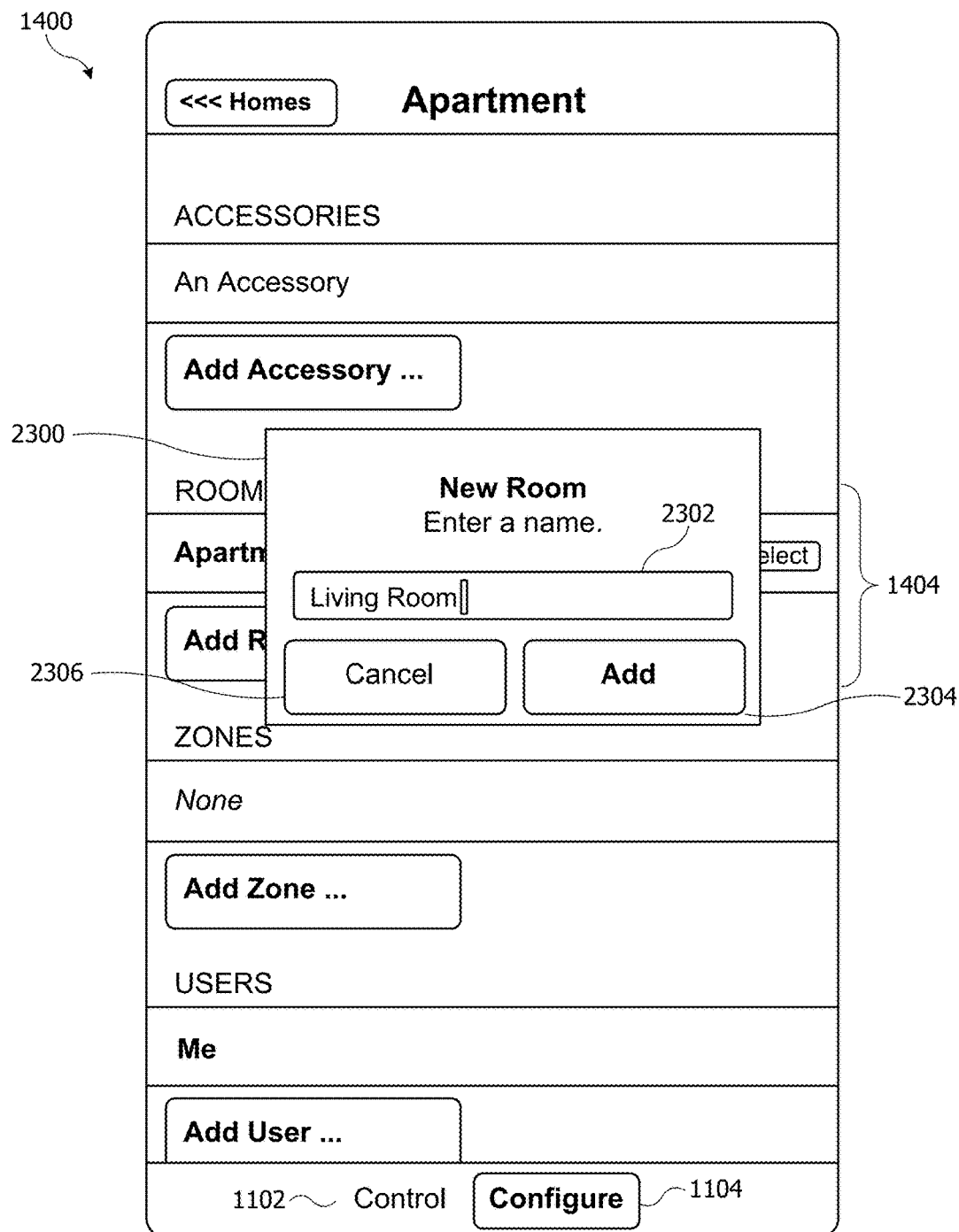

FIG. 23 shows a user interface screen 2300 for adding a room to a home according to an embodiment of the present invention. Screen 2300 can be can be presented, e.g., in response to user operation of control 1418. Screen 2300 can be presented as a pop-up over screen 1400 and can prompt the user to enter a name for the new room in text box 2302. A virtual keyboard (not shown) can be presented to facilitate entering a name. The user can select control 2304 to add the room to list 1404 or control 2306 to cancel the operation.

Figure 24:
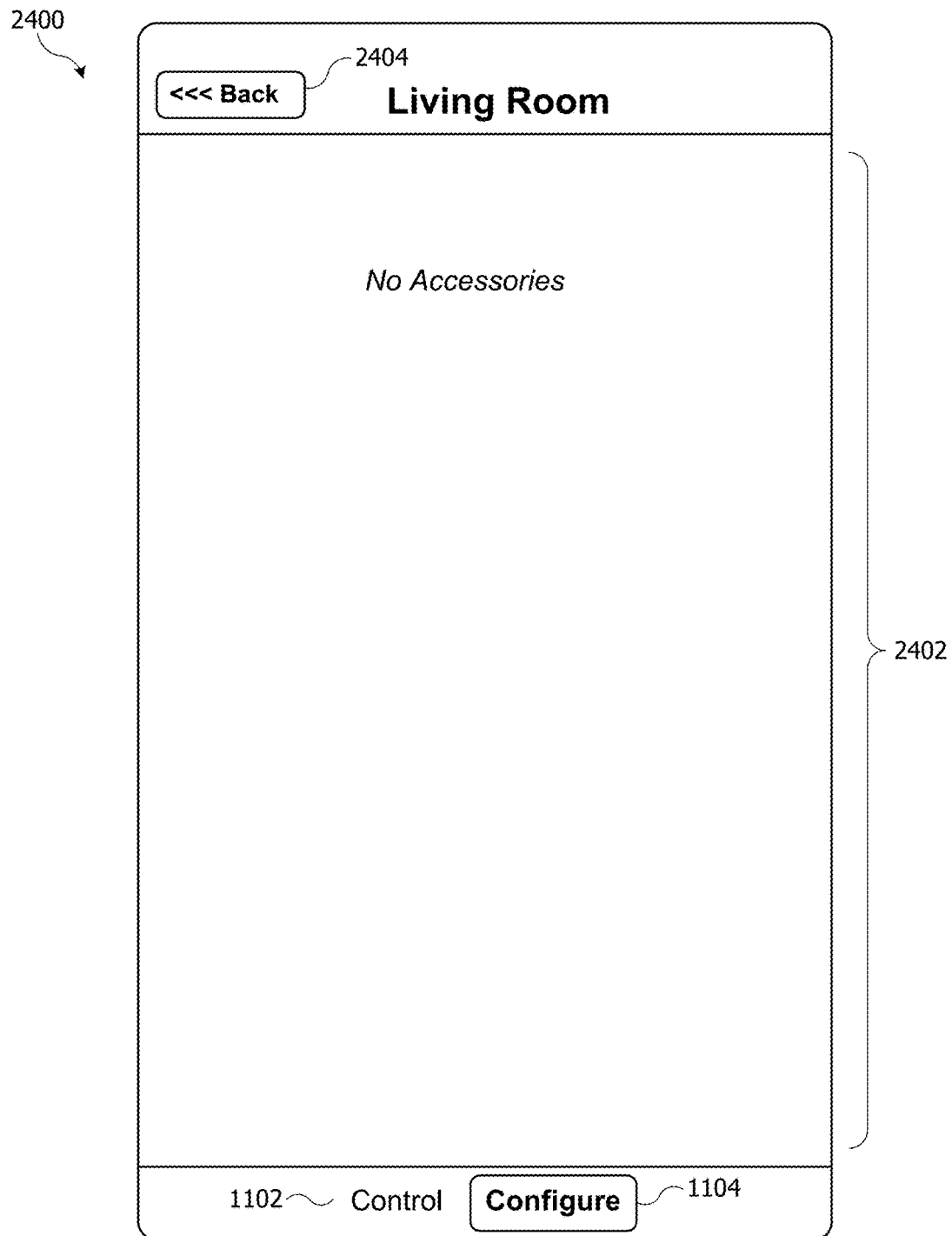

Once a room is added to the list in section 1404, the user can select the room from section 1404 to view information about it. FIG. 24 shows a screen 2400 that can be presented for a newly added room according to an embodiment of the present invention. Screen 2400 can provide a list 2402 of accessories that have been assigned to the room. For a newly created room, list 2402 can be empty, as shown.

Figure 25:
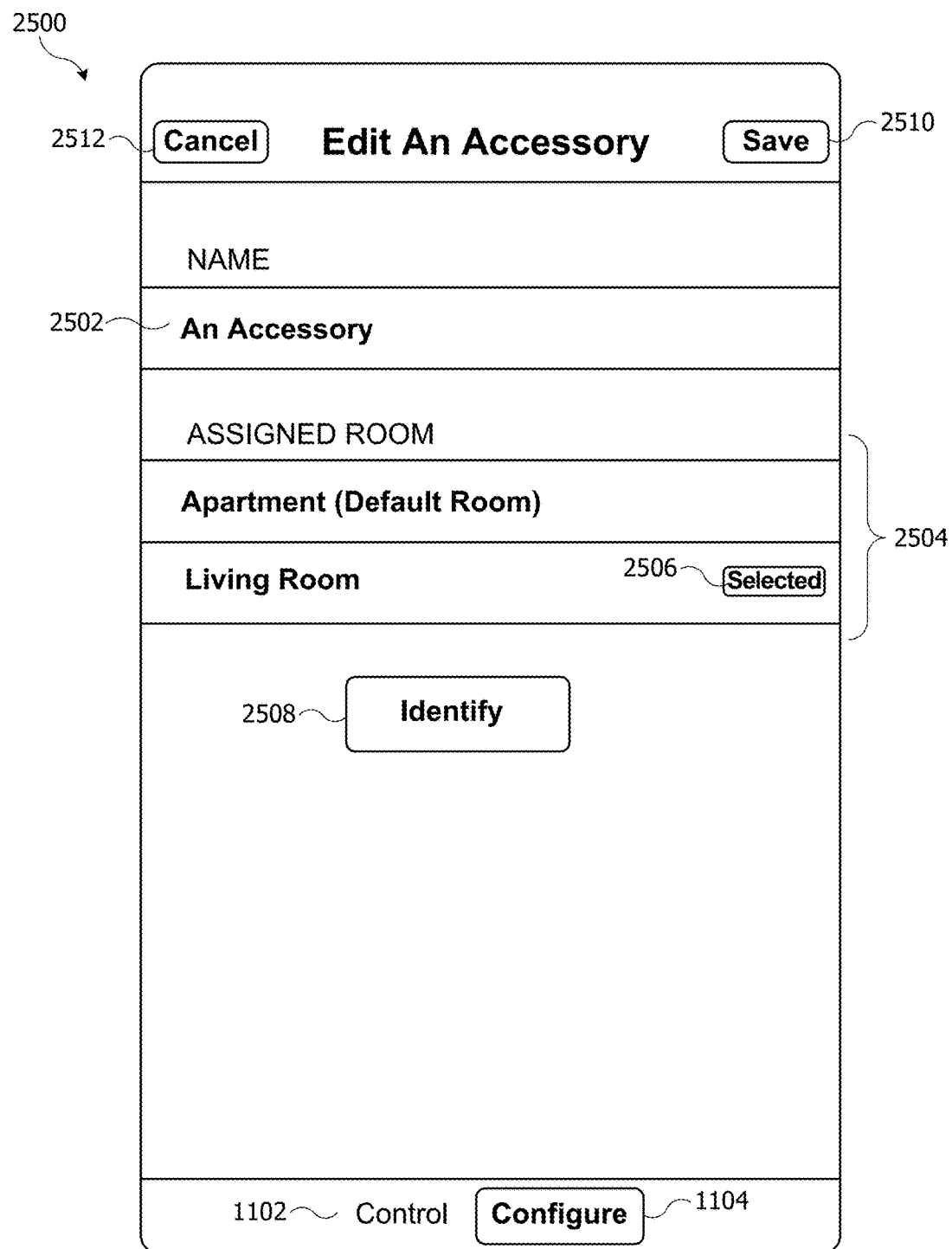

In some embodiments, the user can add accessories to a room by editing the accessories. FIG. 25 shows an interface screen 2500 for editing an accessory according to an embodiment of the present invention. Screen 2500 can be presented, e.g., in response to user operation of "edit" control 1902 in screen 1900 of FIG. 19, or in response to the user selecting accessory 2002 from section 1402 of screen 1400 (FIG. 20). Screen 2500 can be generally similar to screen 1600 of FIG. 16. For example, screen 2500 can identify the accessory to be edited in section 2502. The accessory can be edited by changing its room assignment. For example, section 2504 can present a list of all rooms that have been defined. The currently assigned room can be indicated, e.g., by a "selected" icon 2506, and the user can change the selection, e.g., by tapping on the desired room. When the user taps on a different room, "selected" icon 2506 can be shifted to indicate the new room. "Identify" control 2508 can operate similarly to control 1608 of FIG. 16 described above. The user can save the changes by using control 2510 or cancel the changes by using control 2512. In either case, the user interface can revert to the screen from which the editing operation was invoked, e.g., screen 1900 (FIG. 19) or screen 1400 (FIG. 20).

Figure 26:
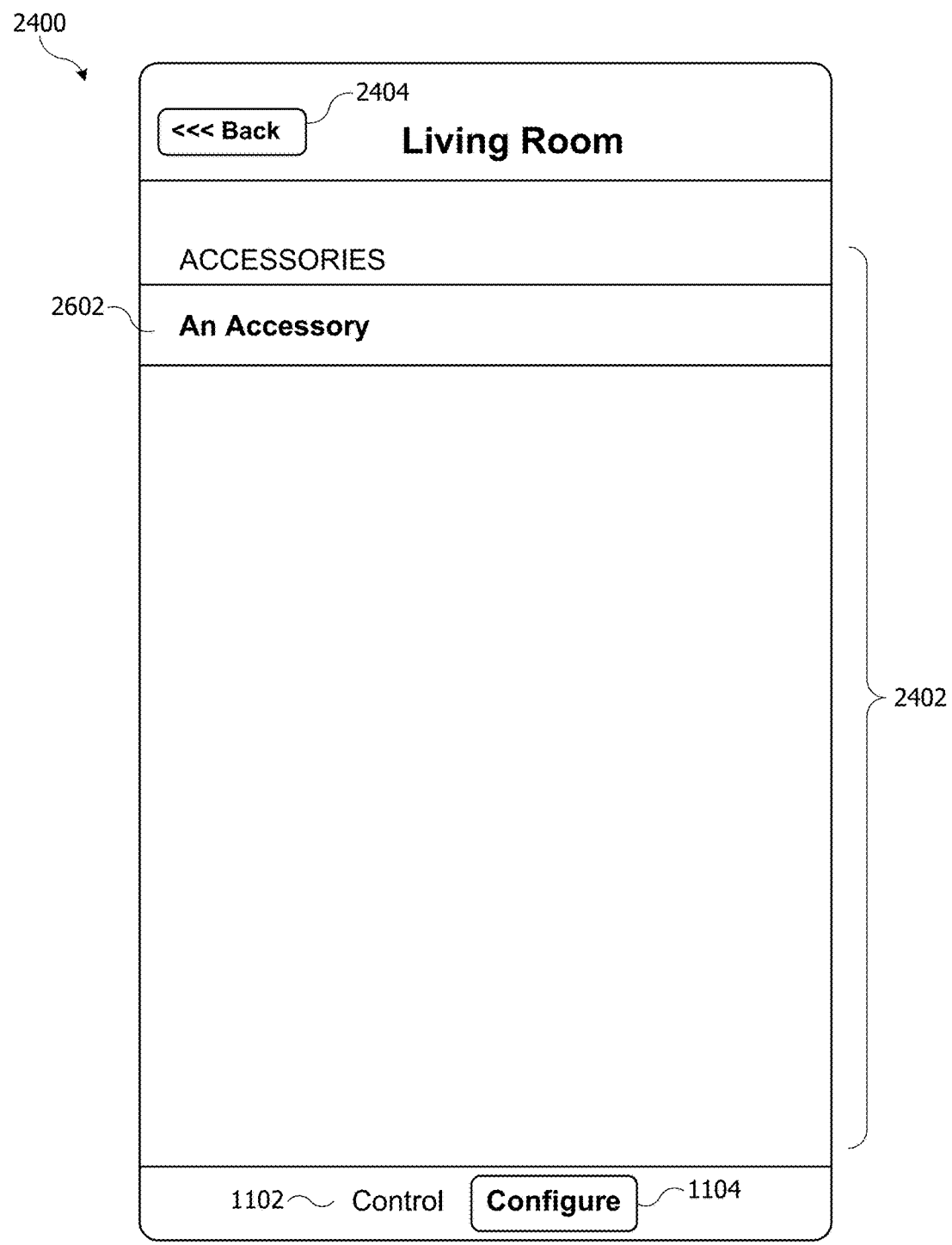

In this manner, the user can add accessories to a room. For instance, the user can add an accessory to a room called "Living Room." FIG. 26 shows an updated version of interface screen 2400 of FIG. 24 that can be presented after an accessory has been added to the room called "Living Room." Instead of being empty, list 2402 can now show the assigned accessory at 2602. Any number of accessories can be added to a room, and if the number of accessories exceeds the display area, list 2402 can be scrollable. In some embodiments, a user can edit an accessory by selecting it from list 2402, which can result in invoking an editing interface, e.g., screen 2500 described above. For instance, if the user sees that an accessory has been incorrectly assigned to "Living Room," the user can immediately edit the accessory to change the room assignment. Control 2404 can be used to return to screen 2000.

Figure 27:
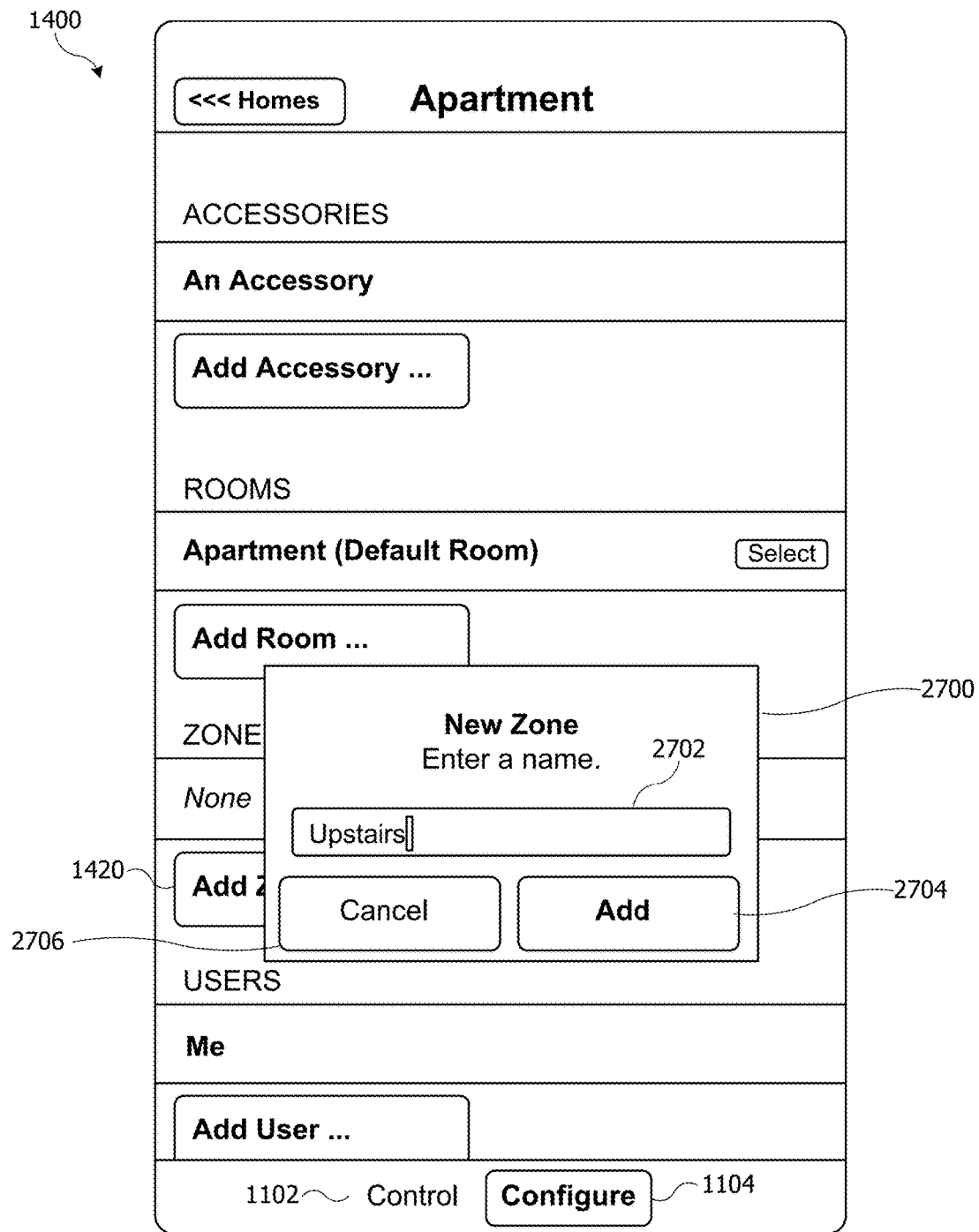

Referring again to FIG. 20, screen 1400 can also be used to configure zones within an environment. As described above, a zone can be a collection of rooms, and zones can be defined based on any physical or logical grouping of rooms that the user deems worthwhile. Defining zones can be optional, and accordingly, section 1406 can initially be empty except for "Add Zone" control 1420. Control 1420 can be operated to add zones to the home if desired. FIG. 27 shows a user interface screen 2700 for adding a zone to a home according to an embodiment of the present invention. Screen 2700 can be can be presented, e.g., in response to user operation of control 1420. Screen 2700 can be presented as a pop-up over screen 1400 and can prompt the user to enter a name for the new zone in text box 2702. A virtual keyboard (not shown) can be presented to facilitate entering a name. The user can select control 2704 to add the zone to list 1406 or control 2706 to cancel the operation.

Figure 28:
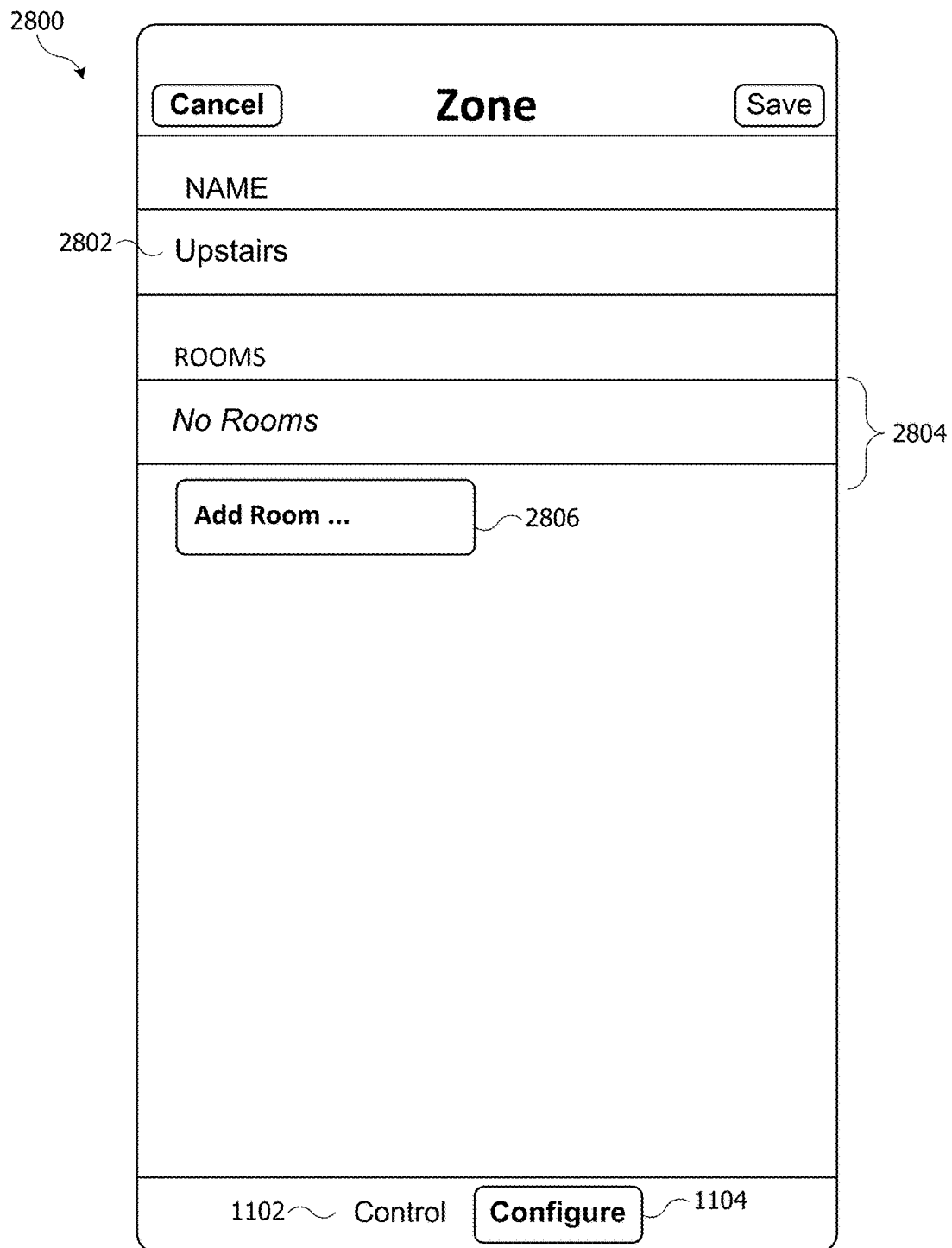

Once a zone is added, rooms can be assigned to zones. FIG. 28 shows an interface screen 2800 for adding rooms to a zone according to an embodiment of the present invention. Screen 2800 can be presented, e.g., in response to the user entering the name of a new zone at screen 2700 or in response to the user selecting a zone from section 1406 of screen 2000. Screen 2800 can show the name of the zone at field 2802 and a list 2804 of all rooms currently assigned to the zone. Control 2806 can be operated to add rooms to the zone. In response to user selection of control 2806, the user interface can present a list of all rooms (not shown) and indicate whether each room is or is not currently assigned to the zone. The user can select rooms to add to and/or remove from the zone. In some embodiments, a room can be assigned to multiple zones. For instance, a user can define an "upstairs" zone and a "bedrooms" zone. A bedroom located upstairs can be in both zones; a bathroom located upstairs can be in the "upstairs" zone but not the "bedrooms" zone; and a bedroom located downstairs can be in the "bedrooms" zone but not the "upstairs" zone. In some embodiments, rooms can be assigned to zones by editing the room in addition to or instead of editing the zone. For example, a user interface for modifying assignment of rooms to zones can present a list of rooms and can indicate, for each room, which (if any) zone(s) the room is assigned to.

Figure 29:
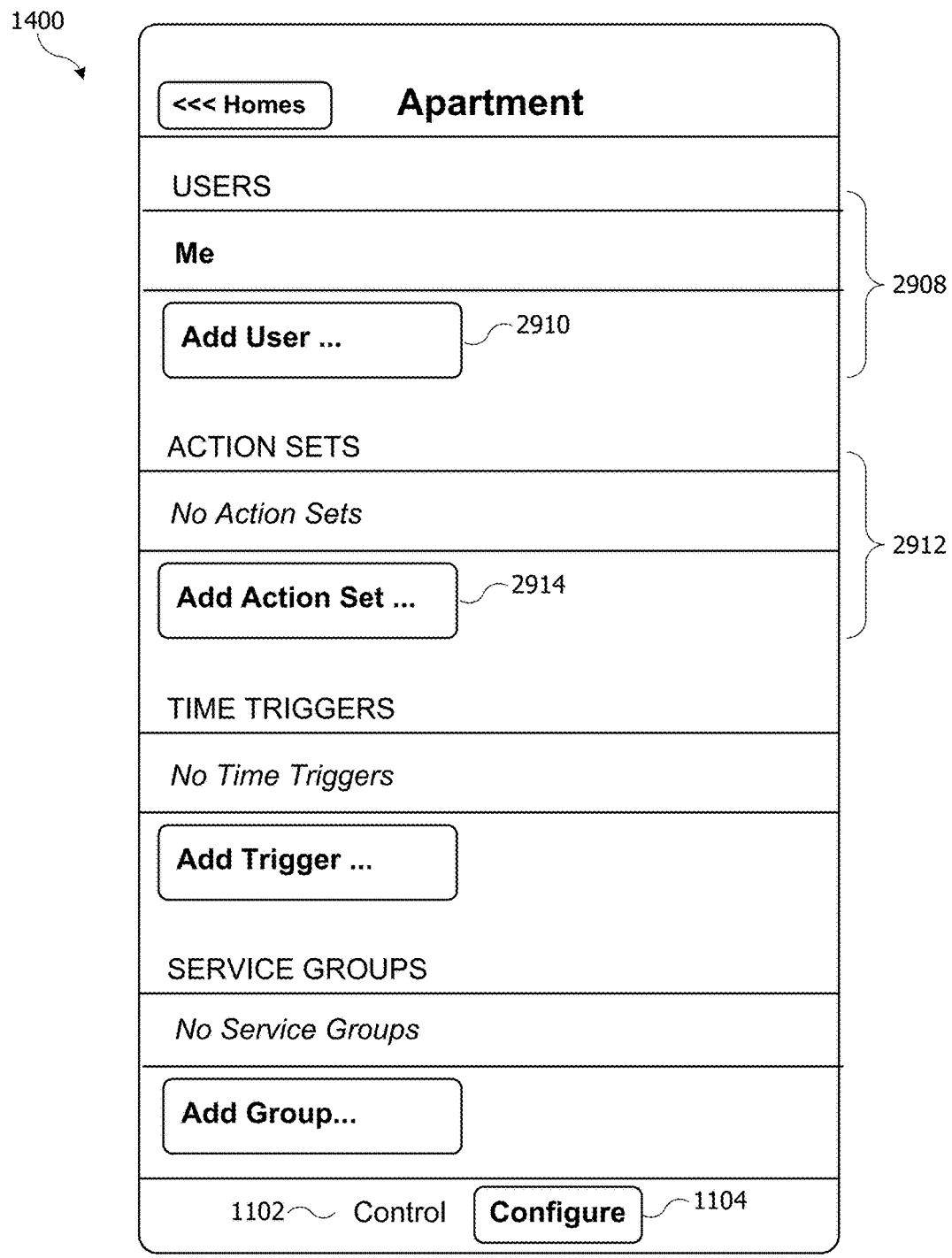

Referring again to FIGS. 14 and 20, as noted above, screen 1400 can be scrollable to present additional configuration options. FIG. 29 shows an example of screen 1400 after scrolling down. Section 2908 can allow the user to manage other users associated with the home. For example, section 2908 can show a list of all other users who have been added to the home. The list can be initially empty, or it can just include the user (identified in FIG. 29 as "Me") of the controller on which screen 1400 is displayed. The user of the controller can add another user to the home, e.g., by operating control 2910. In some embodiments, in response to user operation of control 2910, the user interface can prompt the user to enter an identifier of the user to be added, such as an identifier of the new user's account with a cloud-based data service as described above. The interface can also prompt the user to establish permissions for the new user, e.g., as described above. In some embodiments, a user can be removed by using additional interface controls.

Section 2912 can be used to define and manage action sets, where an "action set" refers to a set of control messages to be sent to various accessories as described above. In examples herein, an action set can be defined separately from any automatic trigger, allowing the same action set to be invoked manually and/or to be associated with one or more triggers. Any action sets that have been defined can be listed in section 2912. The list can be initially empty. "Add" control 2914 can be operated to access an interface for defining an action set.

Figure 30:
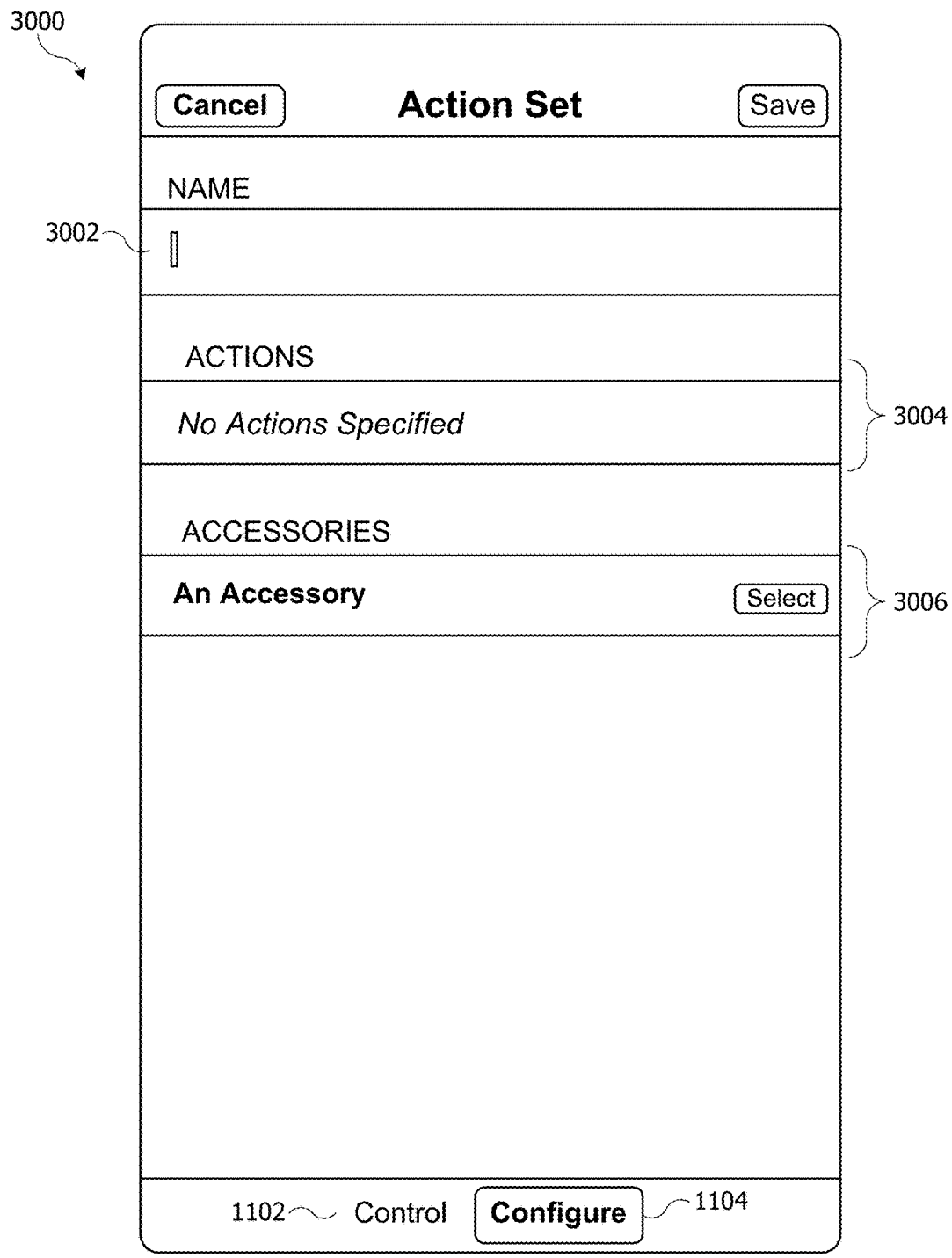
Figure 31:
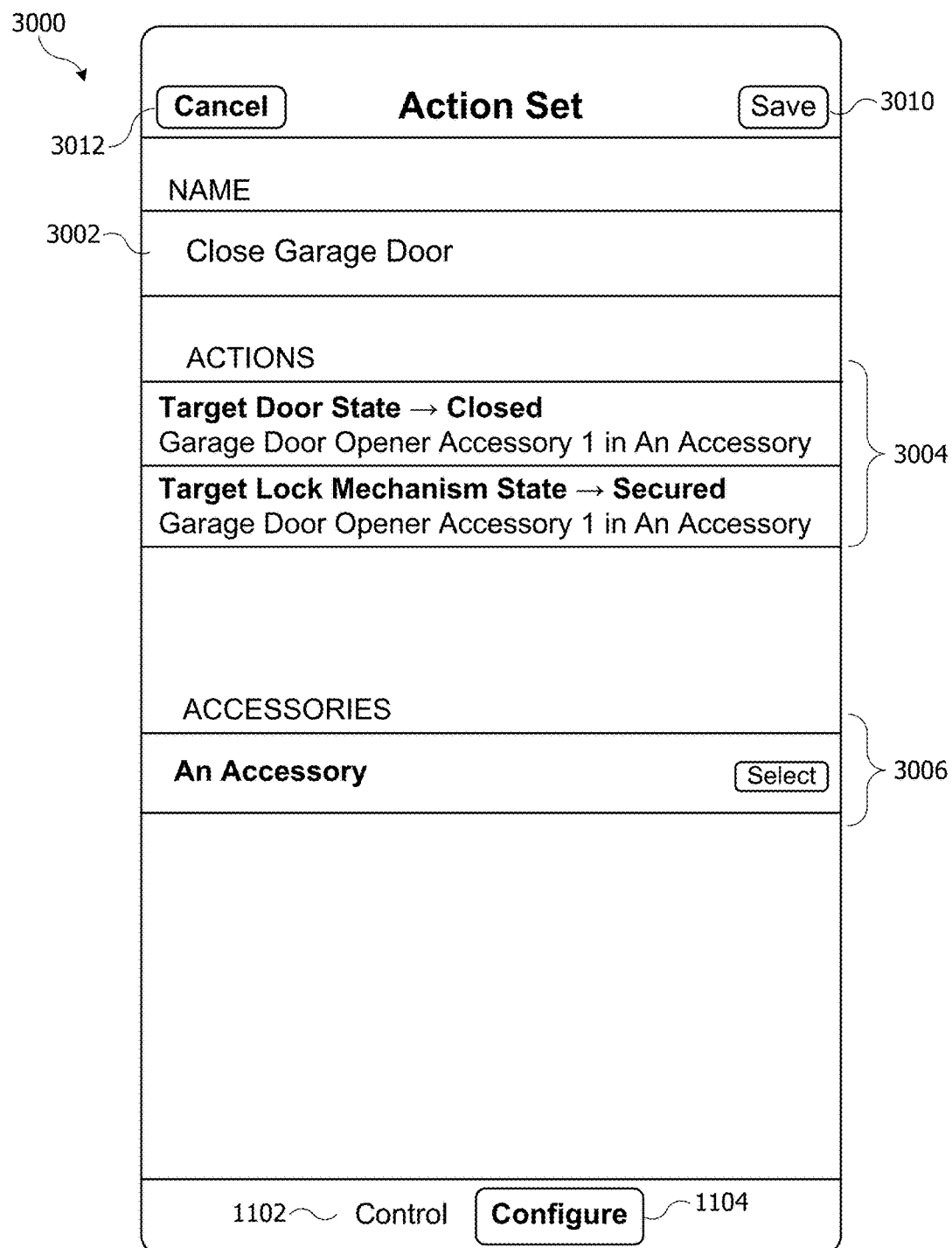

FIG. 30 shows an example of a user interface screen 3000 for defining an action set according to an embodiment of the present invention. Screen 3000 can be presented, e.g., in response to user operation of control 2914 of FIG. 29. Field 3002 can be used to name the action set. For instance, the user can click or tap within field 3002, then type a name, e.g., using a virtual keyboard (not shown). Action list 3004 can identify all actions that have been included in the action set. Initially, no actions are included. Accessories list 3006 can include all accessories in the home (in this example, there is only one accessory, but there can be any number). The user can select an accessory that should perform one or more of the actions in the action set. The user can then be presented with services and characteristics screens, which can be similar or identical to screens 2100 (FIG. 21) and 2200 (FIG. 22) described above. Via these screens, the user can specify the actions the accessory should take in connection with the action set. For example, for a garage door opener accessory, the user can specify the actions of closing the door (setting target door state to "closed") and locking the door (setting target lock mechanism state to "secured"). These actions can be added to the action set. FIG. 31 shows an updated version of user interface screen 3000 with name field 3002 filled in and some actions added to action list 3004. Any number of actions by any number of different accessories (or different services of the same accessory) can be included in an action set. The user can save the action set by operating control 3010 or cancel the operation by operating control 3012. In some embodiments, a new action set cannot be saved until the user has provided a name and at least one action.

Figure 32:
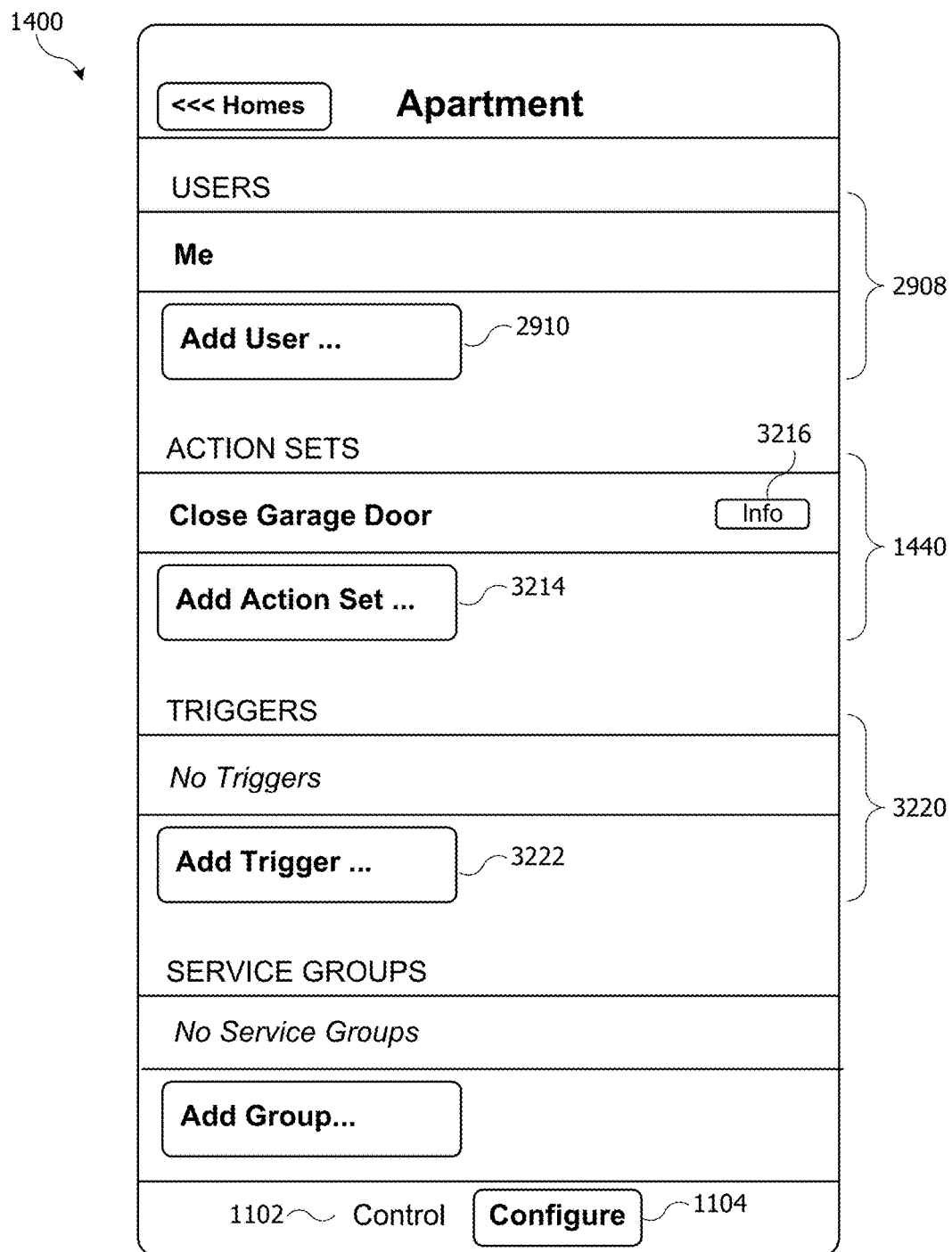

Once a new action set has been defined, the user interface can present an updated version of screen 1400 including the action set. FIG. 32 shows an updated version of screen 1400 after adding an action set according to an embodiment of the present invention. Section 2912 has been updated to include the action set defined using screen 3000 (FIG. 31). The user can select info control 3216 to view and/or edit the action set. In some embodiments, the user can invoke an action set manually, e.g., by switching the app to control mode using "control" button 1102, then selecting the action set from section 2912.

After one or more action sets have been defined, triggers section 3220 can become active. Section 3220 can list all triggers that have been defined and can include control 3222 to allow the user to add a new trigger. In the simplified example shown, the triggers are "time" triggers that cause action sets to execute at user-specified times. It is to be understood that other types of triggers can also be defined. Further, in the simplified example shown, a triggering event is defined and the triggering condition is assumed to be "always" as described above. Other interfaces can facilitate defining triggering conditions as well as triggering events.

Figure 33:
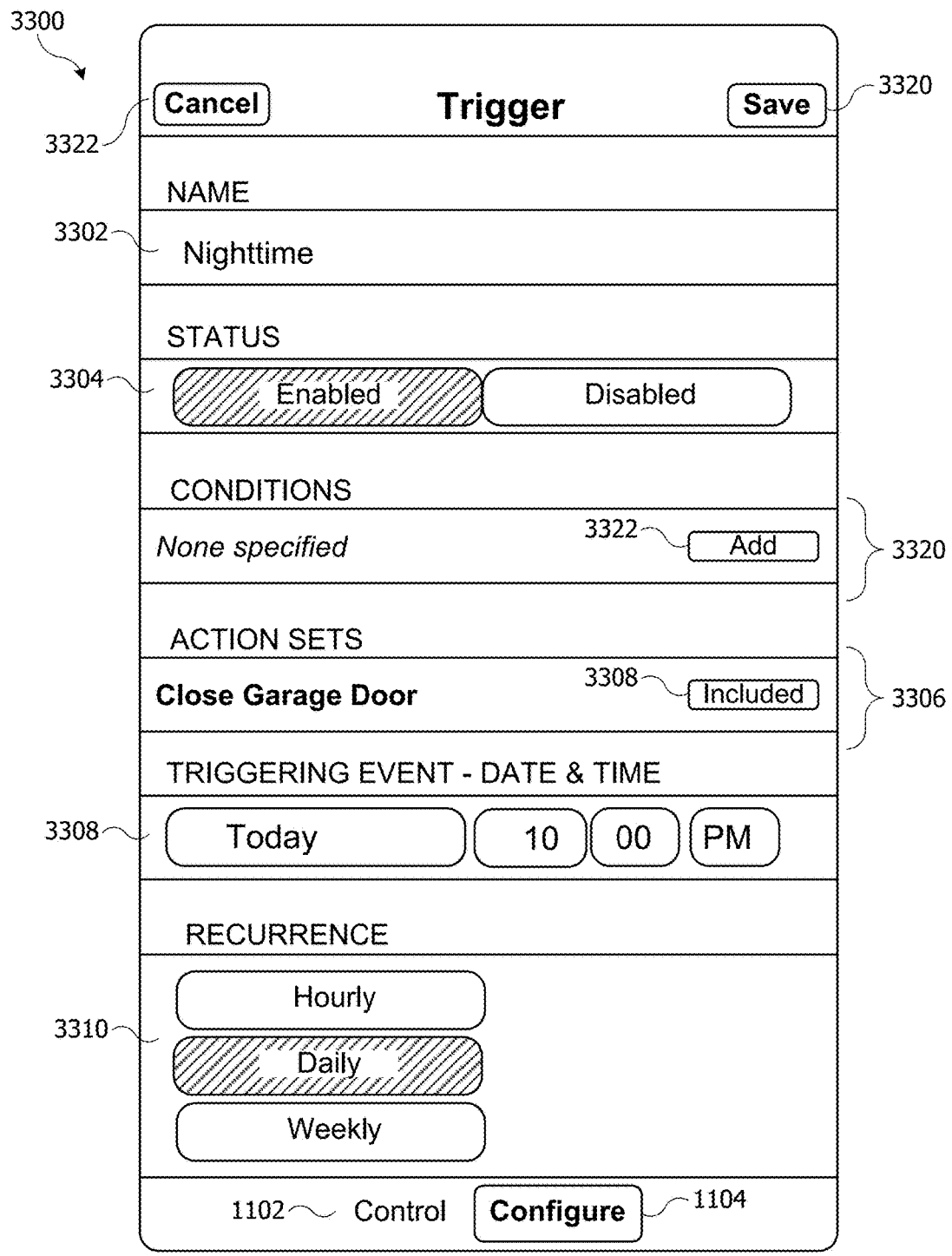

FIG. 33 shows an user interface screen 3300 for defining a time trigger according to an embodiment of the present invention. Screen 3300 can be presented, e.g., in response to user operation of control 3222 or another control indicating that a time trigger is being defined. The trigger can be given a name by entering text into name field 3302. Status control 3304 can be used to enable or disable the trigger; a trigger that is "enabled" will automatically execute its action set if the triggering event is detected, while a trigger that is "disabled" will not execute its action set regardless of whether the triggering event is detected. Conditions section 3322 can be used to add a triggering condition, e.g., by operating add control 332. Operation of add control 3322 can result in presenting a pop-up interface (not shown) to define a triggering condition. Action sets list 3306 can present a list of all action sets that have been defined. For each action set that is to be performed in response to the trigger, an "included" icon 3308 can be presented with the action set. For each action set that is not to be performed, icon 3308 can be omitted. The user can toggle the included/excluded status of action sets, e.g., by tapping the name of the action set to cause icon 3308 to appear or disappear as desired. In some embodiments, no action sets are included by default, and the user can tap on the name of each action set that is to be performed in response to the this trigger.

Date and time field 3308 can be used to specify a date and time for a time-based triggering event, and recurrence field 3310 can be used to define a recurrence pattern for the triggering event. Conventional or other date-selection interfaces can be used, e.g., date pickers, drop-down lists, keyboard entry, and so on. Although fields 3308 and 3310 in this example are specific to time-based triggering events, those skilled in the art with access to this disclosure will appreciate that other types of triggering events and/or triggering conditions can be defined by providing appropriate fields in the user interface.

Figure 34:
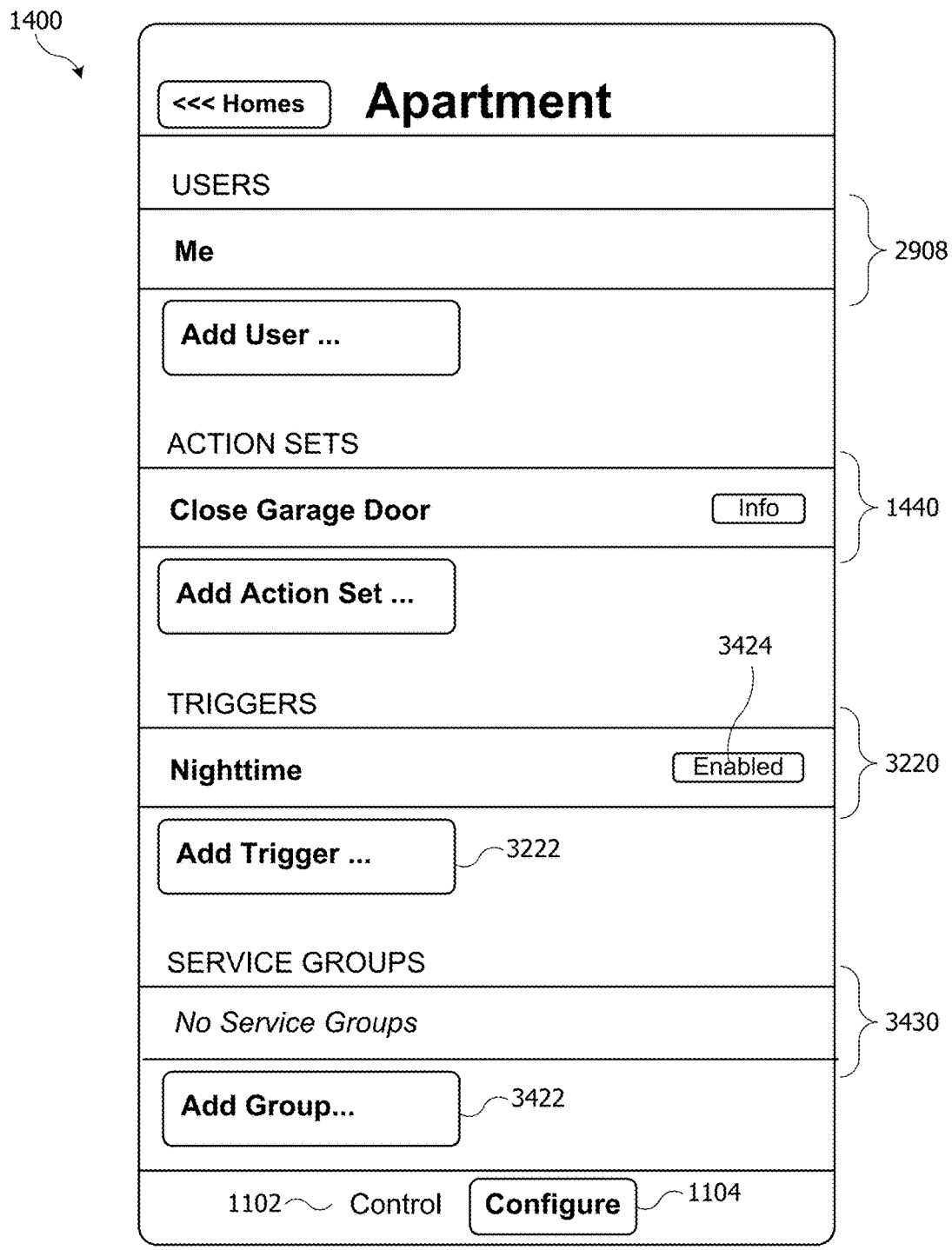

Once the trigger and associated action sets are defined, the user can operate "save" control 3320 to save the defined trigger or "cancel" control 3322 to cancel the operation without saving any changes that may have been made. In some embodiments, a new trigger cannot be saved until the user has provided a name, at least one action set, and a triggering event. After saving the new trigger, the user interface can return to main configuration screen 1400. FIG. 34 shows an example of main configuration screen 1400 after adding the trigger defined in FIG. 33 to section 3220. In this example, "enabled" icon 3424 can indicate whether the trigger is enabled or disabled, allowing the user to see the status without having to open the trigger for viewing or editing. In some embodiments, "enabled" icon 3424 can be a user-operable toggle to enable or disable a specific trigger directly from interface 1400.

Screen 1400 can also be used to define and manage service groups, e.g., using section 3430. As described above, a service group can be a group of accessories or accessory services that users may regularly want to use together. A user can define a new service group, e.g., by operating control 3432. In response, the user interface can present additional screens to allow a user to define or edit a service group.

Figure 35:
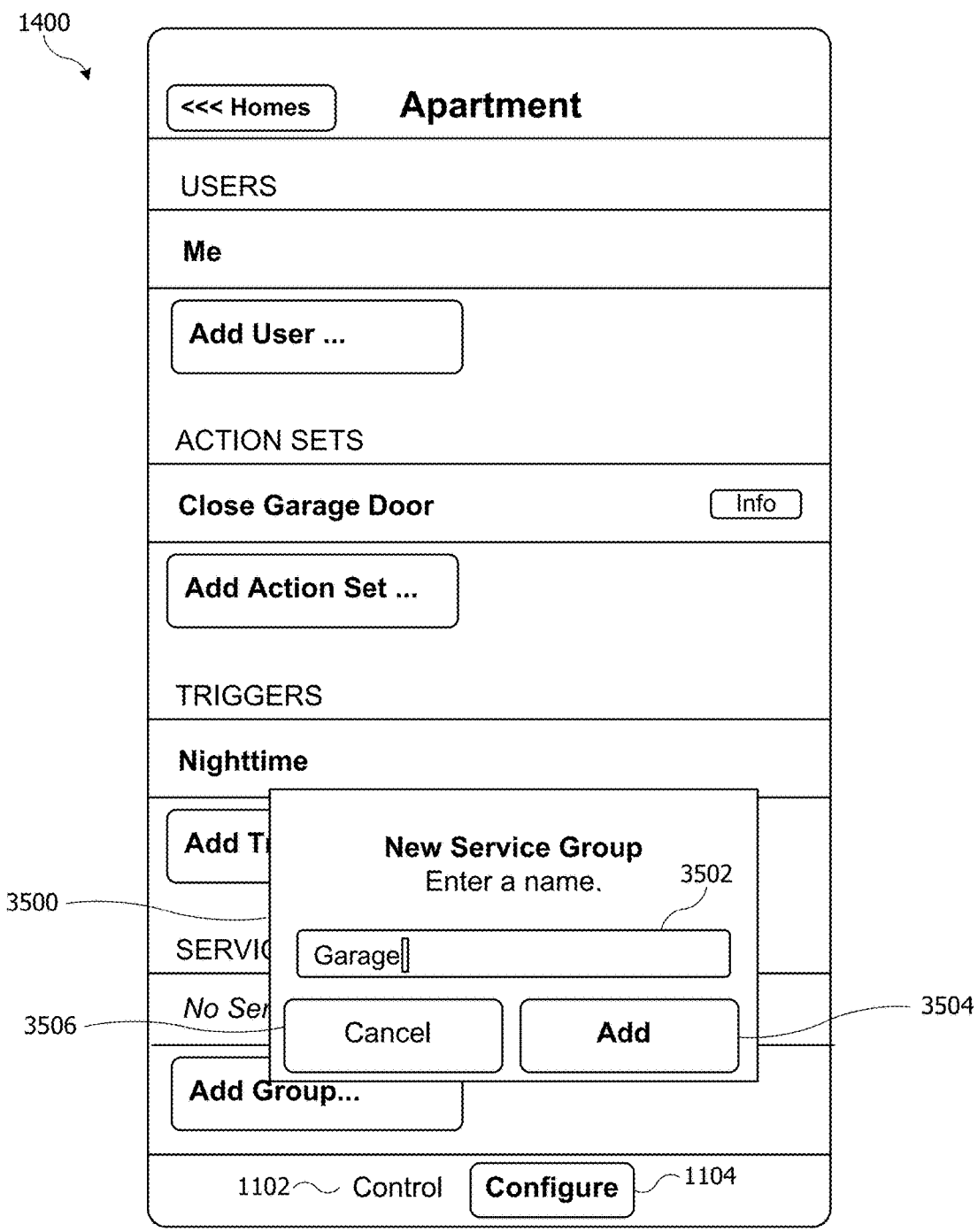

FIG. 35 shows a user interface screen 3500 for creating a service group according to an embodiment of the present invention. Screen 3500 can be presented as a pop-up over screen 1400, e.g., in response to user operation of control 3432. Screen 3500 can prompt the user to enter a name for the new service group in text box 3502. A virtual keyboard (not shown) can be presented to facilitate entering a name. The user can select control 3504 to continue the process of creating a service group or control 3506 to cancel the operation.

Figure 36:
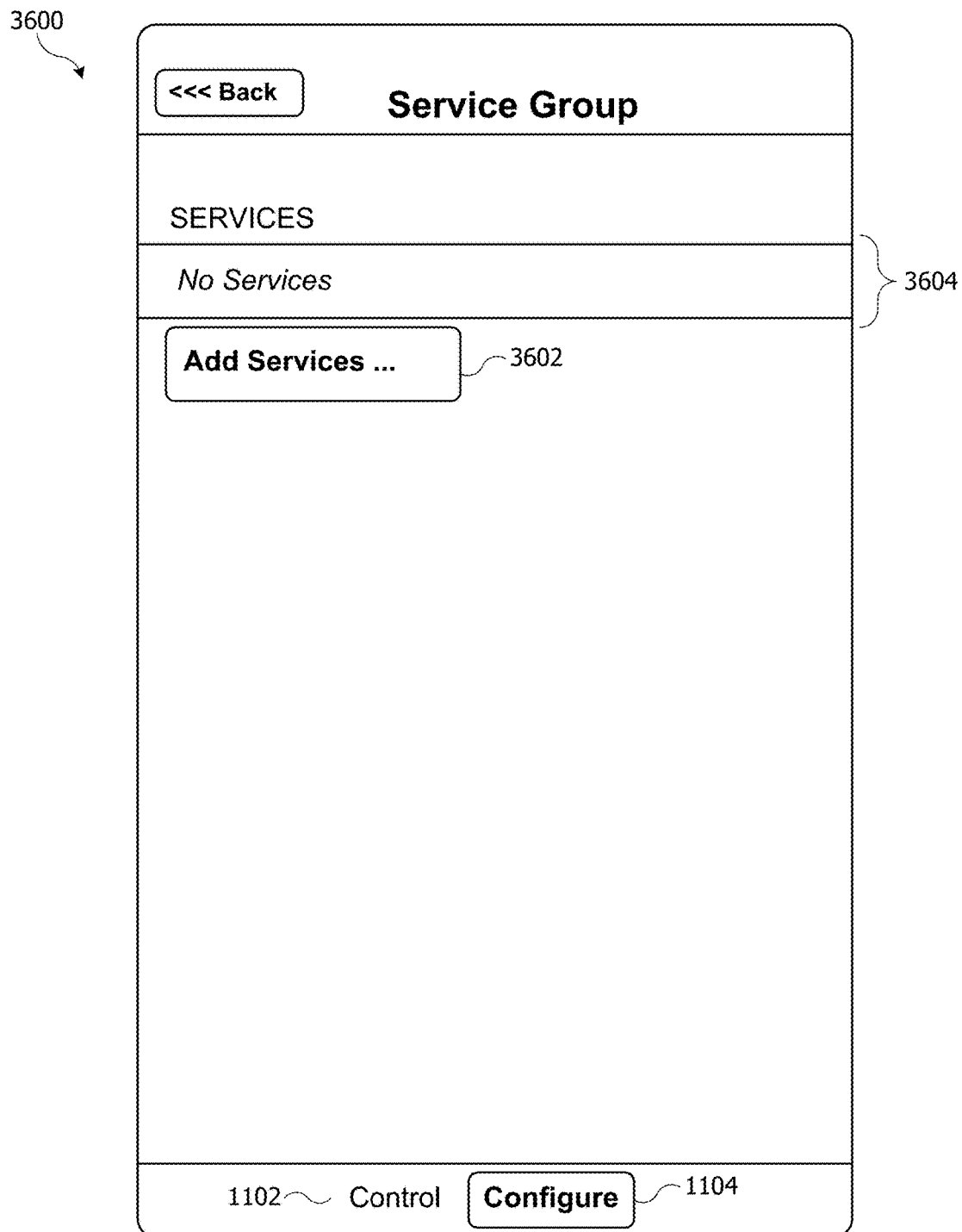

FIG. 36 shows a user interface screen 3600 that can be presented after the user names a new service group (e.g., using screen 3500) according to an embodiment of the present invention. Control 3602 can be operated to allow a user to identify services to add to the service group, and list 3604 can present a list of services that are already included in the service group. Initially, list 3604 can be empty. Once a service has been added, its name can appear in area 3604, and control elements of the user interface (not shown) can allow the user to view information about the service or remove the service from the service group.

Figure 37:
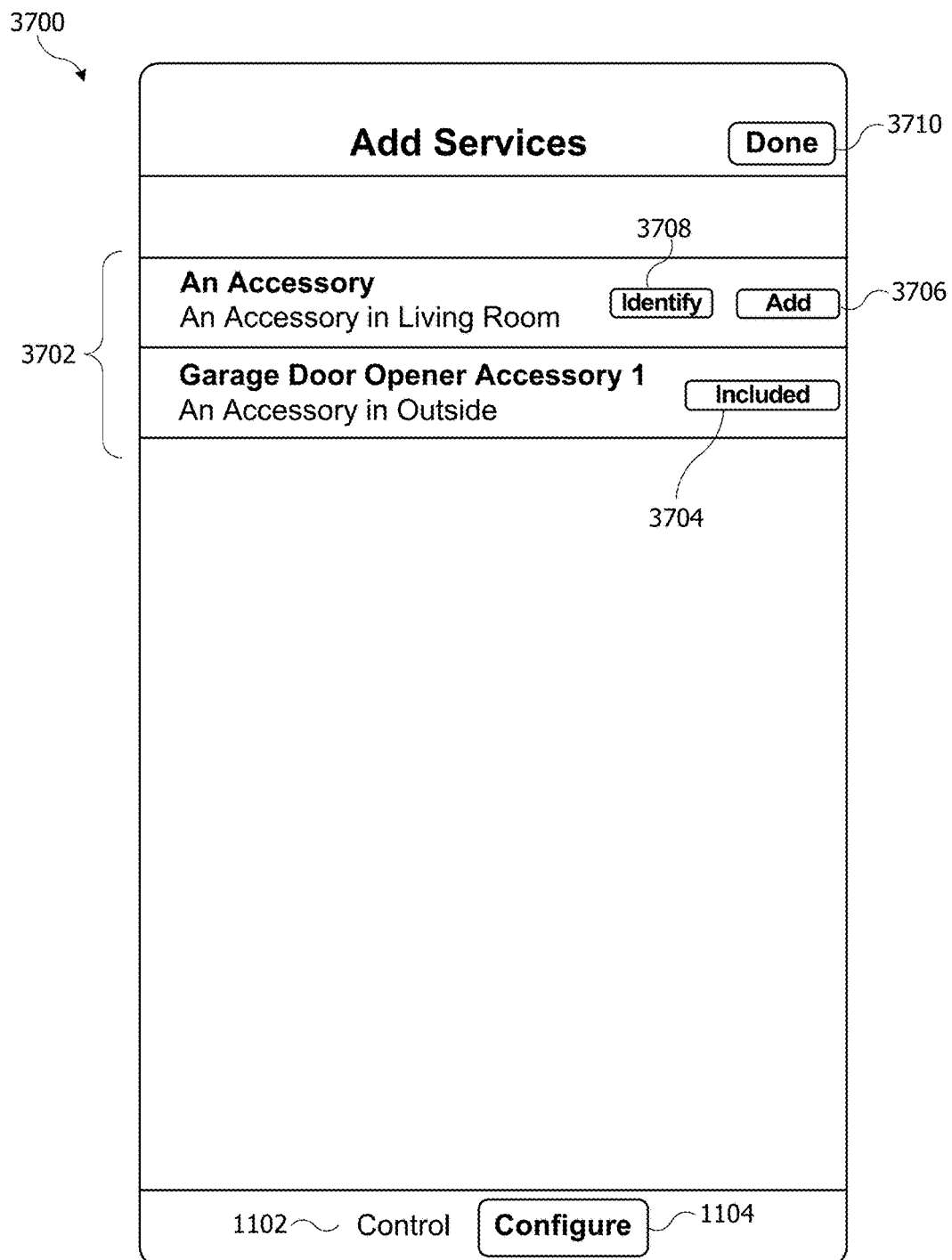

FIG. 37 shows an example of a user interface screen 3700 for adding services to a service group according to an embodiment of the present invention. Screen 3700 can be shown, e.g., in response to user operation of control 3602. Screen 3700 can present a list 3702 of all services of all accessories that have been added to the home. In some embodiments, no services are included by default, and the user can add services by selecting them from list 3702. For each service that is currently included in the service group, an "included" icon 3704 can be presented with the service name. For each service that is not included, icon 3704 can be omitted. In some embodiments, for services that are not included, control elements can be provided in place of icon 3704 to allow the user to add the service to the service group (control element 3706) or to identify the accessory that includes the listed service (control element 3708). As described above, identifying the accessory can include sending a "reveal" request from the controller to the accessory, to which the accessory can respond by performing some action that the user can observe.

In some embodiments, control elements 3706 and 3708 can be omitted, and the user can toggle the included/excluded status of services, e.g., by tapping them to cause icon 3704 to appear or disappear as desired. When the user is satisfied with the included services, the user can operate "done" control 3710 to return to screen 1400. In some embodiments, a new service group cannot be saved unless it has a name and includes at least one service.

Operations and interfaces described above can be used to configure an automated environment. In some embodiments, the same app and similar interfaces can also be used to control a home, e.g., by interacting with accessories. For example, from screen 1400 (e.g., as shown in any of FIGS. 20, 29, 32, and 34), the user can switch from "configure" mode to "control" mode, e.g., by operating "control" button 1102.

Figure 38:
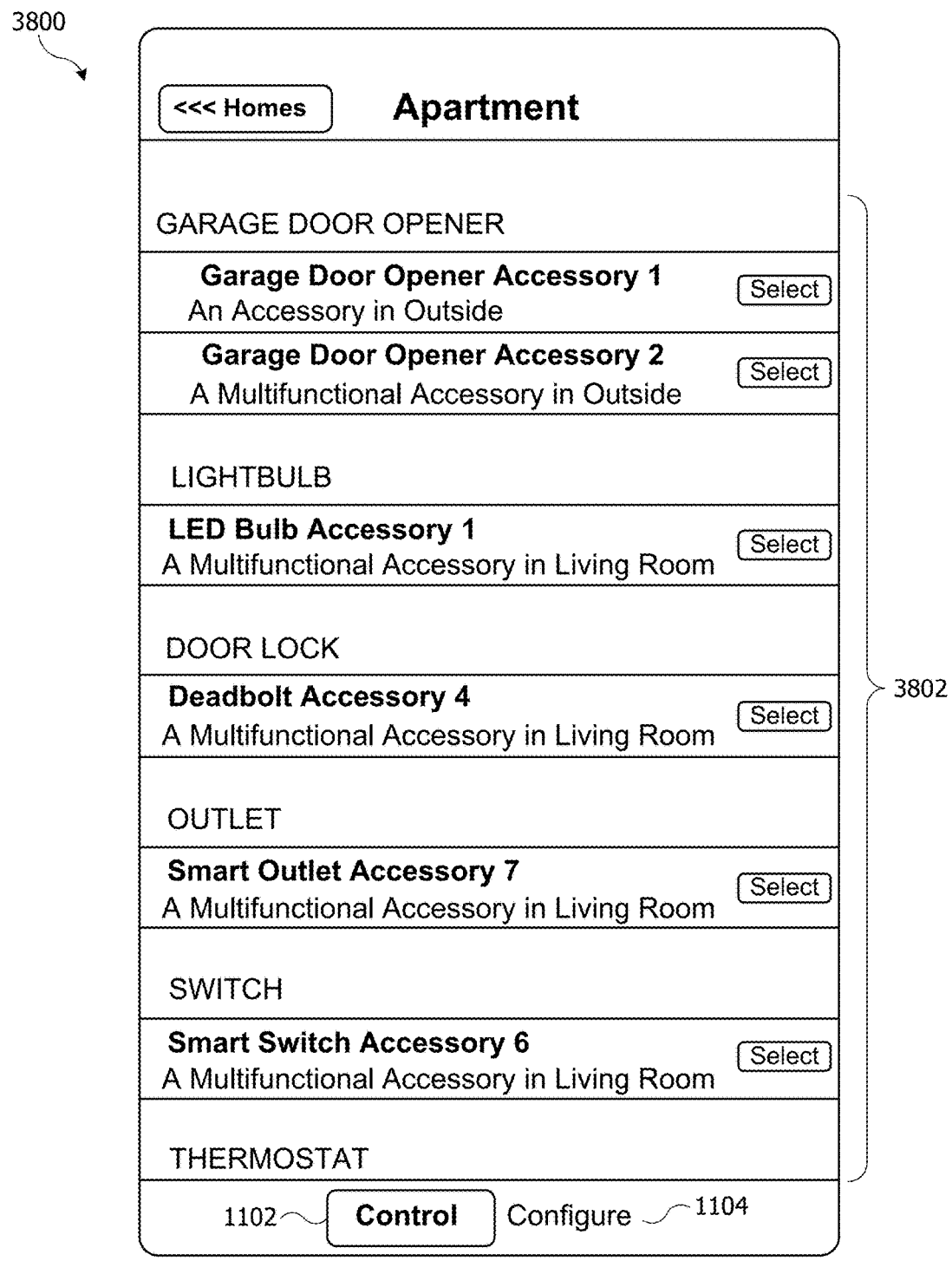

FIG. 38 shows a user interface screen 3800 for controlling accessories according to an embodiment of the present invention. Screen 3800 can be presented, e.g., in response to the user switching to control mode from screen 1400. Screen 3800 can include a list 3802 of all services of all accessories that have been added to the home. In the example shown, the services are grouped by service type. Other arrangements are also possible. In some embodiments, the arrangement can mimic a physical or logical layout of the home, e.g., by showing the services grouped by room or by zone. (A service is a model of an accessory functionality and can be regarded as assigned to the same room as the accessory to which it belongs.) In some embodiments, controls can be provided to allow the user to choose and modify how the list of services is arranged. The user can select an entry from list 3802. In response, the app can present a control interface, which can be similar to screen 2200 of FIG. 22 described above.

It will be appreciated that the user interface screens described herein are illustrative and that variations and modifications are possible. The arrangement and appearance of interface elements can be varied as desired. The particular sequences of screens can also be varied. Information shown herein as being on a single screen can be split across multiple screens and vice versa. In some embodiments, lists can be expandable and collapsible. In some embodiments, search or filter options can be included in connection with various operations. For example, rather than viewing a list of all accessories at screen 1500 (FIG. 15), the user may be able to provide all or part of the name of the accessory (or some other property, e.g., accessories with a "lightbulb" service), and the app can filter the list of detected accessories based on the specified criteria. Further, where multiple users and/or controllers share access to an environment, it is not necessary to manually configure the environment model on each controller. As described above, an environment model can be synchronized across devices. Thus, one controller can be used to manually configure the environment model, and other controllers can obtain the environment model (or portions thereof) from the first controller via direct or cloud-based synchronization.

In some embodiments, voice input can be used for some or all operations described herein, and feedback to the user can be provided visually (e.g., on a display) and/or audibly (e.g., using a speech synthesizer to speak words) as desired.

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 39:
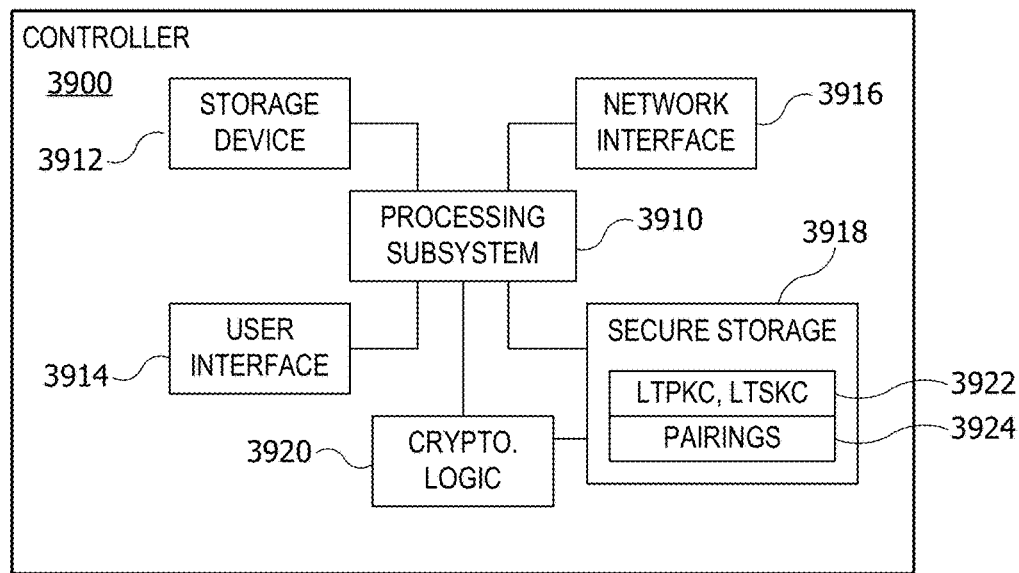
FIG. 39 is a simplified block diagram of a controller according to an embodiment of the present invention.

FIG. 39 is a simplified block diagram of a controller 3900 according to an embodiment of the present invention. Controller 3900 can implement any or all of the controller functions, behaviors, and capabilities described herein, as well as other functions, behaviors, and capabilities not expressly described. Controller 3900 can include processing subsystem 3910, storage device 3912, user interface 3914, communication interface 3916, secure storage module 3918, and cryptographic logic module 3920. Controller 3900 can also include other components (not explicitly shown) such as a battery, power controllers, and other components operable to provide various enhanced capabilities. In various embodiments, controller 3900 can be implemented in a desktop computer, laptop computer, tablet computer, smart phone, other mobile phone, wearable computing device, or other systems having any desired form factor. Further, as noted above, controller 3900 can be implemented partly in a base station and partly in a mobile unit that communicates with the base station and provides a user interface.

Storage device 3912 can be implemented, e.g., using disk, flash memory, or any other non-transitory storage medium, or a combination of media, and can include volatile and/or non-volatile media. In some embodiments, storage device 3912 can store one or more application and/or operating system programs to be executed by processing subsystem 3910, including programs to implement various operations described above as being performed by a controller. For example, storage device 3912 can store a uniform controller application that can read an accessory description record and generate a graphical user interface for controlling the accessory based on information therein (e.g., as described in above-referenced U.S. Provisional Application No. 61/935,967 and U.S. application Ser. No. 14/614,914). In some embodiments, portions (or all) of the controller functionality described herein can be implemented in operating system programs rather than applications. In some embodiments, storage device 3912 can also store apps designed for specific accessories or specific categories of accessories (e.g., an IP camera app to manage an IP camera accessory or a security app to interact with door lock accessories).

User interface 3914 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 3914 to invoke the functionality of controller 3900 and can view and/or hear output from controller 3900 via output devices of user interface 3914.

Processing subsystem 3910 can be implemented as one or more integrated circuits, e.g., one or more single-core or multi-core microprocessors or microcontrollers, examples of which are known in the art. In operation, processing system 3910 can control the operation of controller 3900. In various embodiments, processing subsystem 3910 can execute a variety of programs in response to program code and can maintain multiple concurrently executing programs or processes. At any given time, some or all of the program code to be executed can be resident in processing subsystem 3910 and/or in storage media such as storage device 3912.

Through suitable programming, processing subsystem 3910 can provide various functionality for controller 3900. For example, in some embodiments, processing subsystem 3910 can implement various processes (or portions thereof) described above as being implemented by a controller. Processing subsystem 3910 can also execute other programs to control other functions of controller 3900, including application programs that may be stored in storage device 3912. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 3916 can provide voice and/or data communication capability for controller 3900. In some embodiments communication interface 3916 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 3916 can provide wired network connectivity (e.g., Ethernet) in addition to or instead of a wireless interface. Communication interface 3916 can be implemented using a combination of hardware (e.g., driver circuits, antennas, modulators/demodulators, encoders/decoders, and other analog and/or digital signal processing circuits) and software components. In some embodiments, communication interface 3916 can support multiple communication channels concurrently or at different times, using the same transport or different transports.

Secure storage module 3918 can be an integrated circuit or the like that can securely store cryptographic information for controller 3900. Examples of information that can be stored within secure storage module 3918 include the controller's long-term public and secret keys 3922 (LTPKC, LTSKC as described above), and a list of paired accessories 3924 (e.g., a lookup table that maps accessory ID to accessory long-term public key LTPKA for accessories that have completed a pair setup or pair add process as described above).

In some embodiments, cryptographic operations can be implemented in a cryptographic logic module 3920 that communicates with secure storage module 3918. Physically, cryptographic logic module 3920 can be implemented in the same integrated circuit with secure storage module 3918 or a different integrated circuit (e.g., a processor in processing subsystem 3910) as desired. Cryptographic logic module 3920 can include various logic circuits (fixed or programmable as desired) that implement or support cryptographic operations of controller 3900, including any or all cryptographic operations described above. Secure storage module 3918 and/or cryptographic logic module 3920 can appear as a "black box" to the rest of controller 3900. Thus, for instance, communication interface 3916 can receive a message in encrypted form that it cannot decrypt and can simply deliver the message to processing subsystem 3910. Processing subsystem 3910 may also be unable to decrypt the message, but it can recognize the message as encrypted and deliver it to cryptographic logic module 3920. Cryptographic logic module 3920 can decrypt the message (e.g., using information extracted from secure storage module 3918) and determine what information to return to processing subsystem 3910. As a result, certain information can be available only within secure storage module 3918 and cryptographic logic module 3920. If secure storage module 3918 and cryptographic logic module 3920 are implemented on a single integrated circuit that executes code only from an internal secure repository, this can make extraction of the information extremely difficult, which can provide a high degree of security. Other implementations are also possible.

Figure 40:
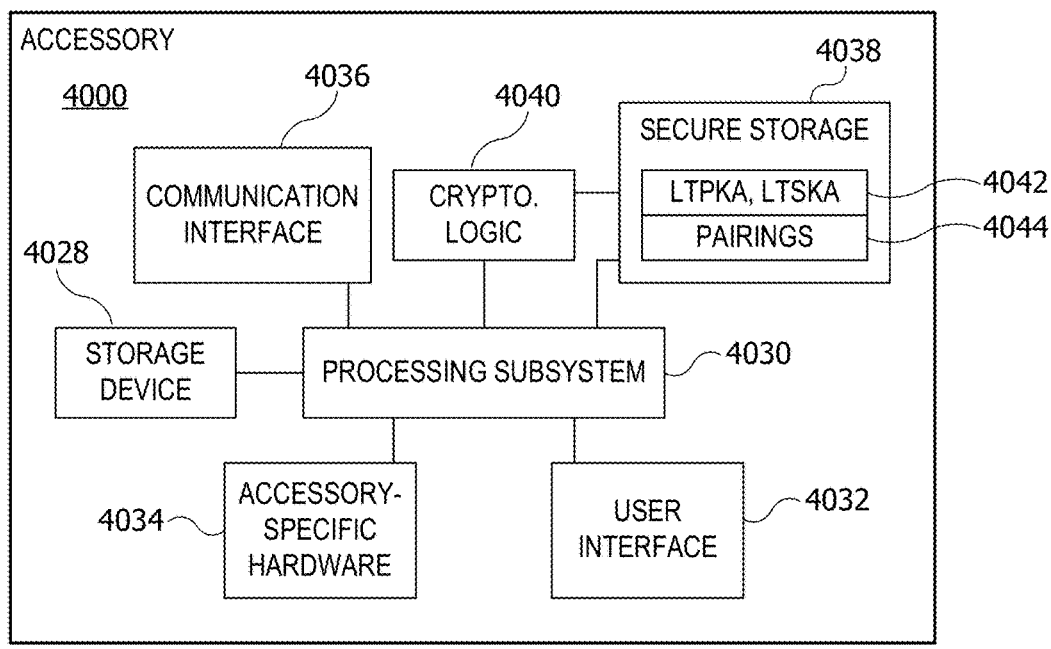
FIG. 40 is a simplified block diagram of an accessory according to an embodiment of the present invention.

FIG. 40 is a simplified block diagram of an accessory 4000 according to an embodiment of the present invention. Accessory 4000 can implement any or all of the accessory functions, behaviors, and capabilities described herein, as well as other functions, behaviors, and capabilities not expressly described. Accessory 4000 can include storage device 4028, processing subsystem 4030, user interface 4032, accessory-specific hardware 4034, communication interface 4036, secure storage module 4038, and cryptographic logic module 4040. Accessory 4000 can also include other components (not explicitly shown) such as a battery, power controllers, and other components operable to provide various enhanced capabilities.

Accessory 4000 is representative of a broad class of accessories that can be operated by a controller such as controller 3900, and such accessories can vary widely in capability, complexity, and form factor. Various accessories may include components not explicitly shown in FIG. 40, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 4028 can be implemented, e.g., using disk, flash memory, or any other non-transitory storage medium, or a combination of media, and can include volatile and/or non-volatile media. In some embodiments, storage device 4028 can store one or more programs (e.g., firmware) to be executed by processing subsystem 4030, including programs to implement various operations described above as being performed by an accessory, as well as operations related to particular accessory behaviors. Storage device 4028 can also store an accessory object or accessory definition record that can be furnished to controller devices, e.g., during device discovery as described in above-referenced U.S. Provisional Application No. 61/935,967. Storage device 4028 can also store accessory state information and any other data that may be used during operation of accessory 4000.

Processing subsystem 4030 can include, e.g., one or more single-core or multi-core microprocessors and/or microcontrollers executing program code to perform various functions associated with accessory 4000. For example, processing subsystem 4030 can implement various processes (or portions thereof) described above as being implemented by an accessory, e.g., by executing program code stored in storage device 4028. Processing subsystem 4030 can also execute other programs to control other functions of accessory 4030. In some instances programs executed by processing subsystem 4030 can interact with a controller (e.g., controller 3900), e.g., by generating messages to be sent to the controller and/or receiving messages from the controller.

User interface 4032 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 4000, a user can operate input devices of user interface 4032 to invoke functionality of accessory 4000 and can view and/or hear output from accessory 4000 via output devices of user interface 4032. Some accessories may provide a minimal user interface or no user interface. at all. Where the accessory does not have a user interface, a user can still interact with the accessory using a controller (e.g., controller 3900).

Accessory-specific hardware 4034 can include any other components that may be present in accessory 4000 to enable its functionality. For example, in various embodiments accessory-specific hardware 4034 can include one or more storage devices using fixed or removable storage media; GPS receiver, power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 4034 and that accessory-specific hardware can include mechanical as well as electrical or electronic components.

Communication interface 4036 can provide voice and/or data communication capability for accessory 4000. In some embodiments communication interface 4036 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 4036 can provide wired network connectivity (e.g., Ethernet) in addition to or instead of a wireless interface. Communication interface 4036 can be implemented using a combination of hardware (e.g., driver circuits, antennas, modulators/demodulators, encoders/decoders, and other analog and/or digital signal processing circuits) and software components. In some embodiments, communication interface 4036 can support multiple communication channels concurrently or at different times, using the same transport or different transports.

Secure storage module 4038 can be an integrated circuit or the like that can securely store cryptographic information for accessory 4000. Examples of information that can be stored within secure storage module 4038 include the accessory's long-term public and secret keys 4042 (LTPKA, LTSKA as described above), and a list of paired controllers 4044 (e.g., a lookup table that maps controller ID to controller long-term public key LTPKC for controllers that have completed a pair setup or pair add process as described above). In some embodiments, secure storage module 4038 can be omitted; keys and lists of paired controllers can be stored in storage device 4028.

In some embodiments, cryptographic operations can be implemented in a cryptographic logic module 4040 that communicates with secure storage module 4038. Physically, cryptographic logic module 4040 can be implemented in the same integrated circuit with secure storage module 4038 or a different integrated circuit (e.g., a processor in processing subsystem 4030) as desired. Cryptographic logic module 4040 can include various logic circuits (fixed or programmable as desired) that implement or support cryptographic operations of accessory 4000, including any or all cryptographic operations described above. Secure storage module 4038 and/or cryptographic logic module 4040 can appear as a "black box" to the rest of accessory 4000. Thus, for instance, communication interface 4036 can receive a message in encrypted form that it cannot decrypt and can simply deliver the message to processing subsystem 4030. Processing subsystem 4030 may also be unable to decrypt the message, but it can recognize the message as encrypted and deliver it to cryptographic logic module 4040. Cryptographic logic module 4040 can decrypt the message (e.g., using information extracted from secure storage module 4038) and determine what information to return to processing subsystem 4030. As a result, certain information can be available only within secure storage module 4038 and cryptographic logic module 4040. If secure storage module 4038 and cryptographic logic module 4040 are implemented on a single integrated circuit that executes code only from an internal secure repository, this can make extraction of the information extremely difficult, which can provide a high degree of security. Other implementations are also possible.

Accessory 4000 can be any electronic apparatus that interacts with controller 3900. In some embodiments, controller 3900 can provide remote control over operations of accessory 4000 as described above. For example controller 3900 can provide a remote user interface for accessory 4000 that can include both input and output controls (e.g., a display screen to display current status information obtained from accessory 4000 and an input control such as a touch-screen overlay to allow changes to the status information). Controller 3900 in various embodiments can control any function of accessory 4000 and can also receive data from accessory 4000.

It will be appreciated that the system configurations and components described herein are illustrative and that variations and modifications are possible. It is to be understood that an implementation of controller 3900 can perform all operations described above as being performed by a controller and that an implementation of accessory 4000 can perform any or all operations described above as being performed by an accessory. A proxy, bridge, tunnel, or coordinator can combine components of controller 3900 and accessory 4000, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Controller networks and/or accessory networks can include as many or as few devices as desired. Use of a proxy or coordinator is not required; regardless of the number of accessories or number of controllers, it is always possible (at least in principle) to establish pairings between each controller and each accessory and to have all controllers operate by controlling accessories directly. Where an accessory-network model (e.g., an environment model as described above) is provided, each controller can obtain a copy of the model (e.g., via synchronization as described above) and can provide access to the model through its user interface.

Further, where proxies or controllers are present, it can be but need not be the case that all controllers are permitted to access all accessories via the proxy or controller. Some controllers might be restricted from accessing accessories when not within the local environment, and some accessories might require that controllers access them directly rather than through a proxy or coordinator.

In some embodiments, an environment model or other model of an accessory network can include an identification of one or more controller devices as being preferred (or permitted) proxies or coordinators. In some instances, multiple coordinators and/or proxies can be designated. For instance, the access list of FIG. 8 can include a flag or other status indicator to identify device(s) having coordinator and/or proxy functionality. Where the accessory-network model includes identification of proxies or coordinators, this can facilitate selection of a proxy or coordinator by another controller (e.g., during the process shown in FIG. 6).

It should also be understood that the use of an access list, such as that shown in FIG. 8, in connection with an accessory network can but need not eliminate the need for controllers to establishing pairings with accessories. For example, in some embodiments described above, all communication with accessories can be mediated by a coordinator. Where this is the case, other controllers can be required to pair with the coordinator but not with individual accessories. In some embodiments, controllers can be required to pair with the coordinator as a precondition of being added to an access list for the accessory network.

Further, some embodiments can manage security on a per-user basis rather than a per-controller basis. For example, in embodiments described above, each controller can have its own long-term public key and long-term secret key, independent of any other controller. In other embodiments, a long-term public/secret key pair can be assigned to a user (rather than to a specific controller) and shared among all controllers belonging to the user. For instance, a long-term public/secret key pair can be associated with the user's account on a cloud-based data service and propagated to devices that the user links to the account. Appropriate measures can be implemented to securely propagate the key pair. Where long-term keys are managed per-user rather than per-controller, an accessory (or coordinator) can establish a pairing with a user rather than a controller; thereafter, the accessory can accept messages from any controller device that presents the user's identifier and sufficient proof that it has the user's long-term secret key.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method executable by one or more devices, the method comprising:
defining an environment model that comprises a hierarchical representation of a physical environment where a plurality of accessory devices are present, the hierarchical representation including a plurality of rooms at a first level and a plurality of zones at a higher level than the first level, each zone of the plurality of zones including at least one subset of the plurality of rooms, and wherein defining the environment model comprises defining a list of users and devices associated with the users that are authorized to edit the environment model;
adding a representation of each of the plurality of accessory devices to the environment model, the representation of each accessory device of the plurality of accessory devices being assigned to a room of the plurality of rooms in the environment model based at least in part on a physical location of each of the plurality of accessory devices;
identifying a respective characteristic of each of the plurality of accessory devices, the respective characteristic identifying an operation that a respective accessory device of the plurality of accessory devices is configured to perform and including a current state for the respective characteristic; and
providing a user interface operable to:
present a representation of the respective accessory device, a representation of a target state selector, and a representation of the current state;
receive an input indicating a selection of a target state for the respective accessory device; and
control the respective accessory device by sending information identifying the selection of the target state, enabling the respective accessory to compare the target state with information stored at the respective accessory device that indicates the current state.

2. The method of claim 1 further comprising:
establishing a pairing with each of the accessory devices, wherein establishing a pairing with an accessory device includes providing to the accessory device a long-term public key of the one or more devices and obtaining from the accessory a long-term public key of the accessory device.

3. The method of claim 1 wherein the environment model includes one room that is not assigned to any of the zones.

4. The method of claim 3 wherein adding the representations of the accessory devices to the environment model includes assigning the representations of the accessory devices to rooms, wherein for each accessory device, the representation thereof is assigned to exactly one room and wherein representations of accessory devices that are assigned to a particular room are also assigned to the zone in which the room is contained.

5. The method of claim 4 further comprising:
defining, in response to user input, a service group within the environment model, the service group having at least a representation of a first accessory device and a representation of a second accessory device assigned thereto,
wherein the representation of the first accessory device and the representation of the second accessory device are also assigned to rooms that are in different zones.

6. The method of claim 1 further comprising:
defining, within the environment model, a triggered action set, the triggered action set specifying a triggering condition and one or more control messages to be sent to one or more of the accessory devices represented in the environment model in response to detecting, by the one or more devices, that the triggering condition obtains.

7. The method of claim 6 wherein the triggered action set further specifies a triggering event such that detection by the one or more devices of the triggering event results in testing whether the triggering condition obtains.

8. The method of claim 1 wherein the environment model is synchronized among a plurality of devices on the list of devices.

9. The method of claim 1, wherein the one or more devices are wirelessly connected to an access point.

10. The method of claim 9, wherein the plurality of accessory devices are wirelessly connected to the access point.

11. A device comprising:
a user interface;
a communication interface to communicate with one or more other devices including at least an accessory device; and
a processing subsystem coupled to the user interface and the communication interface, the processing subsystem configured to:
define an environment model that comprises a hierarchical representation of a physical environment where a plurality of accessory devices are present, the hierarchical representation including a plurality of rooms at a first level and a plurality of zones at a higher level than the first level, each zone of the plurality of zones including at least one subset of the plurality of rooms, and wherein the environment model is defined by defining a list of users and devices associated with the users that are authorized to edit the environment model;
add a representation of each of the plurality of accessory devices to the environment model, the representation of each accessory device of the plurality of accessory devices being assigned to a room of the plurality of rooms in the environment model based at least in part on a physical location of each of the plurality of accessory devices;
identify a respective characteristic of each of the plurality of accessory devices, the respective characteristic identifying an operation that a respective accessory device of the plurality of accessory devices is configured to perform and including a current state for the respective characteristic; and
present the user interface operable to:
present a representation of the respective accessory device, a representation of a target state selector, and a representation of the current state;
receive an input indicating a selection of a target state for the respective accessory device; and
control the respective accessory device by sending information identifying the selection of the target state, enabling the respective accessory to compare the target state with information stored at the respective accessory device that indicates the current state.

12. The device of claim 11 wherein the processing subsystem is further configured to execute an application program that has a configuration mode and a control mode, wherein the configuration mode allows a user to operate the user interface to define the environment model and add representations of the accessory devices to the environment model, and wherein the control mode allows the user to operate the user interface to control the accessory devices within a framework corresponding to the environment model.

13. The device of claim 11, wherein the user interface in a configuration mode includes a user interface screen describing an accessory and a user-operable identify control for the accessory,
wherein, responsive to user operation of the identify control, the device sends a reveal request to the accessory device, the reveal request being recognizable by the accessory device as an instruction to perform an action that is observable by the user, the action being determined by the accessory device.

14. A computer-readable storage medium having stored thereon program instructions that, when executed by a processor of at least one device, cause the at least one device to perform operations comprising:
- defining an environment model, the environment model including a hierarchical representation of a physical environment where a plurality of accessory devices are present, and the hierarchical representation including a plurality of rooms at a lowest level and a plurality of zones at a higher level than the lowest level, each zone of the plurality of zones including at least one subset of the plurality of rooms, and wherein defining the environment model comprises defining a list of users and devices associated with the users that are authorized to edit the environment model;
- adding a representation of each of the plurality of accessory devices to the environment model, the representation of each accessory device of the plurality of accessory devices being assigned to a room of the plurality of rooms in the environment model based at least in part on a physical location of each of the plurality of accessory devices;
- identifying a respective characteristic of each of the plurality of accessory devices, the respective characteristic identifying an operation that a respective accessory device of the plurality of accessory devices is configured to perform and including a current state for the respective characteristic; and
- providing a user interface operable to:
  - present a representation of the respective accessory device, a representation of a target state selector, and a representation of the current state;
  - receive an input indicating a selection of a target state for the respective accessory device; and
  - control the respective accessory device by sending information identifying the selection of the target state, enabling the respective accessory to compare the target state with information stored at the respective accessory device that indicates the current state.

15. The computer-readable storage medium of claim 14 wherein the operations further comprise:
    establishing a pairing with each of the accessory devices, wherein establishing a pairing with an accessory device includes providing to the accessory device a long-term public key of the at least one device and obtaining from the accessory a long-term public key of the accessory device.

16. The computer-readable storage medium of claim 14 wherein for each accessory device, the representation thereof is assigned to exactly one room.

17. The computer-readable storage medium of claim 16 wherein the operations further comprise:
    defining, in response to user input, a service group within the environment model, the service group having at least a representation of a first accessory device and a representation of a second accessory device assigned thereto,
    wherein the representation of the first accessory device and the representation of the second accessory device are also assigned to rooms that are in different zones.

* * * * *